United States Patent
Gerzon et al.

(10) Patent No.: US 11,436,342 B2
(45) Date of Patent: Sep. 6, 2022

(54) TDX ISLANDS WITH SELF-CONTAINED SCOPE ENABLING TDX KEYID SCALING

(71) Applicant: Intel Corporation, Santa Clara, CA (US)

(72) Inventors: Gideon Gerzon, Zichron Yaakov (IL); Hormuzd M. Khosravi, Portland, OR (US); Vincent Von Bokern, Rescue, CA (US); Barry E. Huntley, Hillsboro, OR (US); Dror Caspi, Kiryat Yam (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/727,608

(22) Filed: Dec. 26, 2019

(65) Prior Publication Data
US 2021/0200879 A1    Jul. 1, 2021

(51) Int. Cl.
*G06F 21/60* (2013.01)
*G06F 9/455* (2018.01)
(Continued)

(52) U.S. Cl.
CPC ........ *G06F 21/602* (2013.01); *G06F 9/45558* (2013.01); *G06F 21/72* (2013.01);
(Continued)

(58) Field of Classification Search
CPC .... G06F 21/602; G06F 9/45558; G06F 21/72; G06F 2009/45587; G06F 2009/45595;
(Continued)

(56) References Cited

U.S. PATENT DOCUMENTS

| 6,950,517 B2 | 9/2005 | Hawkes et al. |
| 7,340,602 B2 | 3/2008 | Serret-Avila |

(Continued)

FOREIGN PATENT DOCUMENTS

| EP | 2608044 A1 | 6/2013 |
| EP | 3614284 A1 | 2/2020 |

OTHER PUBLICATIONS

International Search Report and Written Opinion, PCT App. No. PCT/US2021/047587, dated Dec. 20, 2021, 11 pages.
(Continued)

*Primary Examiner* — Matthew Smithers
(74) *Attorney, Agent, or Firm* — Nicholson De Vos Webster & Elliott, LLP

(57) ABSTRACT

Disclosed embodiments relate to trust domain islands with self-contained scope. In one example, a system includes multiple sockets, each including multiple cores, multiple multi-key total memory encryption (MK-TME) circuits, multiple memory controllers, and a trust domain island resource manager (TDIRM) to: initialize a trust domain island (TDI) island control structure (TDICS) associated with a TD island, initialize a trust domain island protected memory (TDIPM) associated with the TD island, identify a host key identifier (HKID) in a key ownership table (KOT), assign the HKID to a cryptographic key and store the HKID in the TDICS, associate one of the plurality of cores with the TD island, add a memory page from an address space of the first core to the TDIPM, and transfer execution control to the first core to execute the TDI, and wherein a number of HKIDs available in the system is increased as the memory mapped to the TD island is decreased.

20 Claims, 30 Drawing Sheets

(51) Int. Cl.
   *G06F 21/72* (2013.01)
   *H04L 9/06* (2006.01)
(52) U.S. Cl.
   CPC .. *H04L 9/0631* (2013.01); *G06F 2009/45587* (2013.01); *G06F 2009/45595* (2013.01)
(58) Field of Classification Search
   CPC .... G06F 21/53; G06F 12/145; G06F 12/1475; H04L 9/0631; H04L 9/0643
   See application file for complete search history.

(56) References Cited

U.S. PATENT DOCUMENTS

| | | | |
|---|---|---|---|
| 7,836,387 B1* | 11/2010 | Wong | G06F 21/606 714/E11.04 |
| 9,882,720 B1 | 1/2018 | Levy et al. | |
| 10,102,151 B2 | 10/2018 | Axnix et al. | |
| 10,255,202 B2 | 4/2019 | Khosravi et al. | |
| 10,521,618 B1 | 12/2019 | Zhang et al. | |
| 2004/0019783 A1 | 1/2004 | Hawkes et al. | |
| 2008/0044012 A1 | 2/2008 | Ekberg et al. | |
| 2008/0084996 A1 | 4/2008 | Chen et al. | |
| 2011/0167273 A1 | 7/2011 | Maas et al. | |
| 2011/0296206 A1 | 12/2011 | Henry et al. | |
| 2011/0314303 A1 | 12/2011 | Shevchenko et al. | |
| 2012/0047580 A1 | 2/2012 | Smith et al. | |
| 2012/0110336 A1 | 5/2012 | Frey et al. | |
| 2013/0067245 A1 | 3/2013 | Horovitz et al. | |
| 2013/0238907 A1 | 9/2013 | Debout et al. | |
| 2015/0161059 A1 | 6/2015 | Durham et al. | |
| 2017/0201503 A1 | 7/2017 | Jayasena et al. | |
| 2018/0165224 A1 | 6/2018 | Brown et al. | |
| 2018/0205576 A1 | 7/2018 | Morita et al. | |
| 2019/0042463 A1* | 2/2019 | Shanbhogue | G06F 9/45558 |
| 2019/0042759 A1* | 2/2019 | Smith | G06F 21/74 |
| 2019/0042765 A1 | 2/2019 | Chung et al. | |
| 2019/0042795 A1 | 2/2019 | Bolotov et al. | |
| 2019/0050283 A1* | 2/2019 | Durham | G06F 21/64 |
| 2019/0095350 A1 | 3/2019 | Durham et al. | |
| 2019/0147192 A1* | 5/2019 | Khosravi | H04L 9/0894 713/192 |
| 2019/0197259 A1 | 6/2019 | Bettale et al. | |
| 2019/0251275 A1 | 8/2019 | Ramrakhyani et al. | |
| 2019/0319789 A1 | 10/2019 | Chhabra et al. | |
| 2019/0347432 A1 | 11/2019 | Boivie | |
| 2019/0386815 A1 | 12/2019 | Satpathy et al. | |
| 2020/0082070 A1 | 3/2020 | Semeria et al. | |
| 2020/0145419 A1* | 5/2020 | Yitbarek | H04L 63/061 |
| 2020/0159677 A1 | 5/2020 | Evans et al. | |
| 2020/0159969 A1* | 5/2020 | Shanbhogue | G06F 21/70 |
| 2020/0201786 A1* | 6/2020 | Ouziel | G06F 11/0745 |
| 2020/0201787 A1 | 6/2020 | Shanbhogue et al. | |
| 2020/0202013 A1* | 6/2020 | Caspi | G06F 21/79 |
| 2020/0310972 A1* | 10/2020 | Shanbhogue | H04L 9/32 |
| 2021/0064546 A1* | 3/2021 | Zmudzinski | G06F 11/0772 |
| 2021/0067334 A1 | 3/2021 | Angel | |
| 2022/0019698 A1* | 1/2022 | Durham | G06F 9/45533 |

OTHER PUBLICATIONS

Shi et al., "Architectural Support of Multiple Hypervisors over Single Platform for Enhancing Cloud Computing Security", ACM, 2012, 10 pages.
European Search Report and Search Opinion, EP App. No. 20198333.5, dated Mar. 9, 2021, 8 pages.
Gueron, Shay, "A Memory Encryption Engine Suitable for General Purpose Processors" IACR Cryptol. ePrint Arch., Feb. 2016, pp. 1-14.
Kounavis et al., "Cryptographic Constructions Supporting Implicit Data Integrity", Available Online at <https://eprint.iacr.org/2018/534.pdf>, May 2018, pp. 1-56.
Non-Final Office Action, U.S. Appl. No. 16/023,683, dated Apr. 29, 2020, 23 pages.
Notice of Allowance, U.S. Appl. No. 16/023,683, dated Oct. 20, 2020, 22 pages.
European Search Report and Search Opinion, EP App. No. 21197466.2, dated Mar. 2, 2022, 9 pages.
Non-Final Office Action, U.S. Appl. No. 16/728,712, dated Mar. 1, 2022, 20 pages.

* cited by examiner

| Memory 300 | | |
|---|---|---|
| Upper Memory 305 | CMR N-1 360 | Island M-1 385<br>Key Table M-1 |
| | ... | ... |
| | CMR 6 355 | Island 3 380<br>Key Table 3 |
| | CMR 5 350 | Island 2 375<br>Key Table 2 |
| | Non-TDIX 345 | |
| | CMR 4 340 | |
| | CMR 3 335 | Island 1<br>Key Table 1 370 |
| | Non-TDIX 330 | |
| | CMR 2 325 | |
| | CMR 1 320 | Island 0 365<br>Key Table 0 |
| Lower Memory 310 | CMR 0 315 | |

FIG. 3

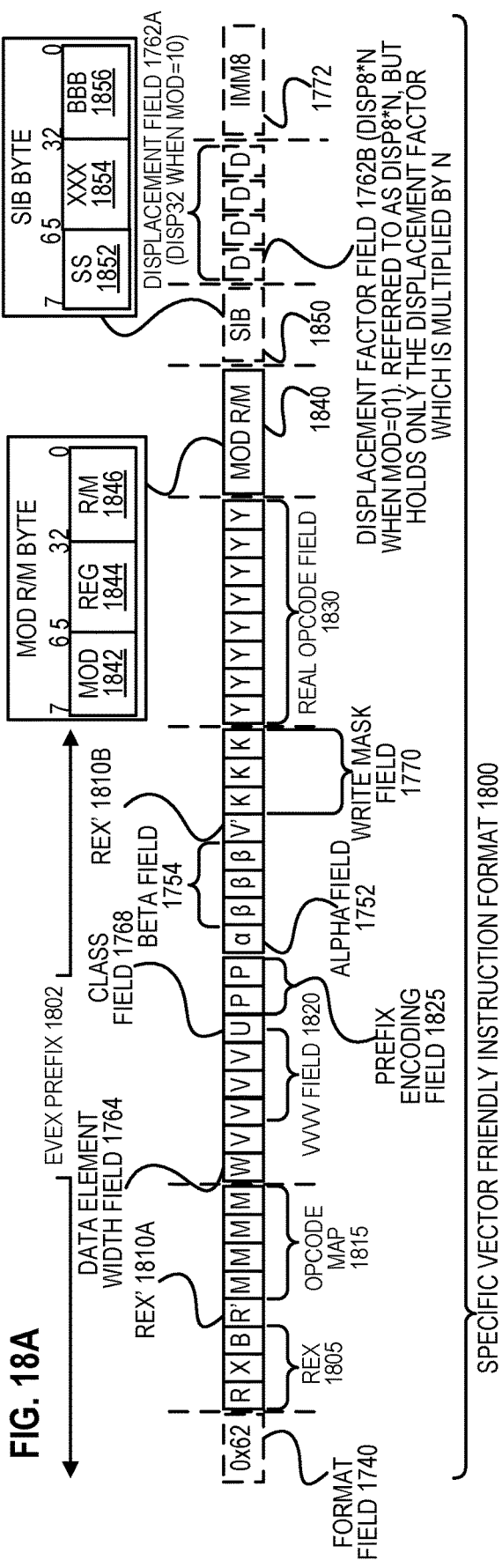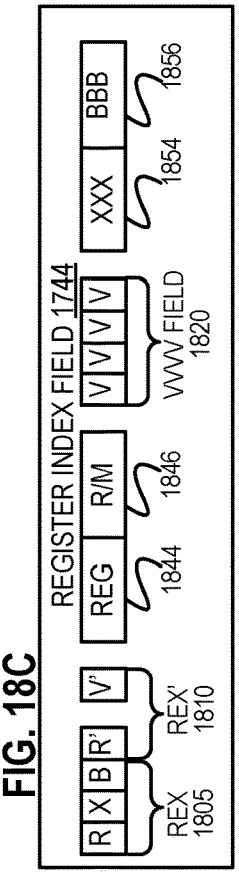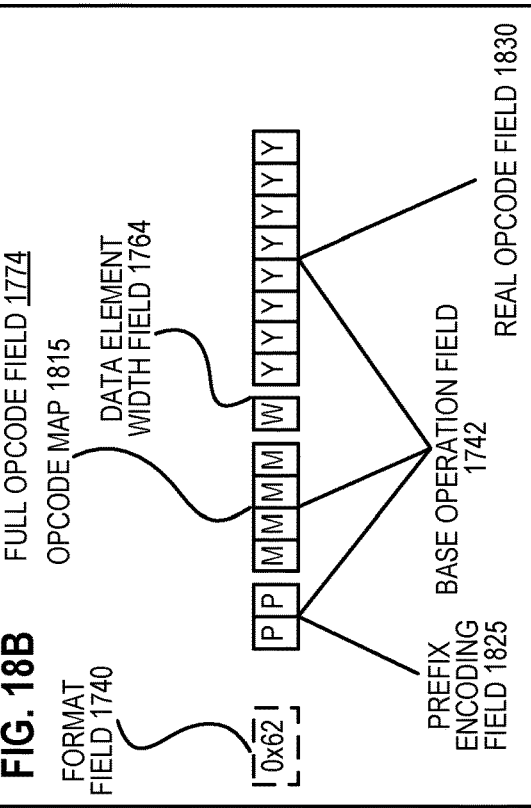

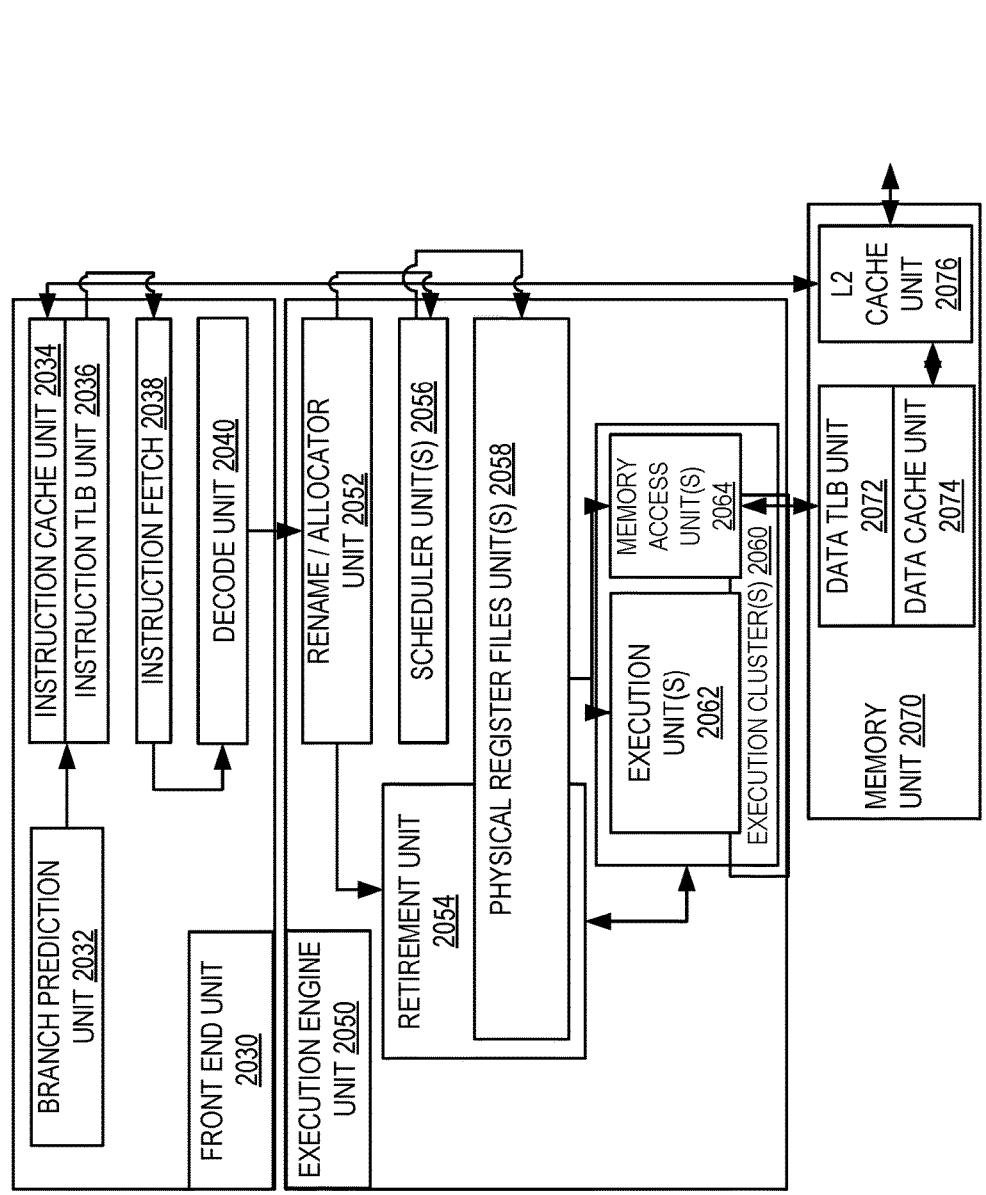

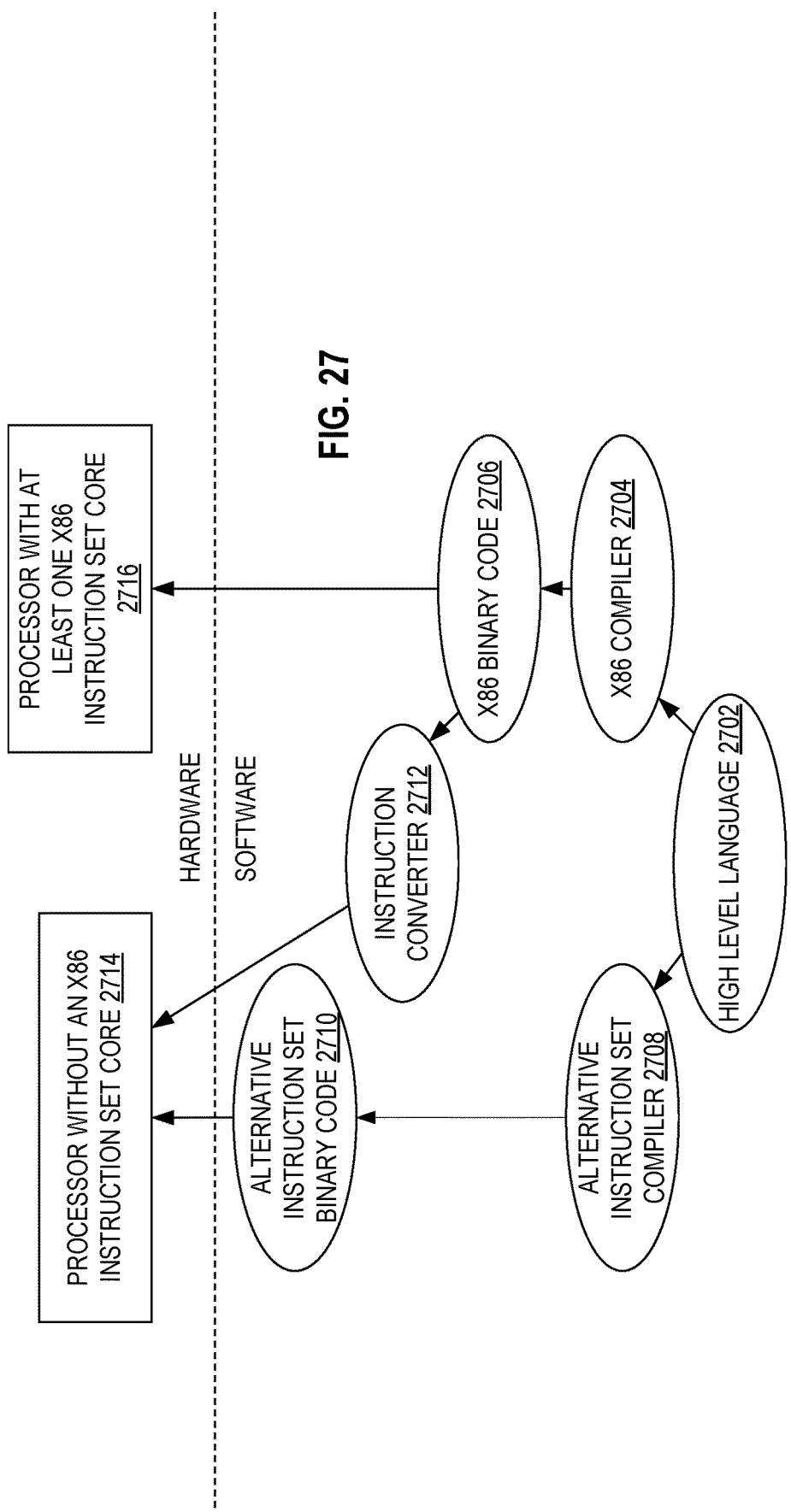

TDX ISLANDS WITH SELF-CONTAINED SCOPE ENABLING TDX KEYID SCALING

FIELD OF THE INVENTION

The field of invention relates generally to computer processor architecture, and, more specifically, to Trust Domain Island Extension (TDIX) islands with self-contained scope to enable TDIX KeyID scaling.

BACKGROUND

Modern processing devices employ disk encryption to protect data at rest. However, data in memory is in plaintext and vulnerable to attacks. Attackers can use a variety of techniques including software and hardware-based bus scanning, memory scanning, hardware probing, etc. to retrieve data from memory. This data from memory could include sensitive data, including privacy-sensitive data, IP-sensitive data, and also keys used for file encryption or communication. The exposure of data is further exacerbated with the current trend of moving data and enterprise workloads into the cloud utilizing virtualization-based hosting services provided by cloud service providers.

BRIEF DESCRIPTION OF THE DRAWINGS

The present invention is illustrated by way of example and not limitation in the figures of the accompanying drawings, in which like references indicate similar elements and in which:

FIG. 3 illustrates an embodiment of a memory map of a computing system that provides isolation in virtualized systems using trust domain island (TDI) islands;

FIG. 17A is a block diagram illustrating a generic vector friendly instruction format and class A instruction templates thereof according to some embodiments of the invention;

FIG. 17B is a block diagram illustrating the generic vector friendly instruction format and class B instruction templates thereof according to some embodiments of the invention;

FIG. 18A is a block diagram illustrating an exemplary specific vector friendly instruction format according to some embodiments of the invention;

FIG. 18B is a block diagram illustrating the fields of the specific vector friendly instruction format that make up the full opcode field according to one embodiment;

FIG. 18C is a block diagram illustrating the fields of the specific vector friendly instruction format that make up the register index field according to one embodiment;

FIG. 20A is a block diagram illustrating both an exemplary in-order pipeline and an exemplary register renaming, out-of-order issue/execution pipeline according to some embodiments;

FIG. 20B is a block diagram illustrating both an exemplary embodiment of an in-order architecture core and an exemplary register renaming, out-of-order issue/execution architecture core to be included in a processor according to some embodiments;

FIG. 21A is a block diagram of a single processor core, along with its connection to the on-die interconnect network and with its local subset of the Level 2 (L2) cache, according to some embodiments;

FIG. 21B is an expanded view of part of the processor core in FIG. 21A according to some embodiments;

FIG. 23 shown a block diagram of a system in accordance with some embodiments;

FIG. 24 is a block diagram of a first more specific exemplary system in accordance with some embodiment;

FIG. 25 is a block diagram of a second more specific exemplary system in accordance with some embodiments;

FIG. 26 is a block diagram of a System-on-a-Chip (SoC) in accordance with some embodiments; and FIG. 27 is a block diagram contrasting the use of a software instruction converter to convert binary instructions in a source instruction set to binary instructions in a target instruction set according to some embodiments.

DETAILED DESCRIPTION OF THE EMBODIMENTS

Figure 1:
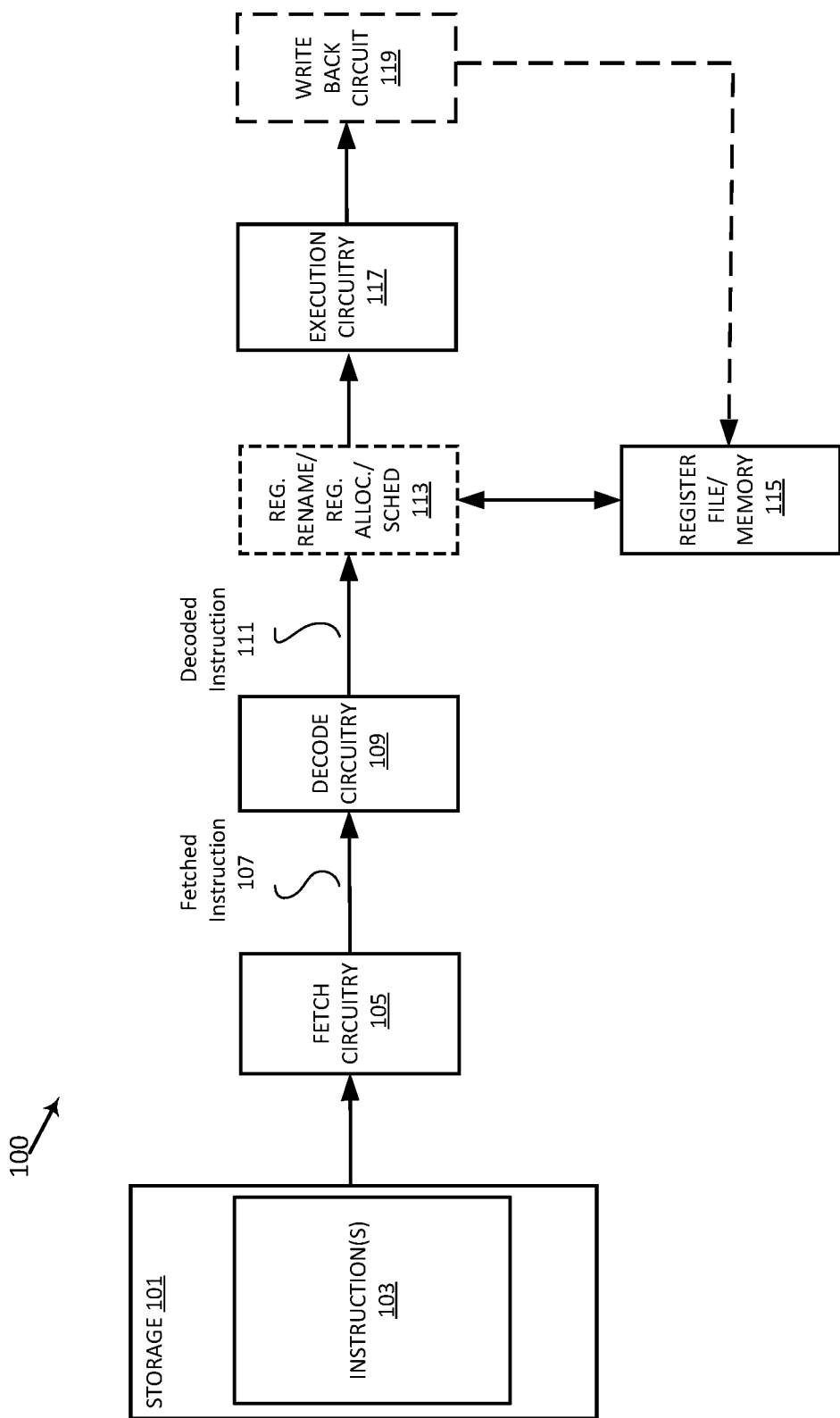
FIG. 1 is a block diagram illustrating processing components for executing instructions, according to some embodiments.

In the following description, numerous specific details are set forth. However, it is understood that some embodiments can be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described includes a feature, structure, or characteristic, but every embodiment need not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed herein are embodiments of an invention built on a Trust Domain Island Extension (TDIX) Architecture. The TDIX architecture enables 1) Total Memory Encryption, 2) Multi-key Memory Encryption, and 3) Trust domain islands based on usage and security requirements.

In implementations of this disclosure, a TDI architecture and instruction set architecture (ISA) extensions (referred to herein as Trust Domain Island Extension (TDIX)) architecture is provided. The TDIX architecture disclosed herein is sometimes referred to simply as a Trust Domain Extension (TDX) architecture, where a trust domain shares many of the same features as a trust domain island, but does not limit the scope of host key identifiers to an "island."

Trust Domain Islands/Trust Domains

TDX and TDIX both exhibit certain advantages: they allow for multiple secure TDIs (or TDs) corresponding to different client machines (e.g., VMs), guest operating systems, host operating systems, hypervisors, or the like. Additionally, different applications run by the same client within the same guest OS can be executed securely using multiple TDIs (or TDs). Each TDI (or TD) can use one or more private keys that are not available to software executing outside the trust domain. In some embodiments, software executing in one TDI (or TD) has access to private keys specific to that particular trust domain island and to shared keys that can be used by multiple TDIs. For example, a software program running inside a TDI can use a private key for its secure execution (e.g., read, write, execute operations), and the same software can use a shared key to access structures or devices shared with other TDIs (e.g., printers, keyboard, mouse, monitor, network adapter, router, etc.).

A TDI can be secured even from privileged users, such as the OS (either host or guest), VMM, basic input/output system (BIOS) firmware, system management mode, and the like. Therefore, even if malicious software takes over a privileged trust domain island, such as the OS, sensitive data stored in memory in the TDI will remain protected.

Each TDI can operate independently of other TDIs and use logical processor(s), memory, and I/O assigned by a trust domain island resource manager (TDIRM). The TDIRM can operate as part of the host OS, the hypervisor, or as a separate software program, and has full control of the cores and other platform hardware. The TDIRM assigns logical processors (e.g., execution threads of a physical processor) to TDIs, however, cannot access the TDI's execution state on the assigned logical processor(s). Similarly, a TDIRM can assign physical memory and I/O resources to the TDIs, but cannot be privy to access the memory state of a TDI due to the use of separate encryption keys. Software executing in a TDI can operate with reduced privileges (e.g., tenant software may not have full access to all resources available on the host system) so that the TDIRM can retain control of platform resources. However, the TDIRM cannot affect the confidentiality or integrity of the TDI state in memory or in the CPU structures under defined circumstances.

TDI Resource Manager/TDI Control Structure/TDI Protected Memory

Accordingly, the disclosed method of creating a trusted execution domain base on a trust domain island includes initializing, by a processing device executing a trust domain island resource manager (TDIRM), a trust domain island control structure (TDICS) and a trust domain island protected memory (TDIPM) associated with a trust domain island (TDI). The method further includes generating a one-time cryptographic key, assigning the one-time cryptographic key to an available host key identifier (HKID) in a multi-key total memory encryption (MK-TME) engine, and storing the HKID in the TDICS. The method further includes associating a logical processor to the TDI, adding a memory page from an address space of the logical processor to the TDIPM, and transferring execution control to the logical processor to execute the TDI.

In some embodiments, the TDIRM, TDICS, TDIPM, etc. operate on and are associated with Trust domain islands (TDIs). But in other embodiments, those elements operate on trust domain islands. Trust domain islands are conceptually similar to trust domains, but relate to an "island" environment, which offers a self-contained scope of host key identifiers. Since the scope is limited to the bounds of an island, multiple islands can have identical host key identifiers. Therefore, the number of KeyIDs available for the platform is increased in proportion to the number of islands defined. For example, a TD island can encompass a socket, there being multiple sockets in the system. Or, a TD island can encompass one or more memory controllers. Though they are conceptually similar, the concepts of TDIRM, TDICS, TDIPM, etc. are sometimes referred to as TDIRM, TDICS, TDIPM, and so on, where the "I" means the term is associated with an "island".

Creating and Destroying Trust Domain Islands

Aspects of the present disclosure are directed to creating and destroying a trust domain island (TDI). A TDI refers to a secure software execution environment that can support a customer (e.g., tenant) workload. The tenant workload can include an operating system (OS), along with other applications running on top of the OS. The tenant workload can also include a virtual machine (VM) running on top of a virtual machine monitor (VMM), along with other applications.

Conventional cloud server computing environments provide remote computing resources and remote data storage resources for various devices. While a tenant is accessing remote computing and data storage provided by a cloud service provider (CSP), it is especially important for data to be protected from access by unauthorized persons and malicious software. Unencrypted plaintext data residing in memory, as well as data moving between the memory and a processor, can be vulnerable to a variety of attacks. Attackers can use a variety of techniques (e.g., bus scanning, memory scanning, etc.) to retrieve data from memory. In some instances, data includes keys or other information used to encrypt sensitive data.

Total Memory Encryption and Multi-Key Total Memory Encryption

Total Memory Encryption (TME) technology provides one solution to protect data in memory. TME allows memory accesses by software executing on a processor core to be encrypted using an encryption key. For example, the encryption key can be a 128-bit key generated at a boot time and used to encrypt data sent to external memory buses. In particular, when the processor makes a write request to memory, the data can be encrypted by a memory encryption engine before being sent to memory, where it is stored in an encrypted form. When the data is read from memory, the data is sent to the processor in the encrypted form and is decrypted by the encryption key when it is received by the processor. Because data remains in the processor in the form of plaintext, the TME technology does not require modification to the existing software and how the existing software interacts with the processor.

A Multi-Key Total Memory Encryption (MK-TME) technology is an extension of TME technology that provides support for multiple encryption keys. This allows for compartmentalized memory encryption. For example, the processor architecture can allow multiple encryption keys to be generated during the boot process (i.e., the operations performed by a computing system when the system is first powered on), which are to be used to encrypt different memory pages. Key identifiers (IDs) associated with the encryption keys can be used by various hardware and software components as part of the TME and MK-TME technologies. The multi-key extension is particularly suited to work with multi-trust domain island architectures, such as architectures used by CSPs because the number of supported keys can be implementation dependent.

In some implementations, CSPs have a choice to designate pages of a VM to be encrypted using a VM-specific key. In other instances, a CSP chooses specific VM pages to remain in plaintext or to be encrypted using different ephemeral keys that can be opaque to software. A MK-TME engine can be used to support different pages to be encrypted using different keys. The MK-TME engine can support at least one key per trust domain island and therefore achieve cryptographic isolation between different workloads present on a CSP. A workload can be associated with a tenant or owner (e.g., an entity that leases usage of the host server from the CSP).

TDIX Architecture Interoperating with Virtual Machine Extensions

The Trust Domain Island Extension (TDIX) architecture can operate concurrently with other virtualization architecture extensions, such as VMX (Virtual Machine Extensions). VMX allows multiple operating systems to simultaneously share processor resources in a safe and efficient manner. A computing system with VMX can function as multiple virtual systems or VMs. Each VM can run operating systems and applications in separate partitions. VMX also provides a layer of system software called the virtual machine monitor (VMM), used to manage the operation of virtual machines (c.f., TDIRM).

VMX can provide a virtual machine control structure (VMCS) to manage VM transitions (e.g., VM entries and VM exits). A VM entry is a transition from VMM into VM operation. VM entries can be triggered by an instruction executed by the VMM. A VM exit is a transition from VM operation to the VMM. VM exits can be triggered by hardware events requiring an exit from the VM. For example, a page fault in a page table supporting the VM can cause a VM exit. The VMCS can be a 6-part data structure to manage VM transitions. The VMCS can keep track of: a guest state area (e.g., the processor state when a VM exit occurs, which is loaded on VM entries); a host state area (e.g., the processor state that is loaded on VM exits); VM execution control fields (e.g., fields that determine the causes of VM exits); VM exit control fields; VM entry control fields; and VM exit information fields (e.g., files that receive information on VM exits and describe the cause and nature of the VM exit).

In some implementations, TDIX operates as a substitute for VMX, which includes many of the features of VMX and adds an additional layer of security, in accordance with embodiments described herein. In other implementations, TDIX operates concurrently with VMX. For example, a CSP host server running virtualization architecture (e.g., VMX) may need to utilize both MK-TME technology and TDIX architecture for efficient execution of tenant software. In some embodiments, MK-TME encryption circuits use a Ciphertext-Stealing Advanced Encryption Standard (XTS-AES) in compliance with IEEE 1619, an Institute of Electronics and Electrical Engineers standard. A host server can execute highly sensitive applications within TDIs so that even the hypervisor executing VMs does not have access to the memory pages and encryption keys allocated to a TDI and its trusted computing base (TCB). A TCB refers to a set of hardware, firmware, and/or software components that have an ability to influence the trust for the overall operation of the system. At the same time, the host server can run applications that demand less security and isolation using MK-TME technology where the hypervisor retains control over memory pages and encryption keys used in these less-sensitive applications. The VMM can then isolate different applications from each other using different MK-TME keys, but still remain in the TCB of each application.

Aspects of the present disclosure, in various implementations, address the need to enable coexistence of the MK-TME technology and the TDIX architecture. In some implementations, the disclosed computing system ensures that key IDs allocated to TDIs cannot be used by MK-TME software, such as the hypervisor or VMs running outside the TCB of the TDI. In related implementations, the disclosed architectures ensure that no key ID that is designated as a restricted key ID for the TDI can be used concurrently by two active TDIs. It can also be desirable, for additional safety of data stored in TDIs, that key IDs of extinct TDIs be reallocated to other TDIs after all cache data associated with the extinct TDI is flushed.

Accessing Shared Data Structures

Moreover, even within a highly secure TDI, a client may need to communicate with shared structures, e.g., shared hardware devices. For example, input-output (I/O) devices, printers, network adapters, routers, or other processing devices, and the like, can be used by multiple TDIs and by the hypervisor running VMs using the MK-TME protections. In some implementations, the access to such shared structures is secured (from other applications or external malicious attacks) by encrypting memory transactions related to operations of the shared structures. Accordingly, a TDI may need to be able to use different encryption keys: at least one restricted key for its secure operations and access to the TDI's private memory pages and at least one non-restricted key for the TDI's communications with the shared structures. Software operating in a TCB of a TDI may attempt to use a non-restricted key for memory transactions involving private memory pages. For example, trusted software can attempt to write data into a private memory page using a non-restricted key. In the absence of a hardware protection disclosed in the instant specification, such data may be vulnerable to a software access (e.g., a read operation) from a program outside the TCB that may gain access to the shared non-restricted key.

Some systems for providing isolation in virtualized systems do not remove the CSP software out of the tenant's TCB completely. Furthermore, such systems can increase the TCB significantly using separate chipset subsystems that implementations of this disclosure avoid. The TDI architecture of this disclosure provides isolation between customer (tenant) workloads and CSP software by removing the CSP software from the TCB, thus explicitly reducing the TCB. Implementations provide a technical improvement over alternate systems by providing secure isolation for CSP customer workloads (tenant TDIs) and allow for the removal of CSP software from a customer's TCB while meeting security and functionality requirements of the CSP. In addition, the TDI architecture is scalable to multiple TDIs, which can support multiple tenant workloads. Furthermore, the TDI architecture described herein can be applied to any dynamic random access memory (DRAM), or storage class memory (SCM)-based memory, such as Non-Volatile Dual In-line Memory Module (NV-DIMM). As such, disclosed embodiments allow software to take advantage of performance benefits, such as NVDIMM direct access storage (DAS) mode for SCM, without compromising platform security requirements.

A variety of technologies have emerged attempting to make systems and memory secure, especially as more and more enterprise data is moving to the Cloud. Emerging technologies include Total Memory Encryption (TME), mentioned above, where data moving to memory from a core is encrypted in hardware and decrypted on its way back to the core, again in hardware. The Multi-Key TME (MK-TME) is an enhancement to TME that allows use of multiple keys (the number of supported keys is implementation dependent) and software configurable to allow different pages to be encrypted using different keys. The MK-TME engine supports a key per trust domain island/tenant (each trust domain island can be viewed as running an independent workload) and help achieve the cryptographic isolation, for example as between different CSP workloads.

Disclosed embodiments provide an improved memory system. The Trust Domain Island Extension (TDIX) architecture defines a capability, sometimes used in a system-on-a-chip (SoC) context, that provides Isolation between customer or tenant workloads and the cloud service provider (CSP) software. Key components of the TDIX architecture include some of the aspects described above, including: 1) memory encryption via a Total Memory Encryption (TME) engine and Multi-key extensions to TME (MK-TME), 2) software resource management layer (TDI-RM) and 3) execution state and memory isolation capabilities, for example, in a system on a chip (SoC). The TDIX architecture provides an advantage to software: namely, the ability to deploy 1) Total Memory Encryption, 2) Multi-key Memory Encryption, and 3) trust domain islands based on usage and security requirements.

Secure Arbitration Mode

TDIX is built on top of Secure Arbitration Mode (SEAM), which is an extension of VMX and MK-TME. The TDIX-SEAM module, running in SEAM mode, serves as a trusted intermediary between the host VMM and the guest TDIs. Since TDIX is built on top of MK-TME, it relies on the same architecture for the available number of encryption keys and can suffer from some of the same limitations, i.e., the number of available KeyIDs may be limited because they use Physical Address bits. Disclosed embodiments increase the number of KeyIDs for TDIX per platform by limiting the scope to KeyIDs to TDIX islands.

Creating, Deploying, Using, and Destroying Trust Domain Islands

Accordingly, disclosed herein are embodiments of an invention using TDIX islands, which are self-contained memory partitions where the TDI KeyID scope is contained within the island. For example, if a TDIX island is defined as a socket, then the KeyIDs would scale further by number of sockets on the platform, since they would be unique on a per socket basis. This allows scaling of KeyIDs beyond the Physical Address bit constraints, based on the number of islands per platform.

Advantages of disclosed embodiments include: 1) support for (Trust Domain Island Extension) architecture which provides a high assurance security environment, including, for example, CSP workloads running tenant software; 2) ability to scale TDIX keys or KeyIDs beyond the physical address bit constraints; and 3) support for TDIX islands could be implemented as a SEAM/SW upgrade to a system using the TDIX architecture.

Some alternate, inferior approaches that do not take advantage of TD islands do not support many TDIX capabilities, such as memory integrity, EPT (Extended Page Tables) and then which is a major limitation for deployment in cloud scenarios. Neither do alternate approaches take advantage of a key concept for TD islands for key scaling.

As mentioned above, the Trust Domain Island Extension (TDIX) architecture extends Virtual Machines Extensions (VMX) with a new kind of virtual machine guest called a Trust Domain Island (TDI). A TDI runs in a CPU mode which protects the confidentiality of its memory contents and its CPU state from any other software, including the hosting Virtual Machine Monitor (VMM), unless explicitly shared by the TDI itself. TDIX is built on top of Secure Arbitration Mode (SEAM), which is an extension of VMX and MK-TME. The Intel TDIX-SEAM module, running in SEAM mode, is a kind of a parallel VMM that serves as an intermediary between the host VMM and the guest TDIs. Since TDIX is built on top of MK-TME, it relies on the same architecture for number of encryption keys and suffers from some of the same limitations (i.e., limited number of KeyIDs) because they use physical address bits. Embodiments of the present disclosure provide a way to increase the number of KeyIDs per platform by limiting the scope to KeyIDs to individual TDIX islands. For example, if a TDIX island is a socket, then the KeyIDs would scale further by a number of sockets on the platform.

More specifically, disclosed embodiments secure the benefits of the invention by performing one or more of the following algorithms:

1) Partition memory made available for use with TDIX into islands, where an island is a contiguous physical memory range, and can span over a few TDIX configurable memory ranges (CMRs). A single CMR can support multiple islands. For an example of partitioning memory into TD islands, see the discussion of FIG. 3, below.

2) Ensure that all memory allocated, for example by a VMM, to a TDI (by VMM) resides in (restricted to) a single island. Use SEAM as a trusted intermediary between memory and processor cores to check and enforce that each TDI is limited to a single island. Allocation of all TDIs private page to a single island is Enforced/checked by SEAM.

3) Each island is allocated (Associated with) a separate memory encryption Key Table (to encrypt island memory). Memory transactions targeted to an island are encrypted with a key selected from the island's Unique Key Table (Based on memory transaction KeyID).

4) Memory partitioning to islands is set and locked at system boot time. In some embodiments, the partitioning is performed by the BIOS (Built-In Operating System) based on hardware support for the number of key tables and associated islands. After partitioning, the BIOS can report the setup, i.e., memory ranges associated with each island, in an Advanced Configuration and Power Interface (ACPI) table. In some embodiments, the configuration is checked and validated by secure system software (e.g., MCHECK function can be used to check consistency among allocated partitions.)

Once configured, according to some embodiments, the VMM and TDIRM can support continued exploitation of advantages of the invention. For example, at TDI creation time (TDICREATE), the VMM and TDIRM can assign (restrict) a TDI to one of the islands in the system. As a further example, when allocating and mapping private pages to TDIs, the VMM and TDIRM only allocate/map pages in the island TDIs was assigned at creation time. Further benefits can be achieved when launching TDI memory encryption, launch TDI key programming only to the Key Table associated with the island allocated to the TDI (using TDICONFIGKEYS). When de-scheduling TDI flush only the caches that map to the TD island, i.e., before allocating the TDIs reclaimed KeyID to a newly scheduled TDI.

Disclosed embodiments therefore support memory management and mapping on a per-island basis. Furthermore, disclosed embodiments support TD island assignment at creation time (e.g., at TDICREATE), and ensure that all TDI private pages are only assigned to a TDI assigned to that island. Support configuring memory encryption Key per island (TDICONFIGKEYS).

It should be noted that disclosed embodiments support cache flushes (TBWBINVD) on a per-island basis, which has performance benefit as it does not flush all caches in the system.

As mentioned above, due to the self-contained scope of encryption host key IDs, the TD islands in disclosed embodiments, the number of KeyIDs available for the platform is increased. For example, when each TD island is mapped to one of multiple sockets in a platform, the number of host key identifiers (HKIDs) in the system is equal to a number of sockets in the system multiplied by a number of entries in the key ownership table (KOT). For another example, when each TD island is mapped to one of multiple memory controllers in each of multiple sockets in a platform, a number of HKIDs in the system is equal to a number of sockets multiplied by a number of memory controllers in each socket, multiplied by a number of entries in the KOT.

FIG. 1 is a block diagram illustrating processing components for executing instructions, according to some embodiments. As illustrated, storage 101 stores instruction(s) 103 to be executed. In operation, instruction(s) 103 is fetched from storage 101 by fetch circuitry 105. The fetched instruction 107 is decoded by decode circuitry 109 to generate decoded instruction 111. In some embodiments, this decoding includes generating a plurality of micro-operations to be performed by execution circuitry (such as execution circuitry 117). The decode circuitry 109 also decodes instruction suffixes and prefixes (if used).

In some embodiments, register renaming, register allocation, and/or scheduling circuit 113 provides functionality for one or more of: 1) renaming logical operand values to physical operand values (e.g., a register alias table in some embodiments), 2) allocating status bits and flags to decoded instructions, and 3) scheduling decoded instructions for execution on execution circuitry 117 out of an instruction pool (e.g., using a reservation station in some embodiments).

Registers (register file) and/or memory 115 store data as operands of the instructions to be operated on by execution circuitry 117. In some embodiments, write back circuit 119 commits results of executed instructions.

Exemplary register types include writemask registers, packed data registers, general purpose registers, and floating-point registers, as further described and illustrated below, at least with respect to FIG. 19. Execution circuitry 117 and system 100 are further illustrated and described with respect to FIGS. 2-16, 20A-B, and 21A-B.

Figure 2A:
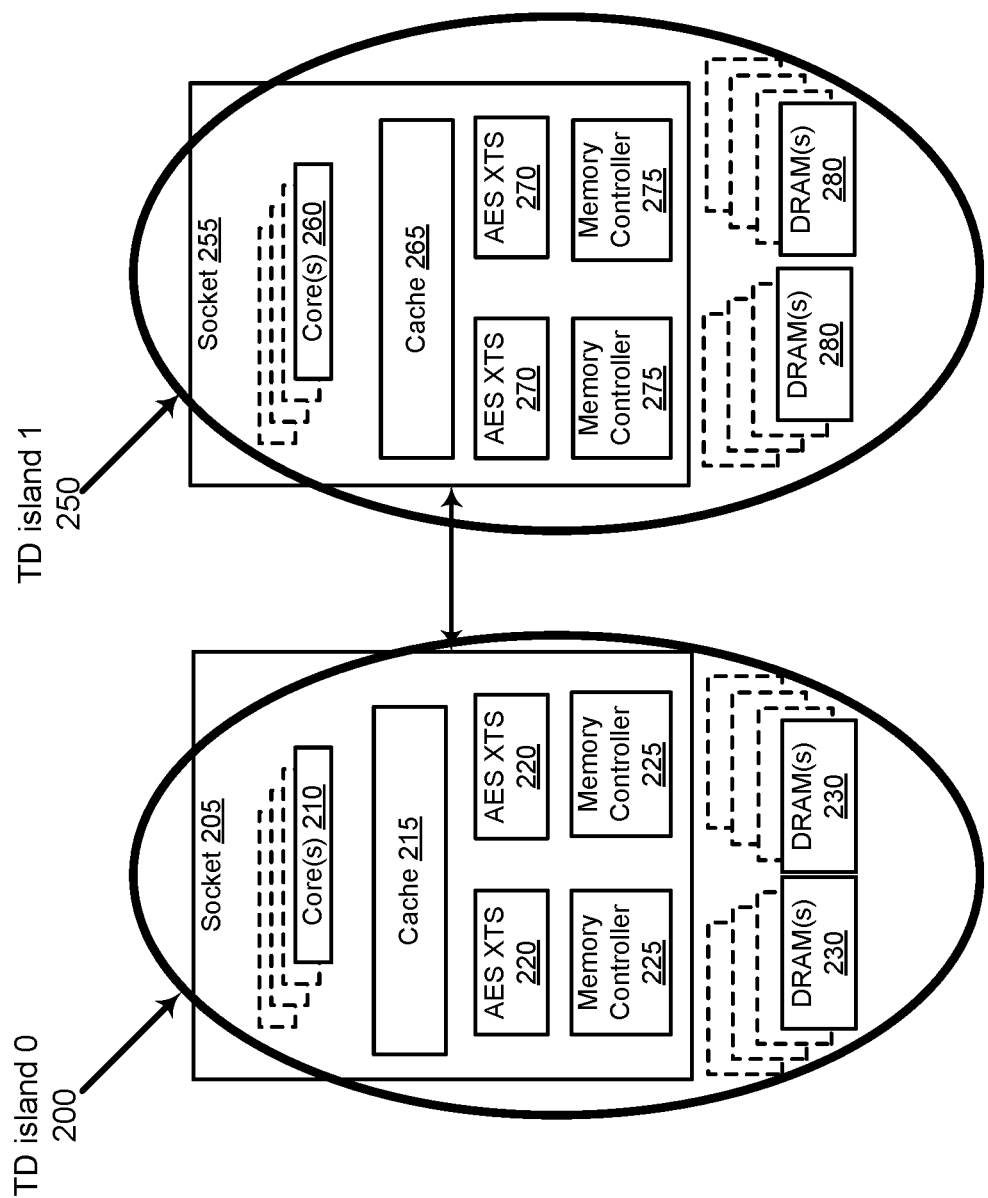
FIG. 2A illustrates a block diagram of an embodiment of a multi-socket computing system that provides isolation in virtualized systems using trust domain island (TDI) islands mapped to sockets.

FIG. 2A illustrates a block diagram of an embodiment of a multi-socket computing system that provides isolation in virtualized systems using trust domain island (TDI) islands mapped to sockets. As shown, a system having two sockets has a TD island mapped to each socket. TD island 200 is mapped to socket 205, which includes one or more core(s) 210, a cache 215, two AES XTS 220 encryption circuits, two memory controllers 225, and two sets of one or more DRAM(s) 230. TD island 255 is mapped to socket 255, which includes one or more core(s) 260, a cache 265, two AES XTS 270 encryption circuits, two memory controllers 275, and two sets of one or more DRAM(s) 280. Each of sockets 205 and 255 is shown, for the sake of simplicity, as including two memory controllers and encryption circuits, but that number can vary without limitation in other embodiments. Advantageously, by using TDIX islands with self-contained scope of KeyIDs, the number of available KeyIDs in the platform is equal to a key table size multiplied by the number of sockets. For example, by using IDX islands, the number of available KeyIDs has been doubled.

Figure 2B:
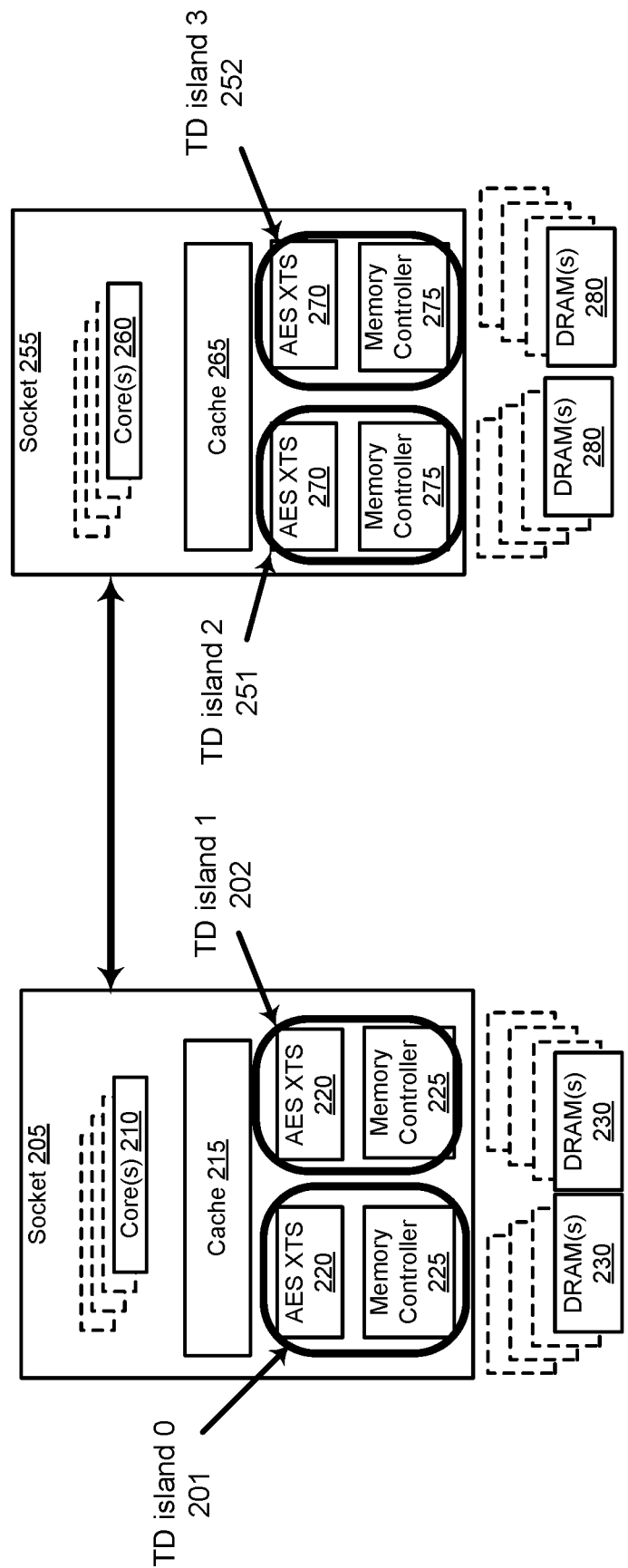
FIG. 2B illustrates a block diagram of an embodiment of a multi-socket computing system that provides isolation in virtualized systems using trust domain island (TDI) islands mapped to memory controllers.

FIG. 2B illustrates a block diagram of an embodiment of a multi-socket computing system that provides isolation in virtualized systems using trust domain island (TDI) islands mapped to memory controllers. As shown, a system having two sockets has a TD island mapped 201, 202, 252, 252 to each memory controller 225, 275. Here, socket 205 includes one or more core(s) 210, a cache 215, two AES XTS 220 encryption circuits, two memory controllers 225, and two sets of one or more DRAM(s) 230. Socket 255 includes one or more core(s) 260, a cache 265, two AES XTS 270 encryption circuits, two memory controllers 275, and two sets of one or more DRAM(s) 280. Each of sockets 205 and 255 is shown, for the sake of simplicity, as including two memory controllers and encryption circuits, but that number can vary without limitation in other embodiments. Advantageously, by using TDIX islands with self-contained scope of KeyIDs, the number of available KeyIDs in the platform is equal to a key table size multiplied by the number of sockets. For example, here, by using TDIX islands mapped to each of the four memory controller 275 and AES XTS 270 combination, the number of available KeyIDs has been quadrupled. Namely, the number of available KeyIDs equals the number sockets, multiplied by the key table size, multiplied by the number of memory controllers per socket.

FIG. 3 illustrates an embodiment of a memory map of a computing system that provides isolation in virtualized systems using trust domain islands (TDIs). As shown, memory 300 has upper memory 305 and lower memory 310 regions. Memory 300 has been partitioned into N configurable memory ranges (CMRs) for use with TDIX islands: CMR 0 315, CMR 1 320, CMR 2 325, CMR 3 335, CMR 4 340, CMR 5 350, CMR 6 355, and CMR N-1 360. Memory 300 also contains two non-TDIX partitions: Non-TDIX 330 and Non-TDIX 345. As shown, memory 300 is also partitioned into M TDIX islands: island 0 365, island 1 370, island 2 375, island 3 380, and island M-1 385, each of which includes a key table. Each of the TDIX islands can be mapped to one or more configurable memory ranges. For example, TDIX island 0 365 is mapped to CMR 0 315 and CMR 1 320.

Figure 4:
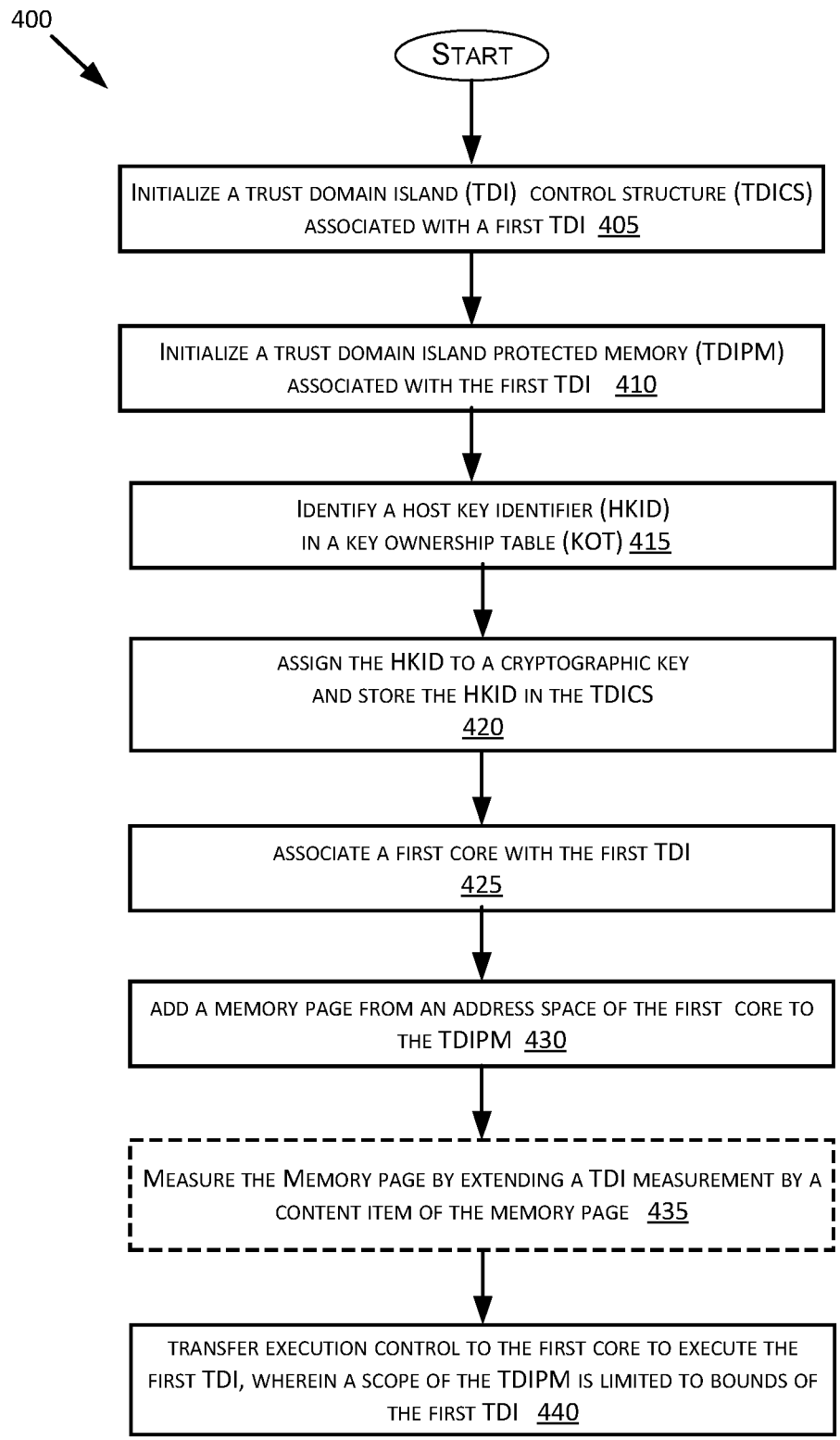
FIG. 4 illustrates a flow diagram of a method of creating a trust domain island (TDI) island, according to an embodiment of a TDI architecture.

FIG. 4 illustrates a flow diagram of a method of creating a Trust Domain Island (TDI) island, according to an embodiment. As shown, a processing device, such as a TDIRM (trust domain island resource manager) is to perform flow 400. As described above, the TDIRM can operate as part of the host OS, the hypervisor, or as a separate software program, and has full control of the cores and other platform hardware.

After starting, the TDIRM at 405 is to initialize a Trust Domain Island Control Structure (TDICS) associated with a first TDI. At 410, the TDIRM is to initialize a trust domain island protected memory (TDIPM) associated with the first TDI.

At 415, the TDIRM is to identify an available host key identifier (HKID) in a key ownership table (KOT). The KOT is a data structure used to manage HKID inventory within a TDIX-enabled system. In some embodiments, a specific number of HKIDs is available for use by all TDIs generated by the TDIRM. The KOT maintains, inter alia, states of all HKIDs available for use by all TDIs created in the system. An HKID can have a state of assigned, free (or available), reclaimed, or configured.

At 420, the TDIRM is to assign the HKID to a cryptographic key and store the HKID in the TDICS. In some embodiments, the TDIRM assigns a one-time cryptographic key to the available HKID (identified at 415) on a multi-key total memory encryption (MK-TME) engine. The TDIRM can execute an instruction (e.g., TDCONFIGKEY) to configure the one-time cryptographic key and the available HKID for use by an encryption engine, such as encryption engine 554 of FIG. 5, which operates on the TDI. The TDCONFIGKEY instruction corresponds to the PCONFIG instruction used to define and/or configure a protected domain, such as the configurable memory domains of memory 300 illustrated and described with respect to FIG. 3. By executing the TDCONFIGKEY instruction, the TDIRM causes a memory protection controller of a MK-TME engine (e.g., memory protection controller 842 of FIG. 8) to program the key and a protection mode for the TDI. The memory protection controller may then return a status code to the TDIRM indicating that the key has been configured.

At 425, the TDIRM is to associate a first core with the first TDI. For example, the TDIRM can associate a logical processor with the first TDI, which may operate on the associated logical processor. In some embodiments, the TDIRM acts as a full host and exercises control over the logical processor and the processing core on which the logical processor is operating. The actions required to associate a logical processor with the TDI are described in further detail with respect to FIG. 11.

At 430, the TDIRM is to add a memory page from an address space of the first core to the TDIPM. For example, the TDIRM adds a memory page from the address space of a logical processor to the TDIPM, as described in more detail with respect to FIG. 12.

In some embodiments, the TDIRM at 435 measures the memory page by extending a TDI measurement by a content item of the memory page. For example, the TDIRM executes a specific instruction (e.g., TDEXTEND) to extend the TDI measurement with the contents of the added page. A measurement is extended on the TD to prevent the instructions used to create the TD from being used again (e.g., TDCREATE, TDADDPAGE, etc.). The measurement of the TD may be obtained by computing a secure hash over the inputs of instructions used to create the TD and load the initial code and data into its memory (e.g., TDCREATE, TDADD, and TDEXTEND). The measurement may be computed using a secure hashing algorithm so the system software can only build a TD that matches an expected measurement by following the exact sequence of instructions executed by the TDIRM. The TDX design may use a 256-bit SHA-2 secure hash function to compute the measurements. In one embodiment, the TD measurement may be extended on each 256-byte chunk of the page added to TDPM. The measurement is repeated until each 256-byte chunk of the added TD page has been measured. Each TD measurement may be stored in a field of the TDCS.

At 440, the TDIRM is to transfer execution control to the first core to execute the first TDI (as further described with respect to FIG. 13), wherein a scope of the TDIPM is limited to bounds of the first TDI.

Figure 5:
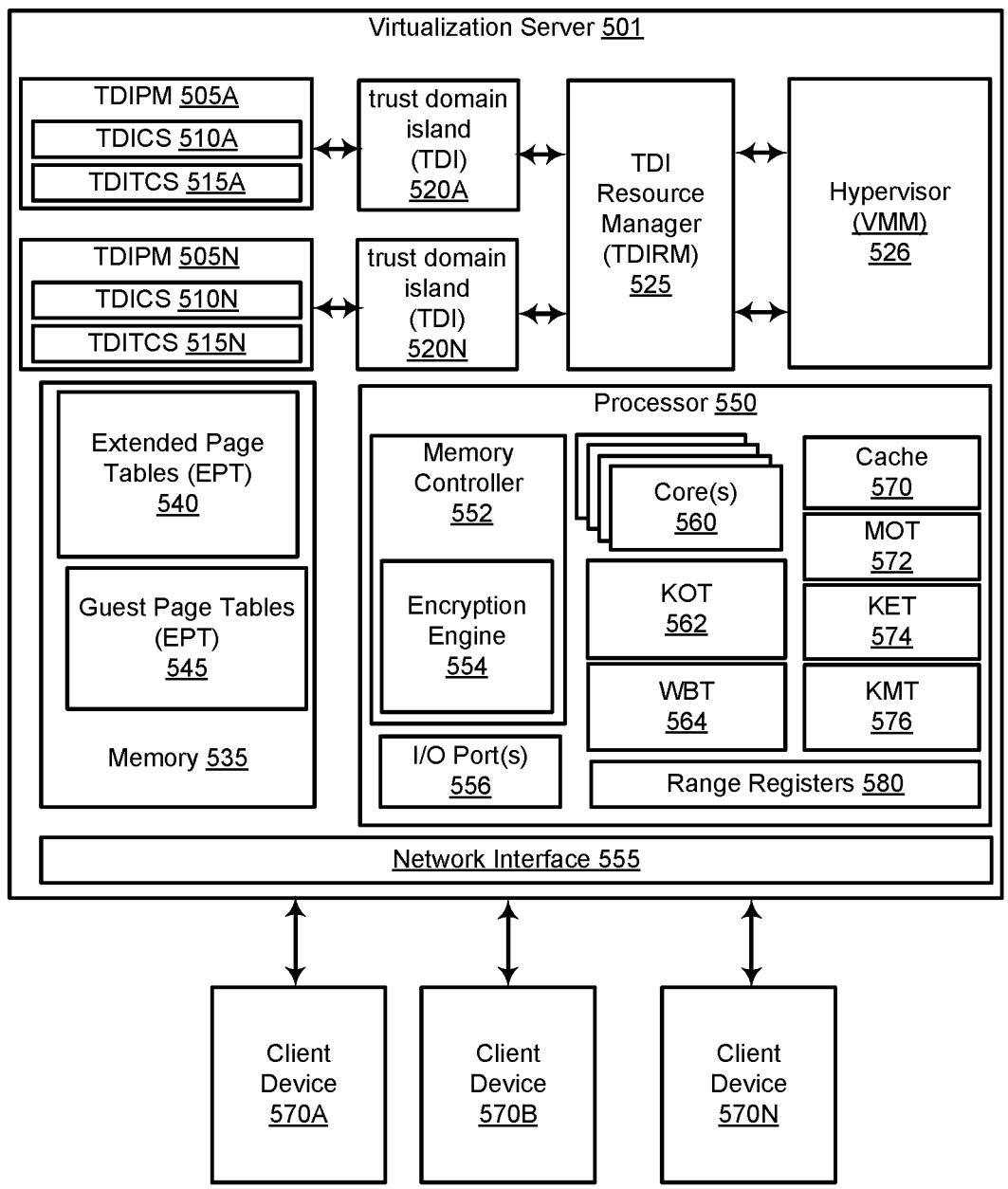
FIG. 5 illustrates a block diagram of an embodiment of a computing system that provides isolation in virtualized systems using trust domain islands (TDIs)

FIG. 5 illustrates a block diagram of an embodiment of a computing system that provides isolation in virtualized systems using trust domain islands (TDIs). In operation, computing system 500 can provide isolation in virtualized systems using TDIs, according to implementations of this disclosure. Computing system 500 can include a virtualization server 501 that includes a processor 550, a memory 535, and a network interface 555. Processor 550 can implement TDI architecture and ISA extensions for the TDI architecture (e.g., TDIX).

Figure 6:
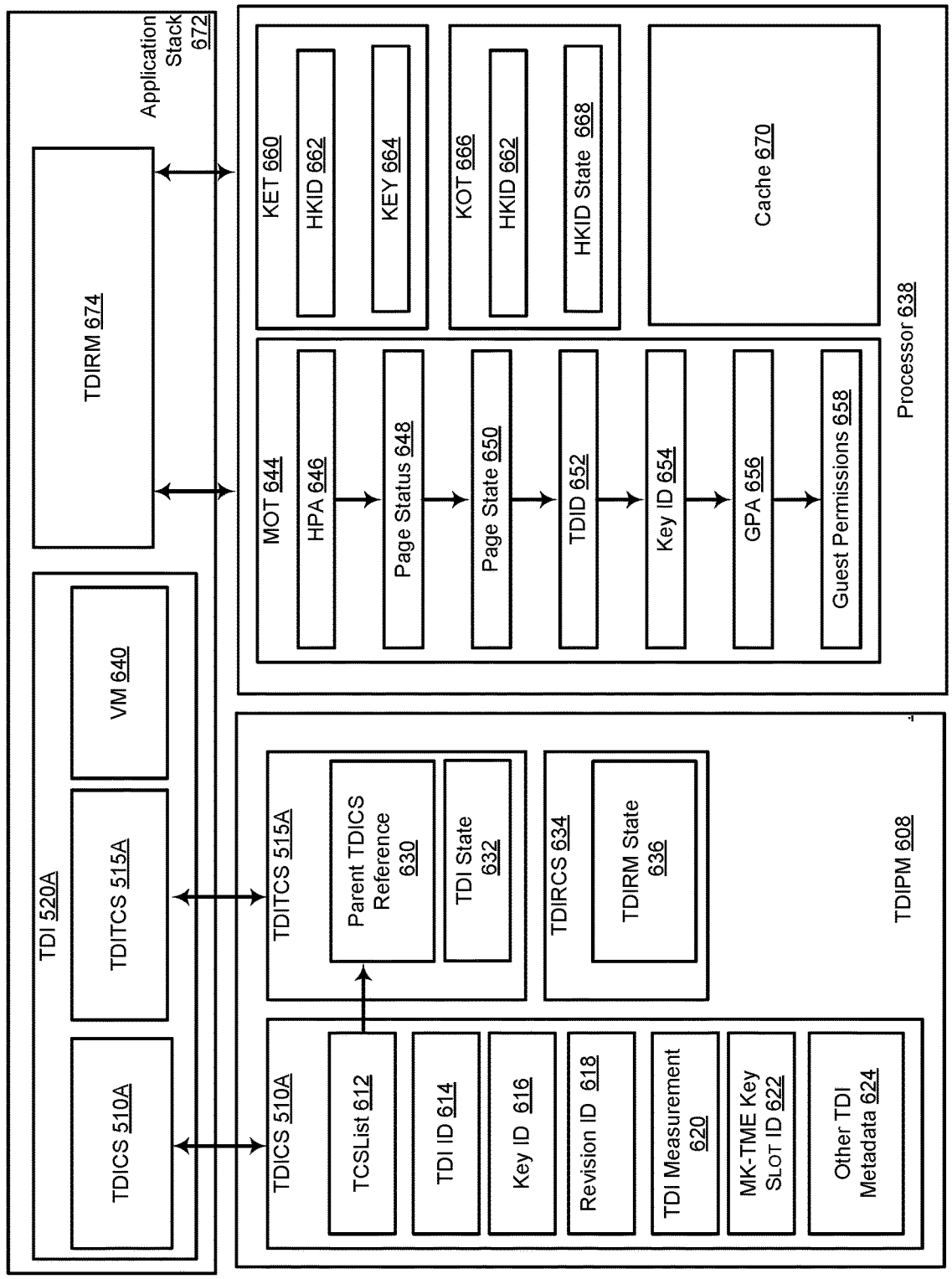
FIG. 6 illustrates a block diagram of another embodiment of a computing system that provides isolation in virtualized systems using trust domain islands (TDIs)

TDI 520A, 520N can be executed as part of the TDI architecture implemented by processor 550. TDI 520A, 520N can refer to a software execution environment to support a customer (e.g., tenant) workload. As shown, TDI 520A includes TDICS 510A, which includes TCSList 612, TDI Identifier 614, Key ID 616, Revision ID 618, TDI measurement 620, MK-TME Key Slot ID 622, and other TDI metadata 624, as shown in FIG. 6. TDI 520A also includes TDITCS 515A, which includes parent TDICS reference 630 and TDI state 632, as shown in FIG. 6. TDI 520A further includes TDIRCS 634, which includes TDIRM state 636. TDICS 510A, TDITCS 515A, and TDIRCS 634 are all running in TDIPM 608.

The tenant workload can include an OS, along with other applications running on top of the OS. The tenant workload can also include a VM running on top of a VMM. The TDI architecture can provide a capability to protect the tenant workload running in a TDI 520A, 520N by providing isolation between TDI 520A, 520N and other software (e.g., CSP-provided software) executing on processor 550. The TDI architecture does not impose any architectural restrictions on the number of TDIs operating within a system, however, software and hardware limitations may limit the number of TDIs running concurrently on a system due to other constraints.

A tenant workload can be executed within a TDI 520A, 520N when the tenant does not trust a CSP to enforce confidentiality. In order to operate in accordance with implementations of this disclosure, a CPU on which the TDI is to be executed must support the TDI architecture. In one embodiment, the tenant workload can include a VM running on top of a VMM. As such, a virtualization mode (e.g., VMX) can also be supported by the CPU on which the TDI is to be executed. In another embodiment, TDI 520A, 520N may not operate using a virtualization mode, but instead may run an enlightened operating system (OS) within TDI 520A, 520N.

The TDI architecture can provide isolation between TDI 520A, 520N and other software executing on processor 550 through functions including memory encryption, TDI resource management, and execution state and management isolation capabilities. Encryption circuit 554 of processor 550 can encrypt data being written to memory 535. In embodiments of this disclosure, encryption engine 554 may be a multi-key total memory encryption (MK-TME) engine. Total Memory Encryption (TME) technology allows memory accesses by software executing on a processor core to be encrypted using an encryption key. Multi-key TME technology may be an extension of TME that provides support for multiple encryption keys, thus allowing for compartmentalized encryption. Memory encryption may be further supported by several key tables maintained by processor 550 (e.g., key ownership table (KOT) 562 and key encryption table (KET) 574). The key tables may be stored in on-chip memory, where the on-chip memory is not directly accessible by software executed by the processing device. The on-chip memory may be physically located on the same chip as the processing core. Resource management capability may be provided by a TDIRM 525. Execution state and management capabilities may be provided by a memory ownership table (MOT) 572 and access-controlled TDI control structures, such as a trust domain island control structure (TDICS) 510A, 510N and a trust domain island thread control structure (TDITCS) 515A, 515N. More detail regarding the function of these components is described below with reference to FIG. 6.

TDIRM 525 represents a resource management layer of the TDI architecture. In some embodiments, TDIRM 525 may be implemented as part of the CSP/root VMM (e.g., a primary VMM that manages machine level operations of VMM and VMs). TDIRM 525 may be a software module included as part of the TDI architecture that manages the operation of TDIs 520A, 520N. TDIRM 525 may act as a host and have control of the processor and other platform hardware. TDIRM 525 may assign software in a TDI with logical processor(s) and may also assign physical memory and I/O resources to a TDI. While TDIRM 525 may assign and manage resources, such as CPU time, memory, and I/O access to TDIs 520A, 520N, TDIRM 525 may operate outside of the TCB of TDIs 520A, 520N. For example, TDIRM may not access a TDI's execution state on the assigned logical processor(s) and may not be privy to access/spoof the memory state of a TDI. This may be enforced by the use of separate encryption keys and other integrity/replay controls on memory.

Virtualization server 501 may support a number of client devices 570A, 570B, to 570N. TDIs may be accessible by client devices 570A, 570B, to 570N via network interface 555. Client devices 570A, 570B, to 570N may communicate with each other, and with other devices, via software executing on processor 550 (e.g., CSP-provided software). TDI 520A, 520N may refer to a tenant workload that client devices 570A, 570B, to 570N execute via processor 550. As discussed previously, the tenant workload may include an OS as well as ring-3 applications running on top of the OS. The tenant workload may also include a VM running on top of a VMM (e.g., hypervisor) along with other ring-3 applications, in accordance with embodiments described herein. Each client device 570A, 570B, to 570N may include, but is not limited to, a desktop computer, a tablet computer, a laptop computer, a netbook, a netbook computer, a personal digital assistant (PDA), a server, a workstation, a cellular telephone, a mobile computing device, a smart phone, an Internet appliance, or any other type of computing device.

Processor 550 may include one or more processing core(s) 560, range registers 580, a memory controller 552 (e.g., a memory management unit (MMU)), and I/O ports 556. Processor 550 may be used in a computing system 500 that includes, but is not limited to, a desktop computer, a tablet computer, a laptop computer, a netbook, a notebook computer, a PDA, a server, a workstation, a cellular telephone, a mobile computing device, a smart phone, an Internet appliance, or any other type of computing device. In another embodiment, processor 550 may be used in a system-on-a-chip (SoC) system.

One or more logical processors (e.g., execution threads) may operate on processing core(s) 560. TDI 520A, 520N may operate on these execution threads. TDIRM 525 may act as a full host and have full control over processing core(s) 560 and all logical processors operating on processing core(s) 560. TDIRM 525 may assign software within TDI 520A, 520N to execute on the logical processor associated with TDI 520A, 520N. However, in embodiments of this disclosure, TDIRM 525 may not access the execution state of TDI 520A, 520N on the assigned logical processor(s) by the use of separate encryption keys. TDIRM 525 may be prevented from accessing the execution state of TDI 520A, 520N because it is outside of the TCB of TDI 520A, 520N. Therefore, TDIRM 525 may not be trusted to access the execution state, which could potentially provide information about the tenant workload to untrusted TDIRM 525. Preventing TDIRM 525 from accessing the execution state of TDI 520A, 520N enforces integrity of the tenant workload executing on TDI 520A, 520N.

Virtualization server 501 may further include memory 535 to store program binaries and other data. Memory 535 may refer to main memory, or may refer to both main memory and secondary memory, which may include read-only memory (ROM), hard disk drives (HDD), etc. TDIRM 525 may allocate a specific portion of memory 535 for use by TDI 520A, 520N, as TD island protected memory TDIPM 505A, 505N. TDIPM 505A, 505N may be encrypted by a one-time cryptographic key generated by TDIRM 525 when TDI 520A, 520N is created. TDIRM 525 may generate the one-time cryptographic key to encrypt TDIPM 505A, 505N, but may not use the one-time cryptographic key to access contents stored within TDIRM 505A, 505N.

TDI 520A, 520N may use virtual memory addresses that are mapped to guest physical memory addresses, and guest physical memory addresses that are mapped to host/system physical memory addresses by memory controller 552. When TDI 520A, 520N attempts to access a virtual memory address that corresponds to a physical memory address of a page loaded into memory 535, memory controller 552 may return the requested data through the use of an extended page table (EPT) 540 and a guest page table (GPT) 545. Memory controller 552 may include EPT walk logic and GPT walk logic to translate guest physical addresses to host physical addresses of main memory, and provide parameters for a protocol that allows processing core(s) 560 to read, walk, and interpret these mappings.

In one embodiment, tasks executed within TDI 520A, 520N may not access memory 535 directly using the physical address of memory 535. Instead, these tasks access virtual memory of TDI 520A, 520N through virtual addresses. The virtual addresses of virtual memory pages within the virtual memory may be mapped to the physical addresses of memory 535. The virtual memory of TDI 520A, 520N may be divided into fixed sized units called virtual memory pages that each has a corresponding virtual address. Memory 535 may be organized according to physical memory pages (e.g., memory frames) that each have a fixed size. Each memory frame may be associated with an identifier that uniquely identifies the memory frame. A virtual memory page of the virtual address may be mapped corresponding to a fixed-sized unit in the physical address space of memory 535 (e.g., a memory frame, a physical memory page). During execution of a guest application (e.g., a VM) within TDI 520A, 520N, responsive to a request to access memory 535, processor 550 may use mappings (e.g., mappings of virtual memory page to physical memory page in page tables such as GPT 545 of the guest application and EPT 540 of TDIRM 525) to access physical memory pages of memory 535.

In one embodiment, TDI 520A, 520N may be created and launched by TDIRM 525. TDIRM 525 may create TDI 520A, for example, by executing a specific instruction (e.g., TDICREATE). TDIRM 525 may select a 4 KB aligned region of physical memory 535 (corresponding to one memory page) and provide the address of the memory page as a parameter to the instruction to create TDI 520A. The instruction executed by TDIRM 525 may further cause processor 550 to generate a one-time cryptographic key (also referred to as an ephemeral key). The one-time cryptographic key may be assigned to an available HKID stored in KOT 562. KOT 562 may be a data structure, invisible to software operating on processor 550, for managing an inventory of HKIDs within the TDI architecture. The available HKID may also be stored in TDICS 510A. KOT 562 and the use of HKIDs are described in further detail with respect to FIG. 6. Processor 550 may consult with MOT 572, also described in further detail with respect to FIG. 6, to allocate memory pages to TDI 520A. MOT 572 may be a data structure, invisible to software operating on processor 550, used by processor 550 to enforce the assignment of physical memory pages to executing TDIs. MOT 572 may allow TDIRM 525 the ability to manage memory as a resource for each TDI created (e.g., TDI 520A, 520N), without having any visibility into data stored in the assigned TDIPM.

Processor 550 may utilize a memory encryption engine 554 (e.g., MK-TME engine) to encrypt (and decrypt) memory accessed during execution of a guest process (e.g., an application or a VM) within TDI 520A, 520N. As discussed above, TME allows memory accesses by software executing on a processing core (e.g., processing core(s) 560) to be encrypted using an encryption key. MK-TME is an enhancement to TME that allows the use of multiple encryption keys, thus allowing for compartmentalized encryption. In some embodiments, processor 550 may utilize encryption engine 554 to cause different pages to be encrypted using different encryption keys (e.g., one-time encryption keys). In various embodiments, encryption engine 554 may be utilized in the TDI architecture described herein to support one or more encryption keys (e.g., ephemeral keys) generated for each TDI 520A, 520N to help achieve cryptographic isolation between different tenant workloads. For example, when encryption engine 554 is used in the TDI architecture, the CPU may enforce by default that all pages associated with each TDI 520A, 520N are to be encrypted using a key specific to that TDI.

Each TDI 520A, 520N may further choose specific TDI pages to be plain text or encrypted using different encryption keys that are opaque to software executing on processor 550 (e.g., CSP-provided software). For example, memory pages within TDIPM 505A, 505N may be encrypted using a combination of encryption keys which are unknown to TDIRM 525, and a binding operation (e.g., an operation to map the TDI's virtual addresses to corresponding physical addresses). The binding operation, executed by TDIRM 525, may bind the memory pages within TDIPM 505A, 505N to a particular TDI by using a host physical address (HPA) of the page as a parameter to an encryption algorithm, that is utilized to encrypt the memory page. Therefore, if any memory page is moved to another location of memory 535, the memory page cannot be decrypted correctly even if the TDI-specific encryption key is used.

In one embodiment, TDI 520A, 520N may be destroyed by TDIRM 525. TDIRM 525 may cause TDI 520A, for example, to stop executing on a logical processor associated with TDI 520A by executing a specific instruction (e.g., TDISTOP). TDIRM 525 may flush all cache entries of a cache 570, wherein cache 570 is associated with the logical processor executing TDI 520A. One all cache entries of cache 570 have been flushed, TDIRM 525 may mark the HKID assigned to the one-time cryptographic key as available for assignment to other one-time cryptographic keys associated with other TDIs (e.g., TDI 520N). The TDIRM 525 may then remove all pages from TDIPM associated with TDI 520A (e.g., TDIPM 505A).

Computing system 500 is representative of processing systems based on the PENTIUM III™, PENTIUM 4™, Xeon™, Itanium, XSCALE™, or CORE™ available from Intel Corporation of Santa Clara, Calif., processors from Advanced Micro Devices, Inc., ARM processors, such as the ARM Cortex® family of processors, StrongARM™ devices, and/or other devices. In other embodiments, other systems (e.g., PCs having other microprocessing devices, engineering workstations, set-top boxes, etc.) may also be used. In one implementation, computing system 500 executes a version of the WINDOWS™ operating system available from Microsoft Corporation of Redmond, Wash., although other operating systems (e.g., UNIX, Linux, etc.), embedded software, and/or graphical user interfaces may also be used. Thus, implementations of this disclosure are not limited to any specific combination of hardware circuitry and software.

In an illustrative example, processing core(s) 560 may include processor logic and circuits (e.g., micro-architectures). Processing core(s) 560 with different micro-architectures may share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB), a retirement register file, etc.). One or more processing core(s) 560 may execute instructions of computing system 500. The instructions may include, but are not limited to, pre-fetch logic to fetch instructions, decode logic to decode the instructions, execution logic to execute instructions, and the like. Processor core(s) 560 may include a cache 570 to store instructions and/or data. Cache 570 may include, but is not limited to, a level one (L1) cache, a level two (L2) cache, and a last level cache (LLC). Cache 570 may also include any other configuration of the cache memory within processor 550.

Implementations of the present disclosure are not limited to desktop computing systems. Alternative implementations can be used in other devices, such as handheld devices and embedded applications. Some examples of handheld devices include cellular phones, Internet Protocol devices, digital cameras, personal digital assistants (PDAs), handheld PCs, etc. Embedded applications can include a micro controller, a digital signal processing device (DSP), a SoC, network computers (NetPC), set-top boxes, network hubs, wide area network (WAN) switches, or any other system that can perform one or more instructions in accordance with at least one specification.

One implementation may be described in the context of a single processing device desktop computer or server system, and by alternative implementations may be included in a multiprocessing device system. Computing system 500 may be an example of a "hub" system architecture. Computing system 500 may include a processor 550 to process data signals. Processor 550, as one illustrative example, may include a complex instruction set architecture (CISC) microprocessing device, a reduced instruction set architecture (RISC) microprocessing device, a very long instruction word (VLIW) microprocessing device, a processing device implementing a combination of instruction sets, or any other processing device, such as a digital signal processing device, for example. Processor 550 may be coupled to a processing device bus that transmits data signals between processor 550 and other components in computing system 500, such as main memory and/or secondary storage included in memory 535, storing instruction data, or any combination thereof. The other components of computing system 500 may include a graphics accelerator, a memory controller hub, an I/O controller hub, a wireless transceiver, a Flash BIOS, a network controller, an audio controller, a serial expansion port, an input/output (I/O) controller, etc. These elements perform their conventional functions that are well known to those familiar with the art.

In one implementation, processor 550 may include a L1 internal cache memory as part of cache 570. Depending on the architecture, processor 550 may have a single internal cache or multiple levels of internal caches within cache 570. Other implementations include a combination of both internal and external caches depending on the particular implementation and needs. A register file may be used to store different types of data in various registers including integer registers, floating point registers, vector registers, banked registers, shadow registers, checkpoint registers, status registers, configuration registers, and instruction pointer register.

It should be noted that the execution unit may or may not have a floating point unit. Processor 550, in one implementation, includes a microcode (ucode) ROM to store microcode, which, when executed, is to perform algorithms for certain macroinstructions to handle complex scenarios. Here, microcode is potentially updatable to handle logic bugs/fixes for processor 550.

Alternate implementations of an execution unit may also be used in microcontrollers, embedded processing devices, graphics devices, DSPs, and other types of logic circuits. System 500 may include memory 535. Memory 535 may include a DRAM device, a static random access memory (SRAM) device, flash memory device, or other memory device. Main memory stores instructions and/or data represented by data signals that are to be executed by the processor 550. The processor 550 is coupled to the main memory via a processing device bus. A system logic chip, such as a memory controller hub (MCH) may be coupled to the processing device bus and memory 535. A MCH may provide a high bandwidth memory path to memory 535 for instruction and data storage of graphics commands, data, and textures. The MCH can be used to direct data signals between processor 550, memory 535, and other components in the system 500 and to bridge the data signals between processing device bus, memory 535, and system I/O, for example. The MCH may be coupled to memory 535 through a memory interface. In some implementations, the system logic chip can provide a graphics port for coupling to a graphics controller through and Accelerated Graphics Port (AGP) interconnect.

The computing system 500 may also include an I/O controller hub (ICH). The ICH may provide direct connections to some I/O devices via a local I/O bus. The local I/O bus may be a high-speed I/O bus for connection peripherals to the memory 535, chipset, and processor 550. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing core(s) 560 described above can be used with a system-on-a-chip (SoC). One implementation of a SoC comprises of a processing device and a memory. The memory for one such system is a flash memory. The flash memory can be located on the same die as the processing device and other system components. Additionally, other logic blocks, such as a memory controller or graphics controller, can also be located on an SoC.

FIG. 6 illustrates a block diagram of another embodiment of a computing system that provides isolation in virtualized systems using trust domain islands (TDIs). Processor 638 may correspond with processor 550, illustrated in FIG. 5. In one implementation, processor 638 includes a cache 670, and executes an application stack 672 via one or more processing core(s) 560. As discussed previously, processor 638 may provide a TDI architecture and TDIX to provide confidentiality and integrity for customer software running in TDIs (e.g., TDI 520A, 520N) in an untrusted CSP infrastructure.

In one embodiment, TDI architecture may provide ISA extensions (referred to as TDIX) that support confidential operation of OS and OS-managed applications (virtualized and non-virtualized). A computing system, such as one including processor 638, with TDIX enabled can function as multiple encrypted contexts referred to as TDIs. For ease of explanation, a single TDI 520A is depicted in FIG. 6. Each TDI 520A may run VMMs, VMs, OSes, and/or other applications. In FIG. 6, TDI 520A is depicted as hosting VM 640.

In some implementations, TDIRM 525 may be compatible with VMM 526. VMM 526 may refer to software, firmware, and/or hardware employed to create, run, and manage guest applications, such as VM 640. VMM 526 may create and run VM 640 and allocate one or more virtual processors (e.g., vCPUs) to VM 640. VMM 526 may allow VM 640 to access hardware of the underlying computing system, such as computing system 500 of FIG. 5. VM 640 may execute a guest OS, and VMM 526 may manage the execution of the guest OS. The guest OS may function to control access of virtual processors of VM 640 to underlying hardware and software resources of computing system 500. It should be noted that, when there are numerous VMs operating on processor 638, VMM 526 may manage each of the guest OSes executing on the numerous guests. In some implementations, the VMM may be implemented with TDI 520A to manage VM 640. VMM 526 may be referred to as a tenant VMM and/or a non-root VMM.

In one embodiment, TDIRM may initialize a trust domain island virtual machine control structure (TDIVMCS) and activate it as a working virtual machine control structure (VMCS) in accordance with a virtualization architecture and ISA extensions (e.g., VMX). Similar to TDICS 510A, a VMCS may be a data structure saved in memory that is managed by the VMM. The VMCS may store the host and guest state information needed for virtualizing a VM's logical processor, while the TDICS may store control information specific to TDIX, as discussed in more detail with reference to Table 1 below. The TDIVMCS may store the host and guest state information needed for executing a TDI, such as TDI 520A. The TDIVMCS may be used as a VMCS for VM 640 and the VMM operating within TDI 520A.

MOT 572 may be a structure invisible to any software that is managed by processor 638 to enforce assignment of physical memory pages to executing TDIs, such as TDI 520A. Processor 638 may use MOT 572 to enforce that software operating as a tenant TDI 520A or TDIRM 525 cannot access memory associated with a physical addresses unless explicitly assigned to it. To accomplish this, MOT 572 may enforce that software outside TDI 520A, including TDIRM 525, cannot access any memory belonging to a different TDI (e.g., TDI 520N of FIG. 5). MOT 572 may also enforce that memory pages assigned by MOT 572 to specific TDIs, such as TDI 520A, should be accessible from any processor in the system (where the processor is executing the TDI that the memory is assigned to). In one implementation, MOT 572 may enforce memory access control during the page walk for memory accesses made by software. Physical memory accesses performed by processor 638 that is not assigned to TDI 520A or TDIRM 525 may fail.

MOT 572 may be used to hold meta-data attributes (e.g., security attributes) for each 4 KB page of memory. For example, MOT 572 may hold attributes including: page status (e.g., whether a page is valid in memory or not); page category (e.g., DRAM, NVRAM, I/O, Reserved); page state (e.g., indicating whether the page is assigned to another TDI (e.g., TDI 520N of FIG. 5) or TDIRM 525, free for assignment, blocked from assignment, or pending); and TDID (e.g., an identifier that assigns the page to a specific unique TDI). Additional structures may be defined for additional page sizes (e.g., 2 MB, 1 GB, etc.). In other implementations, other page sizes may be supported by a hierarchical page structure (e.g., a page table). A 4 KB page reference in MOT 572 may belong to one running instance of TDI 520A. The 4 KB page reference may also be a valid memory or marked as invalid. In one implementation, each TDI 520A instance may include one page holding a TDICS 510A for that TDI 520A.

KOT 562 may be a data structure, e.g. a table, for managing an inventory of HKIDs within the TDI architecture. Similar to MOT 572, KOT 562 may not be visible to software operating on processor 638. KOT 562 may be used to assign a HKID to a one-time cryptographic key generated for TDI 520A. In one embodiment, multiple one-time cryptographic keys may be generated for TDI 520A. In a further embodiment, a different HKID may be assigned to each one-time cryptographic key generated for TDI 520A. KOT 562 may further be used by TDIRM 525 to revoke HKIDs assigned to one-time cryptographic keys and control flushing cache 570 upon TDI destruction, in accordance with embodiments described herein.

KOT 562 may keep track of all HKIDs available for use by all TDIs executing on a computing system in accordance with the TDIX architecture. A HKID may have a state of assigned, free (or available), reclaimed, or configured. A HKID that has a free state is available for assignment to cryptographic keys (e.g., one-time cryptographic key generated for TDI 520A). A HKID that has an assigned state is assigned to a cryptographic key associated with a TDI and, therefore, is not available for assignment to subsequent cryptographic keys. A HKID that has a configured state has been configured, along with its assigned cryptographic key, in an encryption engine (e.g., encryption engine 554 of FIG. 5). An HKID is given a reclaimed state during the process of destroying TDI 520A. A HKID may have a reclaimed state until all cache entries of cache 570 have been flushed. When all cache entries have been flushed, the state of HKID may be changed from reclaimed to available.

KET 574 may be a data structure, invisible to software executing on processor 638, for configuring an encryption engine (e.g., encryption engine 554 of FIG. 5). KET 574 may be indexed by HKID and may indicate whether each HKID has been configured in the encryption engine. KET is also shown in FIG. 6 as KET 660, which includes HKID 662 and Key 664.

TDICS 510A may be assigned to TDI 520A and stored in TDIPM 505A. TDICS 510A may be an access-control structure that is part of the TDI architecture and is managed by TDIRM 525. TDICS 510A may manage transitions into and out of TDIX operation (e.g., TDI entries and TDI exits). Transitions from TDIRM 525 into TDIX tenant operation are called TDI entries. TDI entries may be triggered by an instruction executed by TDIRM 525. Transitions from TDIX tenant operation to TDIRM 525 are called TDI exits. TDI exits may be triggered by a hardware event requiring an exit from TDI 520A. For example, a page fault in a page table supporting the TDI (e.g., EPT 540 of FIG. 5) may cause a TDI exit.

TDICS 510A may occupy a 4 KB naturally aligned region of memory 535 (e.g., a page of memory). TDICS 510A may include, but is not limited to, the following fields depicted below in TABLE 1. TDIX Control Information Stored in TDICS:

TABLE 1

| Field | Size (bytes) | Description |
|---|---|---|
| REVISION | 4 | Revision Identifier |
| TDID | 8 (40 bits valid, rest reserved) | TDI Identifier |
| COUNT-TCS | 4 (16 bits valid, rest reserved) | Number of TDITCSs associated with this TDICS |
| COUNT_BUSY_TCS | 4 (16 bits valid, rest reserved) | Number of busy TDITCSs associated with this TDIS |
| KID_ENTRY_0 | 8 (8 bits valid, rest reserved) | Ephemeral Key ID for one-time cryptographic key assigned to TDI during TDICREATE |
| ATTRIBUTES | 16 | Attributes of TDI |
| MRTDI | 48 | SHA-384 measurement of the initial contents of the TDI |
| RESERVED | 16 (must be zero) | Reserved for MREG growth to SHA 512 |
| MRSWID | 48 | Software defined identifier for additional logic loaded after initial builds |
| MRCONFIGID | 48 | Software defined identifier for additional TDI SW configuration |
| MROWNER | 48 | Software defined identifier for VM's owner |
| MROWNERCONFIG | 48 | Software defined identifier for additional image configuration from owner |
| XCR0 | 8 | Initial values of XCR0 |
| OWNERID | 8 | Owner ID |
| MRTDIBLOCKS | 4 | Number of blocks updated into MRTDI (only needed by pre-TDINIT) |
| COUNT_TCS_MAX | | Max value specifies maximum number of logical processors that may be assigned to this TDI (max. possible is 4095) |
| RESERVED | | Reserved (other TDI metadata) |

In one embodiment, multiple logical processors may be assigned to TDI 520A. For each logical processor assigned to TDI 520A, a trust domain island thread control structure (TDITCS) 515A page may be added to TDIPM 505A. In one embodiment, multiple TDITCS 515A pages may be added to TDIPM 505A. TDITCS 515A may be used to enter into TDI 520A or exit from TDI 520A, in accordance with embodiments discussed below. TDITCS 515A may include a state save area (SSA) to store the execution state for one logical processor assigned to TDI 520A. If a TDI exit condition occurs when processor 638 is executing an instruction associated with a memory page of TDIPM 505A (i.e., the processor is operating in tenant mode), a TDIEXIT instruction may be executed by TDIRM 525. The state of TDI 520A may be saved in TDITCS 515A. In another embodiment, if a TDI exit condition occurs when processor 638 is operating in the context of a non-root VMM inside TDI 520A, TDIRM 525 may execute a VMEXIT instruction to the TDI VMM. The tenant VMM state may be saved in TDITCS 515A and TDIRM 525 may subsequently perform a TDI exit.

As discussed above, TDITCS 515A may hold the execution state of TDI 520A in the SSA. The execution state of TDI 520A may include the execution state of the logical processor executing TDI 520A, a link back to a parent TDICS (e.g., TDICS 510A), a plurality of TDITCS execution flags, a TDI state corresponding to a supervisor mode, and a TDI state corresponding to a user.

In one embodiment, TDICS 510A and TDITCS 515A may be access controlled by MOT 572 (e.g., an encryption key ID stored in MOT 572 may be used to enforce memory access controls). In another implementation, TDICS 510A and TDITCS may be access-controlled via storage in a restricted range register(s), such as range registers 580 illustrated in FIG. 5, of processor 550 that is inaccessible to software accesses.

TDIRM 525 state area may be stored in a TDIRM control structure (TDIRCS) 634. TDIRCS 634 may also be implemented as a new type of VM control structure that only contains a host state, controls, and TDI exit info.

Figure 7:
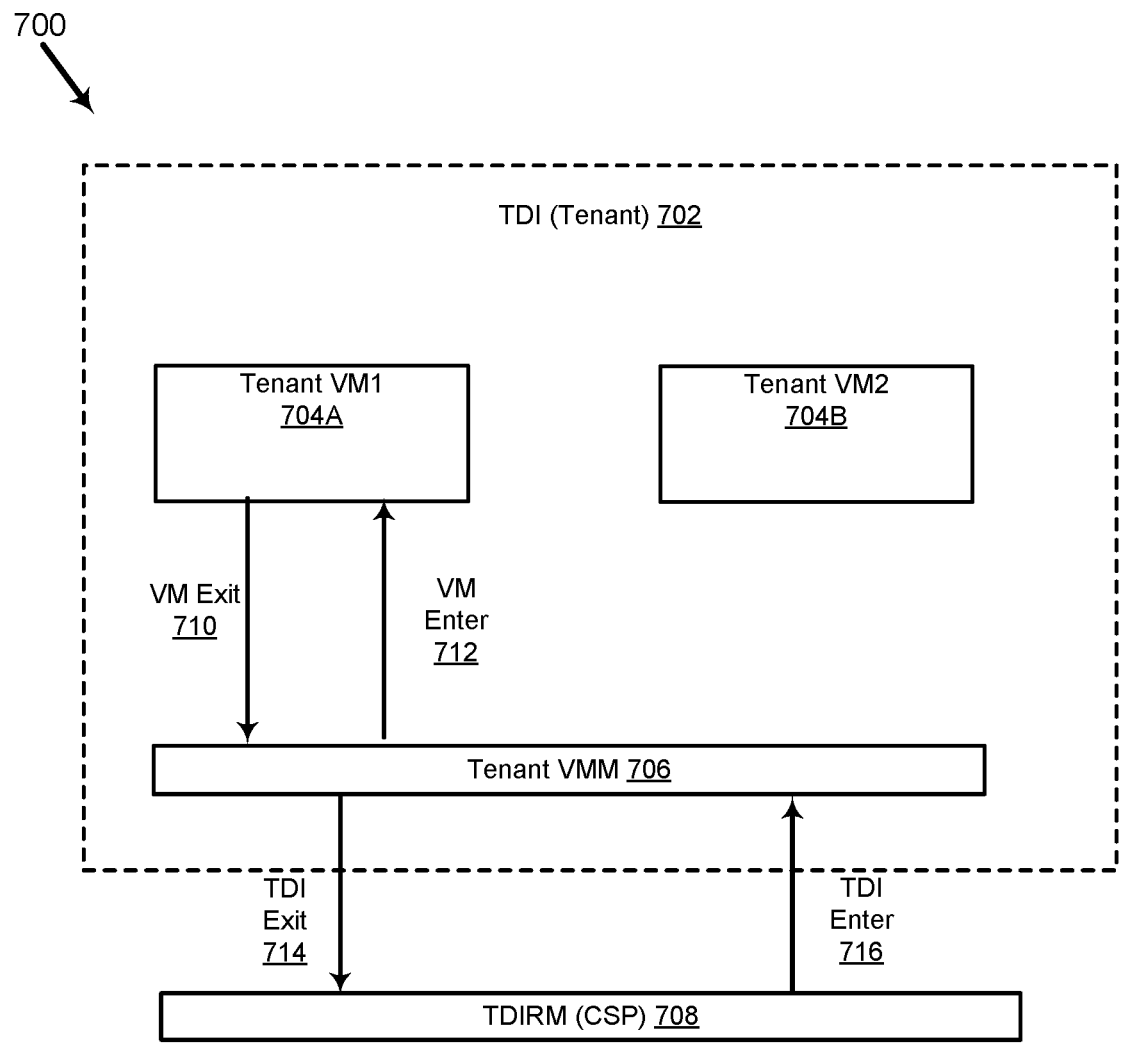
FIG. 7 illustrates a block diagram of another embodiment of a computing system that provides isolation in virtualized systems using TDIs.

FIG. 7 illustrates a block diagram of another embodiment of a computing system that provides isolation in virtualized systems using TDIs. FIG. 7 illustrates a block diagram of an example TDI lifecycle 700 and the interactions between TDI 702 and TDIRM 708. In one implementation, TDI 702 and TDIRM 708 may be the same as their counterparts described with respect to FIGS. 5-6. The TDI architecture may be the same as a TDI architecture provided by computing device 500 of FIG. 5. TDI architecture 700 may provide a layer that manages lifecycle of TDIs active on a system. Processor support for TDIs may be provided by a processor operation called a TDIX operation. There are two types of TDIX operations: resource manager operation and tenant operation. In general, TDIRM 708 runs in TDIX resource manager operation, and TDIs, such as TDI 702, run in TDIX tenant operation. Transitions between resource manager operation and tenant operation are referred to as TDIX transitions.

There are two types of TDIX transitions: TDI entry 716 and TDI exit 714. Transitions from TDIX resource manager operation into TDIX tenant operation are called TDI entries 716. TDI entries may be triggered by an instruction executed by TDIRM 708. Transitions from TDIX tenant operation to TDIX resource manager operation are called TDI exits 714. TDI exits 714 may be triggered by a hardware event requiring an exit from the TDI. For example, a page fault in a page table supporting the TDI (e.g., EPT 540 of FIG. 5) may cause a TDI exit 714.

As discussed above, processor in TDIX resource manager operation behaves similarly as it does outside of TDIX operation. The principal differences are that a set of TDIX operations (TDIX instructions) is available and that values can be loaded into certain control registers are limited to restrict the modes and abilities of TDIRM 708.

Processor behavior in TDIX tenant operation is restricted to fabricate isolation. For example, instead of ordinary operation, certain events (e.g., page fault, unauthorized access to memory pages, task switching, tenant workload termination, etc.) because TDI exits 714 to the TDIRM 708.

These TDI exits 714 do not allow TDIRM 708 to modify the behavior or state of TDI 702. TDIRM 708 may use platform capabilities to retain control of platform resources. Software running in TDI 702 (e.g., Tenant VM1 704A with VM exit 710 and VM enter 712, Tenant VM2 704B, etc.) may use software-visible information to determine it is running in a TDI 702, and may enforce local measurement policies on additional software loaded into TDI 702. However, validating the security state of TDI 702 is a process performed by a remote attestation party to ensure confidentiality.

TDI architecture 700 may be designed to minimize compatibility problems on software that relies on virtualization when running in a TDI 702. TDI architecture 700 leaves most interactions between VM 704A, 704B running in tenant operation and tenant VMM 706 running in tenant operation unchanged. If there is no VMM 706 present in TDI 702, a VM OS (not shown) may be modified to work with TDIRM 708 as the root VMM.

In one implementation, TDIRM 708 may explicitly decide to cause a TDI exit 714, for example, to terminate a TDI 702 or to manage memory resources (e.g., yield assigned memory resource, request free memory resources, etc.). TDI architecture 700 may also provide TDIRM 708 with the ability to force TDI exits 714 for preemption. On TDI exits 714, TDI architecture enforces that the execution state of TDI 702 may be saved in a CPU access-controlled memory structure (e.g., TDITCS 515A) allocated to the TDI 702 and encrypted using a unique encryption key (e.g., a one-time encryption key) associated with TDI 702 that is not visible to TDIRM 708 or other TDIs to protect confidentiality of TDI state from the TDIRM 708 or other TDIs. The TDI execution state may similarly be protected against spoofing (e.g., a person or program successfully masquerading as another by falsifying data), remapping (e.g., remapping the physical memory of a protected virtual address to a new virtual address within the context of a malicious module), and/or replay via integrity controls (e.g., a valid data transmission is maliciously or fraudulently repeated or delayed) on memory.

TDI enter 716 is a complementary event to TDI exit 714. For example, TDI enter 716 may occur when TDIRM 708 schedules a TDI 702 to run on a logical processor and transfers execution to the software running in the TDI 702. During TDI enter 716, TDI architecture 700 may ensure that the execution state of TDIRM 708 is saved in a memory owed by TDIRM (i.e., TDIPM 505A and 505N of FIG. 5), which is encrypted using a unique encryption key (e.g., one-time encryption key) assigned for sole use by the TDIRM 708.

TDIs, such as TDI 702, may be setup by TDIRM 708 using specific instructions (e.g., TDICREATE, TDIADD-PAGE, etc.) to cause memory space to be allocated to the TDI and to be encrypted using a unique encryption key that is not visible to TDIRM 708 or other software. Before executing any instructions belonging to TDI 702 on a logical processor, all TDI memory stored in TDIPM (e.g., TDIPM 505A and 505N of FIG. 5) may be encrypted using a unique key associated with TDI 702 (e.g., a one-time cryptographic key). Although specific instruction names are referenced herein, other names for the instructions may be utilized in implementations of the disclosure and are not limited to the specific names provided herein.

In one implementation, TDIRM 708 may launch each TDI 702 with a small software image (similar to IBB or initial boot block) after signature verification and record the IBB measurement (for subsequent attestation) using a platform root of trust. The measurement may be obtained for the small software image to prevent the instructions used to launch TDI 702 from being used again. The measurement may be computed using a secure hashing algorithm so the system software can only implement a TDI that matches an expected measurement by following the exact sequence of instructions executed by TDIRM 708. The TDIX design may use a 256-bit SHA-2 secure hash function to compute the measurements. The IBB software executing in TDI 702 may be responsible for completing the measured launch of TDI 702 and requesting additional resources from TDIRM 708. In one embodiment, TDI 702 may use a single encryption key to protect the entire TDIPM. In another embodiment, TDI 702 may use multiple encryption keys to protect the TDIPM, wherein each encryption key may be associated with different tenant VMs 704A, 704B, and/or containers or different memory resources such as NVRAM. Thus, when TDI 702 is first created, TDI 702 may use an exclusive CPU-generated MK-TME key. Thereafter, TDI 702 may optionally set up additional MK-TME encryption keys for each tenant software-managed context that operates inside the TDI 702, as discussed above.

In order to minimize software compatibility impact on VMMs for CSP (e.g., TDIRM 708 and tenant VMM 706), a virtualization operation (e.g., VMX) may remain unmodified inside a TDI 702 in TDI architecture 700. Similarly, operation of VMM software, such as EPT and GPT management, can remain under the control of the tenant VMM 706 (if one is active in the TDI 702 and is not managed by the TDIRM 708). As the TDIRM 708 assigns physical memory for each TDI 702, TDI architecture 700 includes the MOT 572, described with respect to FIG. 5. With reference to FIG. 5, processor 550 may consult TDIRM-managed MOT 572 to allocate portions of memory 535 to TDIs (e.g., TDI 702). This may allow TDIRM 708 the full ability to manage memory as a resource without having any visibility into data resident in assigned TDI memory. In some implementations, as discussed above, the platform (e.g., root) VMM and TDIRM 708 may be in the same encryption key trust domain island, thus sharing the memory management and scheduler functions (but still remaining outside the tenant's TCB).

Figure 8:
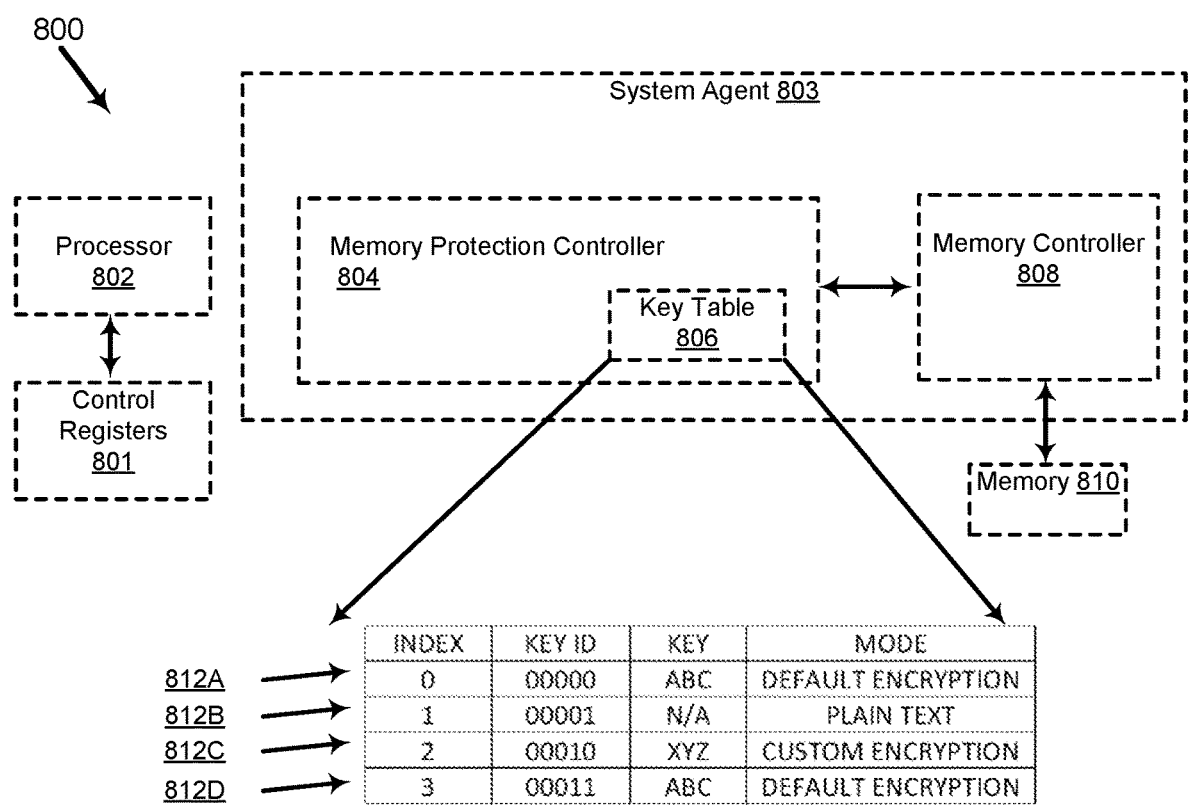
FIG. 8 is a block diagram of an embodiment of a TDI architecture.

FIG. 8 is a block diagram of an embodiment of a TDI architecture. FIG. 8 illustrates an example embodiment of a multi-key total memory encryption (MK-TME) engine. The MK-TME engine may be used as an encryption engine, in accordance with embodiments of this disclosure. In the illustrated embodiment, memory protection system 800 includes processor 802, system agent 803, and memory 810. Memory protection system 800 may provide cryptographic protection of data stored on memory 810. Processor 802 may correspond with processor 550, illustrated in FIG. 5, and processor 638, illustrated in FIG. 6. Memory 810 may correspond with memory 535, also illustrated in FIG. 5. System agent 803, while not illustrated in FIG. 5, may be a component of virtualization server 501. Specifically, system agent 803 may be a component of processor 550, and memory controller 808 may correspond with memory controller 552 of FIG. 5.

System agent 803 may be used to provide various functions for processor 802, such as managing access to memory 810 and/or other resources of system 800. In the illustrated embodiment, for example, system agent 803 may include a memory controller 808 to control and/or manage access to memory 810 of system 800. Moreover, as described further below, system agent 803 may also include a memory protection controller 804 to protect data stored on memory 810. In some embodiments, system agent 803 may also provide an interface between processor 802 and other components of system 800 (e.g., using a direct media interface (DMI) and/or PCI-Express bridge). In various embodiments, system agent 803 may include any combination of logic elements configured to perform functionality of system agent 803 described herein, whether loaded form memory or other non-transitory computer readable medium, or implemented directly in hardware, including by way of non-limiting examples: a microprocessor, digital signal processor (DSP), field-programmable gate array (FPGA), graphics processing unit (GPU), programmable logic array (PLA), application-specific integrated circuit (ASIC), and/or VM processor. System agent 803 may be integrated with processor 802, or alternatively, system agent 803 may be implemented on a separate chip communicatively coupled or connected to processor 802.

Memory controller 808 may be used to control and/or manage access to memory 810 of system 800. In various embodiments, memory controller 808 may be implemented using any combination of hardware and/or software logic, including a microprocessor, ASIC, FPGA, PLA, VM, and/or any other type of circuitry or logic.

In the illustrated embodiment, system 800 provides cryptographic memory protection for memory 810. In some embodiments, for example, cryptographic memory protection may be implemented by extending and/or modifying a particular computer architecture. For example, cryptographic memory protection may be implemented by extending the functionality of a processor 802 and/or introducing a memory protection controller 804. In the illustrated embodiment, for example, processor 802 is extended to support control registers 801 and processor instruction(s) that can be used to enable and/or configure cryptographic memory protection, and memory protection controller 804 is implemented to provide the cryptographic memory protection. Control registers 803 may correspond to range registers 580 illustrated in FIG. 5. Although the illustrated example uses separate logical blocks to depict memory protection controller 804 and processor 802, in actual embodiments, memory protection controller 804 and processor 802 may be integrated together or alternatively may be implemented as separate components. In various embodiments, for example, memory protection controller 804 may be implemented using any combination of hardware and/or software logic, including a microprocessor, ASIC, FPGA, PLA, VM, and/or any other type of circuitry or logic.

Memory protection controller 804 may use memory encryption to protect data stored on memory 810. In some embodiments, for example, memory protection controller 804 may be implemented on the memory path or memory bus to allow encryption of data transmitted to and from, and/or stored on, memory 810. Moreover, in some embodiments, memory protection controller 804 may be configurable or programmable, and may include support for multiple encryption keys. Accordingly, memory protection controller 804 may be configured or programmed (e.g., by software) to encrypt different regions or pages of memory 810 using different encryption keys and/or algorithms. In this manner, memory encryption can be provided and configured separately for different users, tenants, customers, applications, and/or workloads.

For example, in some embodiments, memory protection controller 804 may be used to define various secured or protected trust domain islands that can be separately configured and protected using memory encryption. In some embodiments, for example, a "trust domain island" may be viewed as a collection of resources associated with a particular workload (e.g., a TDI), and may include any regions of memory containing data associated with the workload. For example, a TDI for a customer workload of a CSP may include resources (e.g., memory) associated with an OS, VM (e.g., a VM running on a VMM executed by a TDIRM), and/or any ring-3 applications running on the OS or VM. Memory protection controller 804 may allow the protected trust domain island islands to be configured and protected separately, thus allowing each protected trust domain island to be cryptographically isolated in memory by encrypting its associated code and/or data with a unique encryption key. In this manner, the workloads of different users, customers, and/or tenants can be cryptographically isolated by defining different protection trust domain island islands for the various workloads.

In some embodiments, the cryptographic memory protection of system 800 may be discovered and configured using processor instructions and/or hardware registers. For example, in some embodiments, a processor instruction may be used to determine whether cryptographic memory protection is supported by system 800, such as a CPU identification (CPUID) instruction used by software to identify the capabilities of a particular processor.

Upon determining that cryptographic memory protection is supported by system 800, the cryptographic memory protection may then be enabled and/or configured using hardware registers, such as control registers 803 of processor 802. For example, control registers 803 may include various model-specific registers (MSRs) that allow software to discover, enable, and/or configure the cryptographic memory protection capabilities of system 800. In some embodiments, for example, control registers 803 may include a memory encryption capability register, a memory encryption activation register, and/or one or more memory encryption exclusion registers.

In the illustrated embodiment, memory protection controller 804 maintains an internal trust domain island key table 806 to identify protected trust domain island islands (e.g., TDIs) that have been configured in system 800. Key table 806 may be implemented using any form of memory or storage (e.g., RAM), and may also be implemented directly on memory protection controller 804, in memory 810, and/or using another memory component.

Entries 812A, 812B, 812C, and 812D of trust domain island key table 806 each correspond to a different protected trust domain island (e.g., a TDI). For example, each entry 812A-D may include a key or trust domain island ID, a protection mode, and an associated encryption key (e.g., a one-time cryptographic key). In some embodiments, for example, a key ID (e.g., a HKID) may represent the higher order bits of the memory addresses that are within the associated protected trust domain island. In the illustrated example, each key ID in trust domain island key table 806 is represented using 5 bits. Accordingly, the protected trust domain island associated with a given key ID covers all memory addresses whose highest order 5 bits match the key ID. In the illustrated embodiment, the key ID may be stored as a field in key table 806, but in alternative embodiments, the key ID may be used as an index into key table 806 rather than being stored directly in key table 806.

Moreover, in some embodiments, multiple protection modes may be supported, and each protected trust domain island may be protected using a particular protection mode. For example, in some embodiments, the standard protection modes may include plaintext mode (e.g., unencrypted), standard or default encryption mode (e.g., encrypted using a standard or default encryption key), and/or custom encryption mode (e.g., encrypted using a unique encryption key). Accordingly, key table 806 may identify the protection mode associated with each protected trust domain island or key ID.

In the illustrated example, trust domain island key table 806 includes four entries. The first entry identifies a protected trust domain island corresponding to key ID 00000 (thus covering all memory addresses that contain 00000 in the highest order of 5 bits), which is protected in default encryption mode using key "ABC." The second entry identifies a protected trust domain island corresponding to key ID 00001 (this covering all memory addresses that contain 00001 in the highest order 5 bits), which is protected in plaintext mode and this does not have an associated encryption key. The third entry identifies a protected trust domain island corresponding to key ID 00010 (thus covering all memory addresses that contain 00010 in the highest order 5 bits), which is protected in custom execution mode using key "XYZ." The fourth entry identifies a protected trust domain island corresponding to key ID 00011 (thus covering all memory addresses that contain 00011 in the highest order 5 bits), which is protected in default encryption mode using key "ABC." As shown by these examples, the trust domain island protected using custom encryption mode has a unique key ("XYZ"), the trust domain islands protected using default encryption mode share an encryption key ("ABC"), and the trust domain island protected in plaintext mode is unencrypted and thus has not associated key. In embodiments of this disclosure, TDIs may be protected under custom encryption mode and have a unique key (e.g., a one-time cryptographic key).

In some embodiments, protected trust domain islands may be defined and/or configured using a processor instruction implemented by processor 802 (e.g., PCONFIG). This processor instruction may be used to define and/or configure a protected trust domain island by programming a new entry—or modifying an existing entry—in key table 806 of memory protection controller 804. In this manner, protected trust domain islands (e.g., TDIs) may be defined and configured programmatically (e.g., by management software) using the processor instruction.

Figure 14:
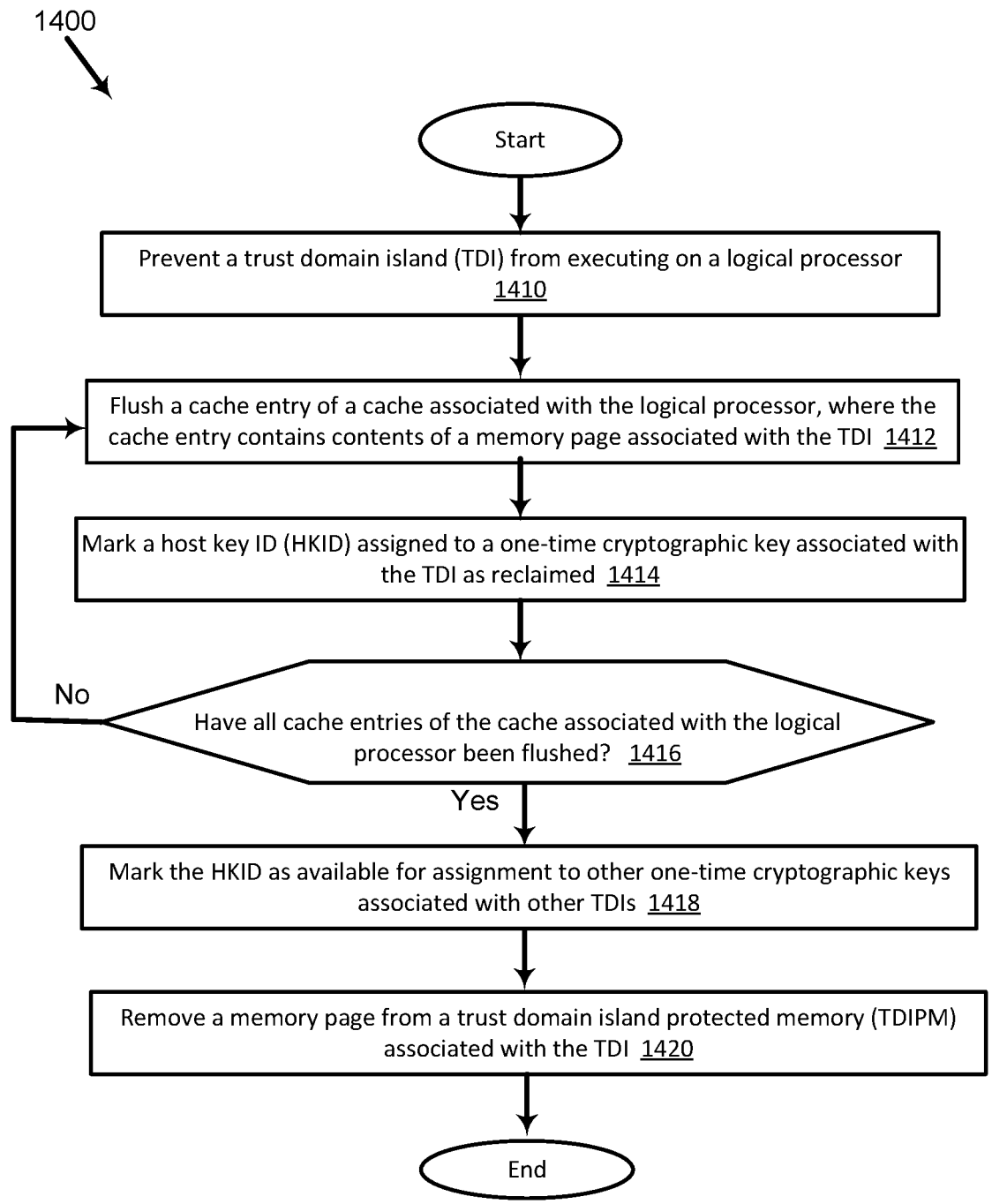
FIG. 14 illustrates a flow diagram for a method of destroying a TDI, according to embodiments of the present disclosure.
Figure 15:
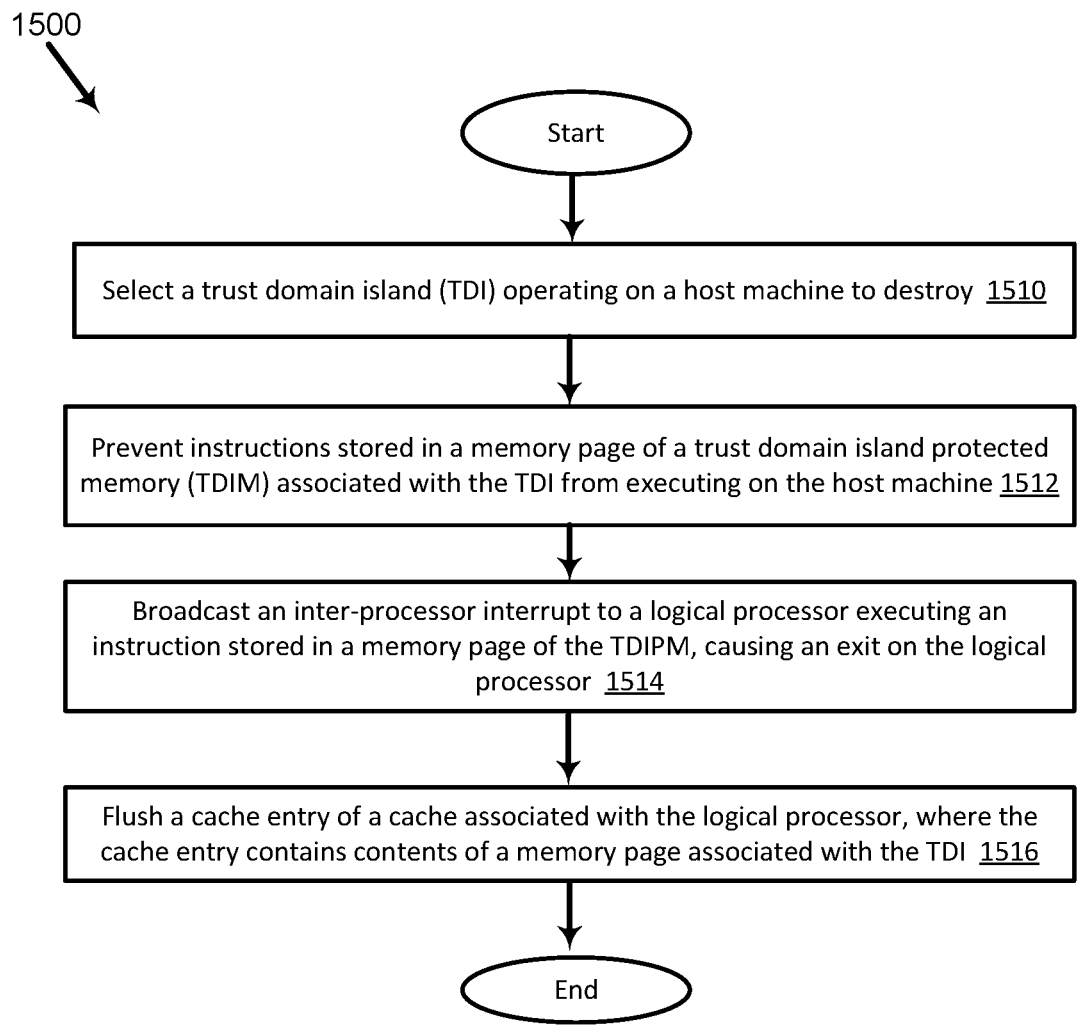
FIG. 15 illustrates a flow diagram for a method of preventing a TDI from executing on a logical processor, according to embodiments of the present disclosure.
Figure 16:
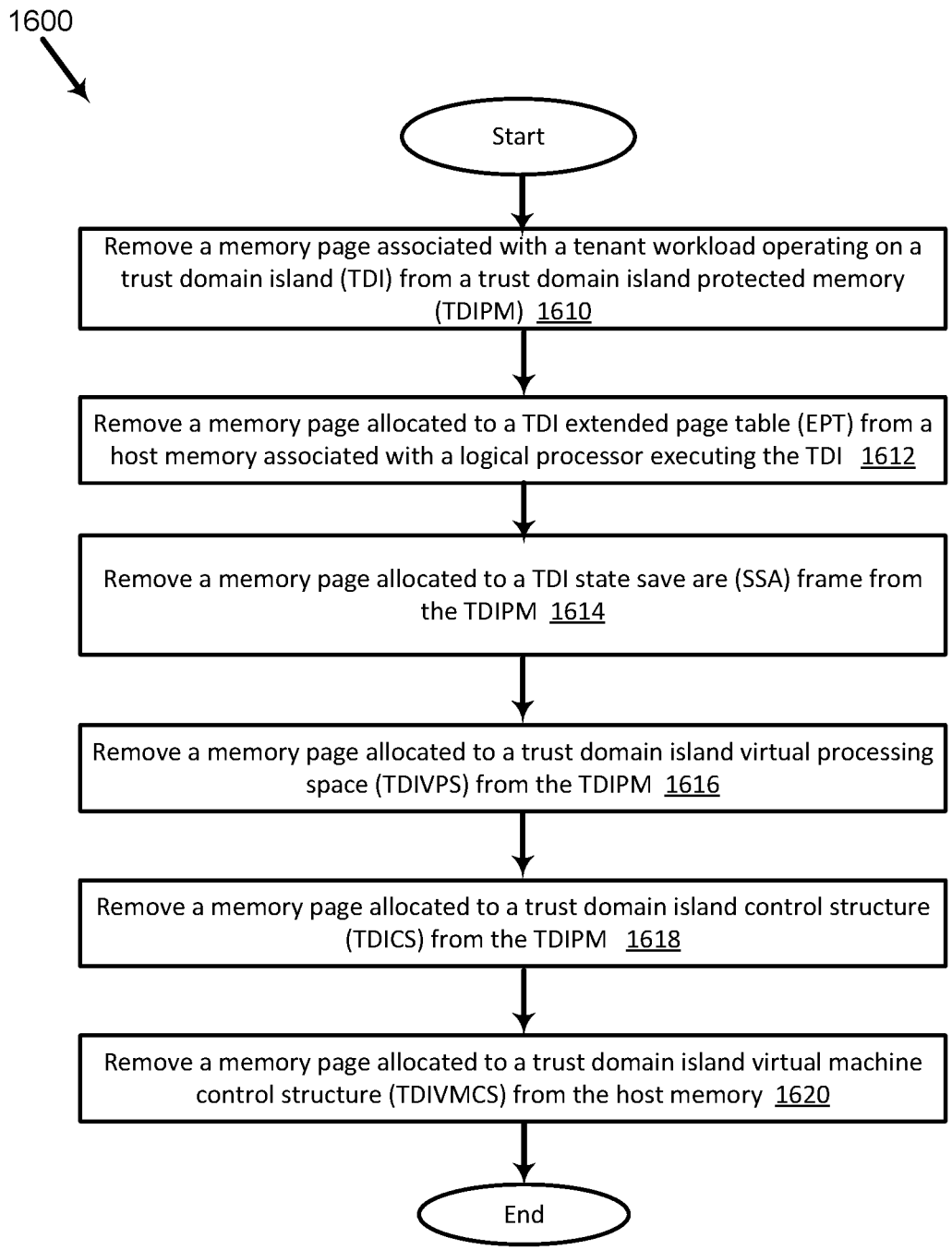
FIG. 16 illustrates a flow diagram for a method for removing a memory page from a TDIPM associated with a TDI, according to embodiments of the present disclosure.

FIGS. 9-13 are methods 900, 1000, 1100, 1200, and 1300 of creating a TDI, by a TDIRM, in accordance with certain embodiments described herein. FIGS. 14-16 are methods 1400, 1500, and 1600 for destroying a TDI, by a TDIRM, in accordance with certain embodiments described herein. Methods 900-1100 may be performed by a processing logic that is hardware (e.g., circuitry, dedicated logic, programmable logic, microcode, etc.). In one embodiment, methods 900-1600 are to be performed, in part, by processor 550 of FIG. 5 executing TDIRM 525 or processor 638 of FIG. 6 executing TDIRM 674. For example, methods 900-1600 may be performed by logic circuitry of processor 550 including one or more of processing core(s) 560, cache 570, MOT 572, KOT 562, KET 574, WBT 564, KMT 576, range registers 580, memory controller 552, encryption engine 554, and I/O ports 556.

For simplicity of explanation, methods 900-1600 are depicted and described as acts. However, acts in accordance with this disclosure can occur in various orders and/or concurrently and with other acts not presented and described here. Furthermore, not all illustrated acts may be performed to implement the methods 900-1600 in accordance with the disclosed subject matter. In addition, those skilled in the art will understand and appreciate that methods 900, 1000, 1100, 1200, 1300, 1400, 1500, and 1600 could alternatively be represented as interrelated states via a state diagram or events.

Figure 9:
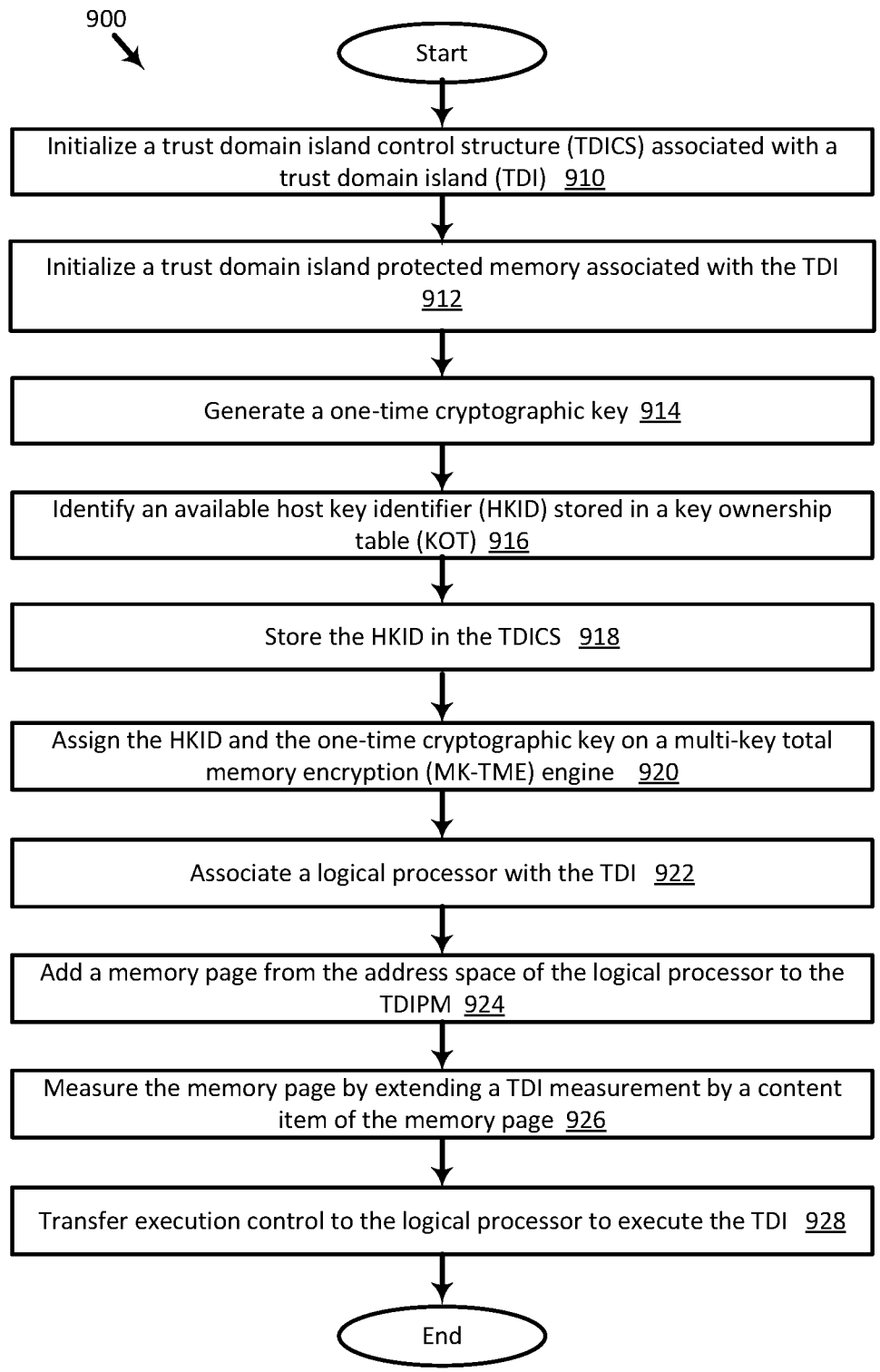
FIG. 9 illustrates a flow diagram of a method for creating a TDI, according to embodiments of the present disclosure.

FIG. 9 illustrates a flow diagram of a method 900 for creating a TDI. As discussed previously, a TDI may be created and launched by the TDIRM. The TDIRM may act as a host and have control of the processor and platform hardware. The TDIRM may create a TDI by executing a specific instruction (e.g., TDICREATE), which may initiate the TDI creation process.

At block 910, the TDIRM may initialize a TDICS. As discussed above, the TDICS is an access-control structure that is part of TDIX ISA and managed by the TDIRM. The TDICS, however, cannot be directly accessed by the TDIRM. The TDICS may occupy a 4 KB naturally aligned region of memory (e.g., a page of memory). The page occupied by the TDICS in a MOT (e.g., MOT 572 illustrated in FIG. 5 and MOT 644 illustrated in FIG. 6, the latter including HPA 646, page status 648, page state 650, TDID 652, Key ID 654, GPA 656, and guest permissions 658) may be blocked against software reads/writes after the TDICREATE instruction is successfully executed. The TDIRM may initialize the TDICS in accordance with embodiments described with respect to FIG. 10 below.

At block 912, the TDIRM may initialize a TDI protected memory (TDIPM). The TDIPM may be a portion of physical memory to be associated with a TDI. The TDIRM may select a portion of physical memory available to be associated with a TDI and then initialize the portion of physical memory as the TDIPM, in accordance with embodiment described with respect to FIG. 10 below.

In one embodiment, the TDIRM may allocate a target page for the TDICS in the TDIPM. The TDIRM may select a region of physical memory (e.g., an aligned 4 KB region) and provide this as a parameter to the instruction to create the TDI (e.g., TDICREATE). This region of memory may be allocated for the TDICS. In some embodiments, the region of memory allocated for the TDICS may be blocked against read and writes operations, and is therefore protected within the TDIX architecture. The TDICS, for example, may hold a TDI identifier, the encryption key allocated to the TDI, and a HKID associated with the encryption key.

At block 914, the TDIRM may cause a one-time cryptographic key to be generated to be used to encrypt memory pages include in the TDIPM. The one-time cryptographic key may be an ephemeral key (i.e., a cryptographic key that is generated for each TDI created by the TDIRM). TDIRM may select a key programming mode for programming the one-time cryptographic key for the TDI. For example, the TDIRM may directly specify a key for the trust domain island. In accordance with TDI architecture described herein, TDIRM may, in other examples, request that a random key be generated by the CPU.

At block 916, the TDIRM may identify an available host key identifier (HKID) stored in a key ownership table (KOT). As discussed above, the KOT may be a data structure, invisible to software executing on the processor, used to manage HKID inventory within TDIX. In some embodiments, TDIX may have a specific number of HKIDs available for use by all TDIs generated by the TDIRM. The KOT may maintain all HKIDs available for use by all TDIs created on the processor. The KOT is also shown in FIG. 6 as KOT 666, which includes HKID 662 and HKID state 668. As discussed above, a HKID may have a state of assigned, free (or available), reclaimed, or configured.

At block 918, the TDIRM may store the HKID in the TDICS. During execution of a tenant workload in an executed TDI, the HKID stored in TDICS may be used as part of a protection mechanism (e.g., TME, MK-TME) to prevent malicious or untrusted software (including the TDIRM) from accessing memory pages of the TDIPM.

At block 920, the TDIRM may assign the one-time cryptographic key to the available HKID on a multi-key total memory encryption (MK-TME) engine. The TDIRM may execute a specific instruction (e.g., TDICONFIGKEY) to configure the one-time cryptographic key and the available HKID on MK-TME engines on all packages for which the TDI may operate. The TDICONFIGKEY instruction may correspond to the PCONFIG instruction used to define and/or configure a protected trust domain island of system 800 described with respect to FIG. 8. By executing the TDICONFIGKEY instruction, the TDIRM may cause a memory protection controller of a MK-TME engine (e.g., memory protection controller 804 of FIG. 8) to program the key and a protection mode for the TDI. The memory protection controller may then return a status code to the TDIRM indicating that the key has been configured.

At block 922, the TDIRM may associate a logical processor with the TDI. The TDI may operate on the associated logical processor. TDIRM may act as a full host and have full control over the logical processor and the processing core on which the logical processor is operating. The actions required to associate a logical processor with the TDI are described in further detail with respect to FIG. 11.

Figure 12:
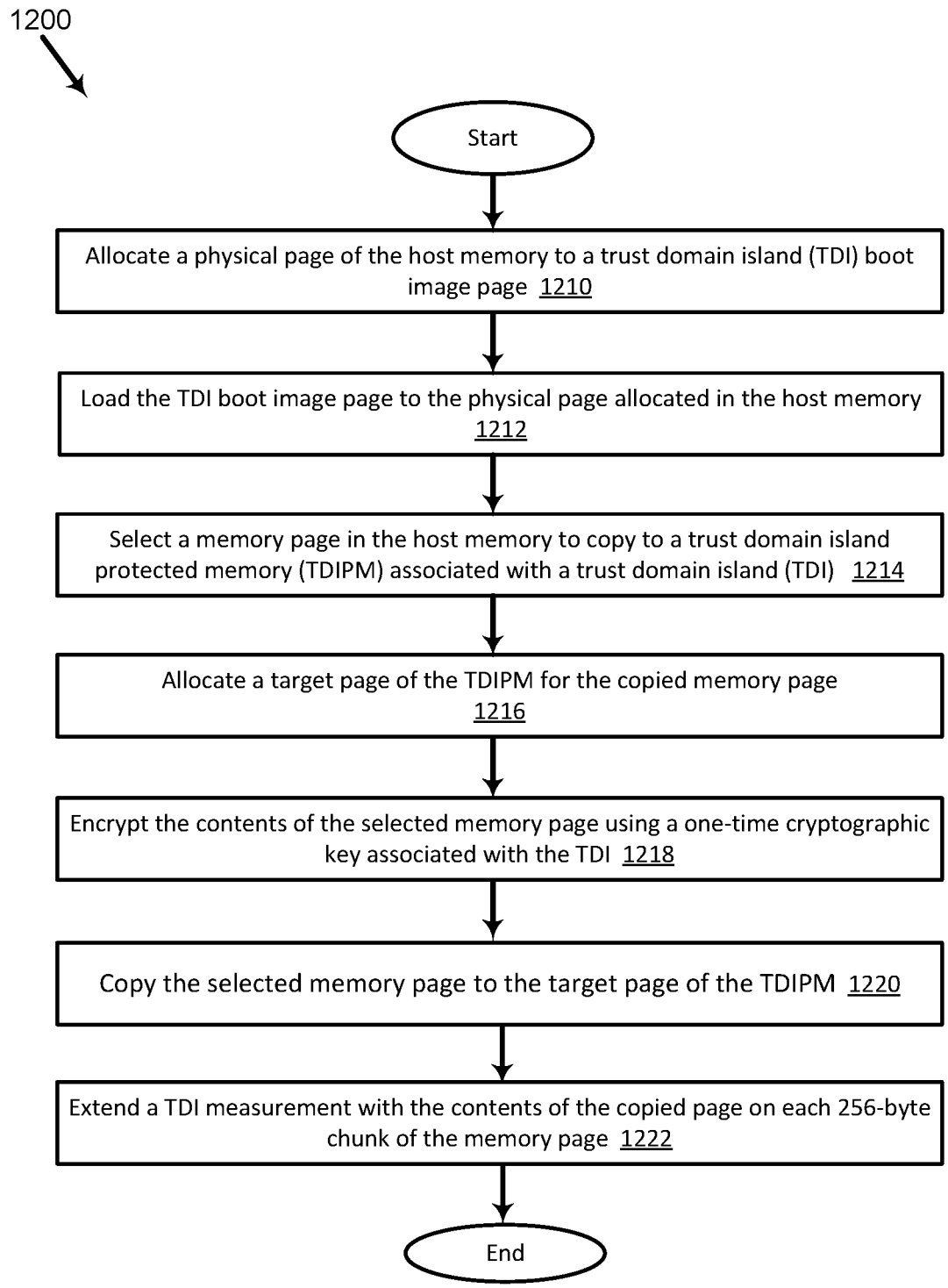
FIG. 12 illustrates a flow diagram for a method of adding a memory page from an address space of a logical processor to a TDIPM, according to embodiments of the present disclosure.

At block 924, the TDIRM may add a memory page from the address space of the logical processor to the TDIPM, which is described in more detail with respect to FIG. 12.

At block 926, the TDIRM may measure the memory page by extending a TDI measurement by a content item of the memory page. The TDIRM may execute a specific instruction (e.g., TDIEXTEND) to extend the TDI measurement with the contents of the added page. A measurement is extended on the TDI to prevent the instructions used to create the TDI from being used again (e.g., TDICREATE, TDIADDPAGE, etc.). The measurement of the TDI may be obtained by computing a secure hash over the inputs of instructions used to create the TDI and load the initial code and data into its memory (e.g., TDICREATE, TDIADD, and TDIEXTEND). The measurement may be computed using a secure hashing algorithm so the system software can only build a TDI that matches an expected measurement by following the exact sequence of instructions executed by the TDIRM. The TDIX design may use a 256-bit SHA-2 secure hash function to compute the measurements. In one embodiment, the TDI measurement may be extended on each 256-byte chunk of the page added to TDIPM. The measurement is repeated until each 256-byte chunk of the added TDI page has been measured. Each TDI measurement may be stored in a field of the TDICS.

Figure 13:
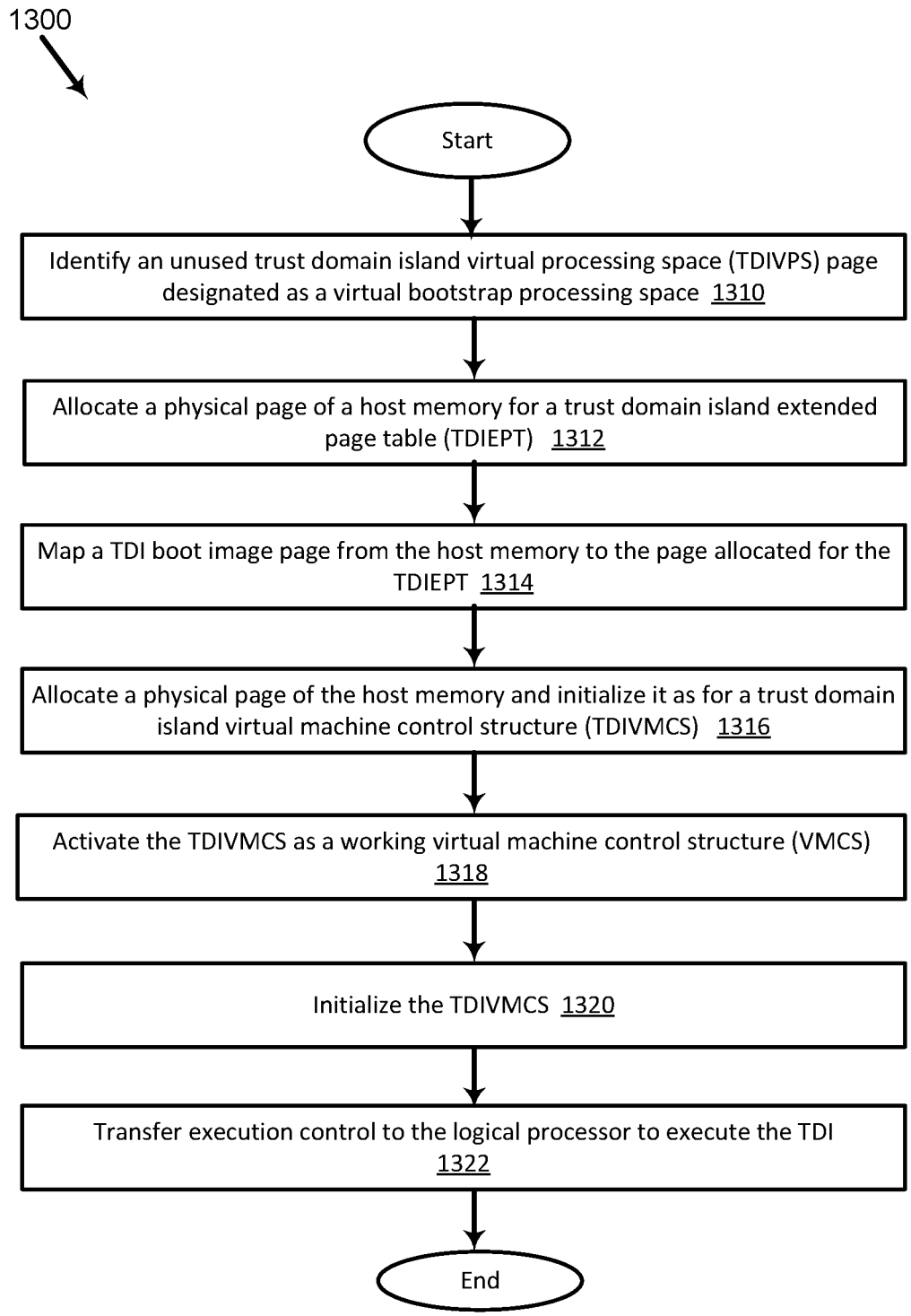
FIG. 13 illustrates a flow diagram for a method of transferring execution control to a logical processor to execute a TDI, according to embodiments of the present disclosure.

At block 928, the TDIRM may transfer execution control to the logical processor associated with the TDI to execute the TDI, which is described in more detail with respect to FIG. 13.

Figure 10:
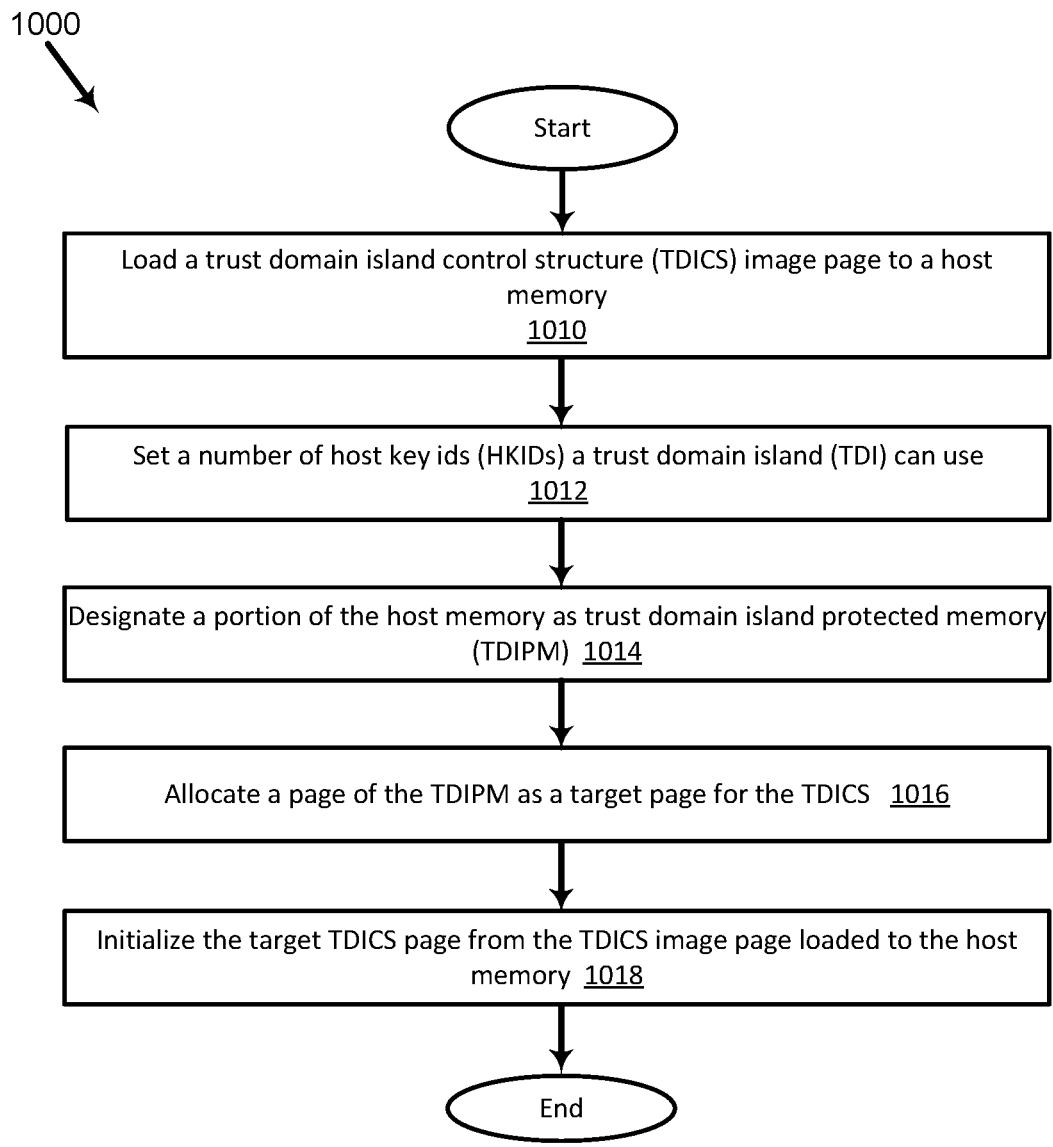
FIG. 10 illustrates a flow diagram for a method of initializing a trust domain island control structure (TDICS) and a trust domain island protected memory (TDIPM), according to embodiments of the present disclosure.

FIG. 10 illustrates a flow diagram for a method 1000 of initializing a TDICS and a TDIPM associated with the TDI. Method 1000 may correspond with the operations performed at 910 (i.e., initialize a TDICS associated with a TDI) and 912 (i.e., initialize a TDIPM associated with the TDI) of method 900 illustrated in FIG. 9.

At block 1010, a TDICS image page may be loaded by the TDIRM to the host memory.

At block 1012, a number of HKIDS the TDI can use may be set by the TDIRM. In one embodiment, the TDI may be allocated one HKID, and therefore would only have one one-time cryptographic key available to encrypt the TDIPM. In another embodiment, the TDI may be allocated multiple HKIDs, and therefore would have multiple one-time cryptographic keys available to encrypt the TDIPM. The number of HKIDS may be saved to the TDICS image page.

At block 1014, a portion of the host memory may be designated as the TDIPM. As discussed above, the TDIPM may occupy a 4 KB naturally occurring region of host memory (e.g., a page of memory).

At block 1016, a page of the TDIPM may be allocated as a target page for the TDICS.

At block 1018, a target TDICS page may be initialized from the TDICS image page loaded to the TDIPM.

Figure 11:
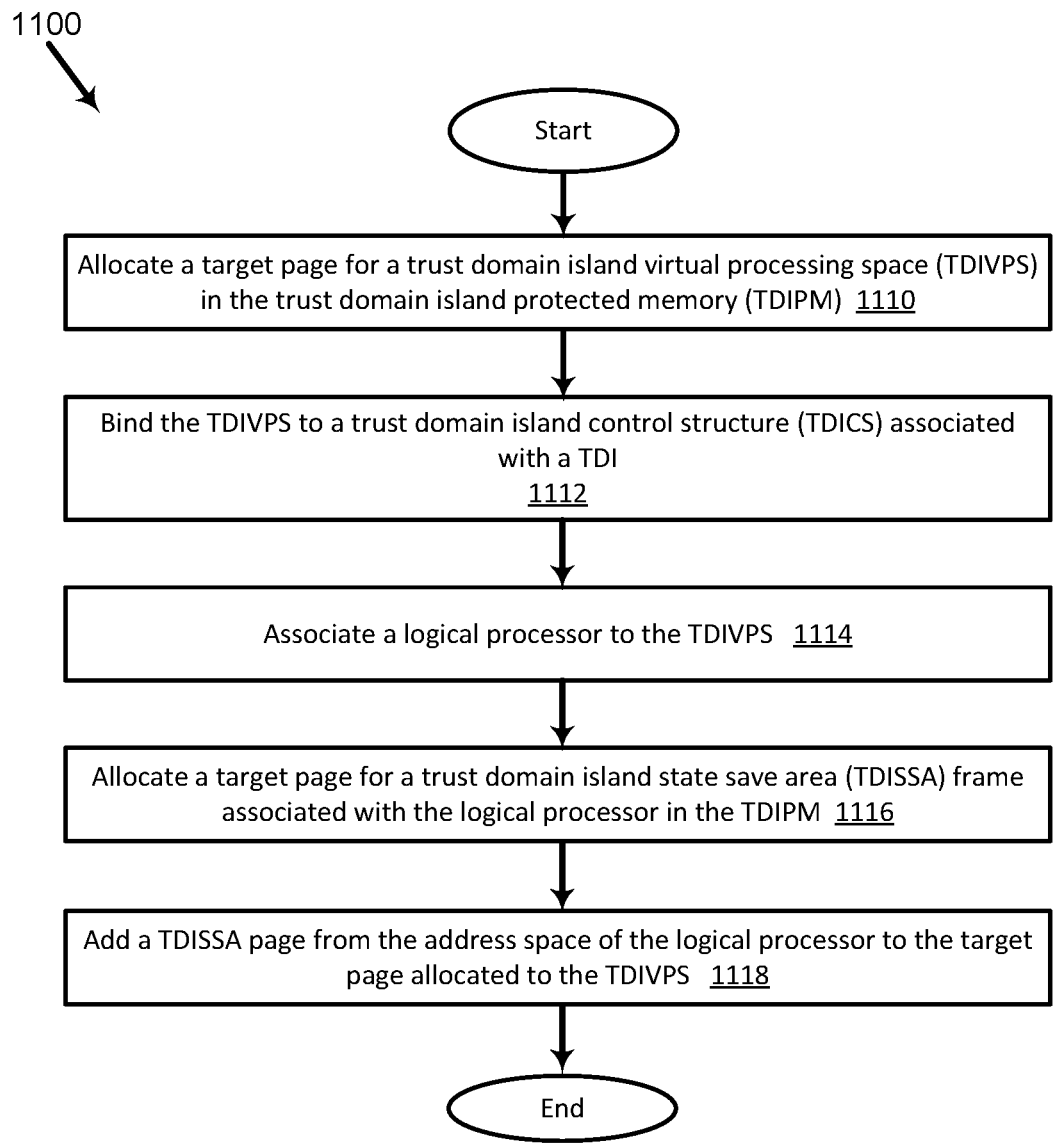
FIG. 11 illustrates a flow diagram for a method of associating a logical processor with a TDI, according to embodiments to the present disclosure.

FIG. 11 illustrates a flow diagram for a method 1100 of associating a logical processor with a TDI. Method 1100 may correspond with the operation performed at block 922 (i.e., associate a logical processor with the TDI) of method 900 illustrated in FIG. 9.

At block 1110, the TDIRM may allocate a target page for a trust domain island virtual processing space (TDIVPS) in the TDIPM. The TDIVPS may include one or more processing threads emulating virtual processors associated with the TDI.

At block 1112, the TDIRM may bind the TDIVPS to the TDICS associated with the TDI.

At block 1114, the TDIRM may associate a logical processor to the TDIVPS. The logical processor may be an executable thread on the processing core to execute the tenant workload of the TDI.

At block 1116, the TDIRM may allocate a target page for a TDI state save area (SSA) frame associated with the logical processor in the TDIPM. A TDI SSA may be included as part of the TDITCS discussed previously with reference to FIGS. 5 and 6. The TDI SSA may be a secure memory page that stores the state of a tenant process executing within the TDI.

At block 1118, the TDIRM may add a TDI SSA page from the address space of the logical processor to the target page allocated to the TDIVPS. The TDIRM may execute a specific instruction (e.g., TDIADDSSA), providing the address of the target page as input, to add a TDISSA page. The execution of this instruction may bind the TDI SSA page to the TDIVPS.

The previously described operations of method 1100 may be performed for each TDIVPS created by the TDIRM. It should be noted that the first TDIVPS created by the TDIRM may be a virtual bootstrap processor (BSP). The virtual BSP may be allocated for any bootstrap operations required during the TDI create process. Any subsequent TDIVPS created by the TDIRM may be a virtual application processor (AP). A virtual AP may be allocated for any tenant operations required while the TDI is executing.

FIG. 12 illustrates a flow diagram for a method 1200 of adding a memory page from the address space of the logical processor to the TDIPM. Method 1200 may correspond with the operation performed at block 924 (i.e., add a memory page from the address space of the logical processor to the TDIPM) of method 900 illustrated in FIG. 9.

At block 1210, the TDIRM may allocate a physical page of the host memory to a TDI boot image page. In one embodiment, the TDIRM may allocate multiple physical pages of the host memory to the TDI boot image page.

At block 1212, the TDIRM may load the TDI boot image page to the physical page allocated in the host memory. The TDI boot image page may contain code and data pages used when the TDI is first executed by the logical processor associated with the TDI.

At block 1214, the TDIRM may select a memory page in the host memory to copy to the TDIPM associated with the TDI.

At block 1216, the TDIRM may allocate a target page of the TDIPM for the copied memory page.

At block 1218, the TDIRM may encrypt the contents of the selected memory page using a one-time cryptographic key associated with the TDI. The one-time cryptographic key may be the same key generated by the TDIRM in block 914 (i.e., generate a one-time cryptographic key) of method 900 illustrated in FIG. 9.

At block 1220, the TDIRM may copy the selected memory page to the target page of the TDIPM.

At block 1222, the TDIRM may extend a TDI measurement with the contents of the copied page on each 256-byte chunk of the memory page.

FIG. 13 illustrates a flow diagram for a method 1300 of transferring execution control to the logical processor to execute the TDI. Method 1300 may correspond with the operation performed at block 928 (i.e., transfer execution control to the logical processor to execute the TDI) of method 900 illustrated in FIG. 9. The following operations may be performed on each logical processor on which the TDIRM wants to launch the TDI.

At block 1310, the TDIRM may identify an unused TDIVPS page designated as a virtual bootstrap processing space.

At block 1312, the TDIRM may allocate a physical page of a host memory for a TDI EPT.

At block 1314, the TDIRM may map a TDI boot image page from the host memory to the page allocated for the TDI EPT. The TDI boot image page may be the same TDI boot image page loaded to the physical page allocated in the host memory of block 1212 (i.e., load the TDI boot image page to the physical page allocated in the host memory) of method 1200 illustrated in FIG. 12.

At block 1316, the TDIRM may allocate a physical page of the host memory and initialize it for a trust domain island virtual machine control structure (TDIVMCS).

At block 1318, the TDIRM may activate the TDIVMCS as a working virtual machine control structure (VMCS). The TDIRM may execute a specific instruction (e.g., VMPTRLD), which activates the TDIVMCS as the working VMCS.

At block 1320, the TDIRM may initialize the TDIVMCS. The TDIRM may execute a specific instruction (e.g., VMWRITE), which initializes the TDIVMCS. The executed instruction may set a host state for the TDIVMCS. The executed instruction may also set a pointer to the TDI EPT and set a link to the selected TDIVPS page.

At block 1322, the TDIRM may transfer execution control to the logical processor to execute the TDI.

FIG. 14 illustrates a flow diagram for a method 1400 for destroying a TDI. In embodiments of this disclosure, a TDI may be destroyed by the TDIRM. The TDIRM may destroy a TDI by executing a specific instruction (e.g., TDISTOP), which may initiate the TDI destruction process.

At block 1410, the TDIRM may prevent a TDI from executing on a logical processor, which is described in more detail with respect to FIG. 15.

At block 1412, the TDIRM may flush a cache entry of a cache associated with the logical processor, where the cache entry contains contents of a memory page associated with the TDI.

At block 1414, the TDIRM may mark a HKID assigned to a one-time cryptographic key associated with the TDI as reclaimed. As discussed above, if an HKID is marked as reclaimed, the HKID is no longer assigned to a one-time cryptographic key associated with the TDI being destroyed, but is not ready for assignment by the TDIRM to other one-time cryptographic keys associated with other TDIs. The TDIRM may not mark the HKID as available until all cache entries of the cache associated with the logical processor have been flushed.

At block 1416, the TDIRM may decide whether all cache entries of the cache associated with the logical processor have been flushed. If the TDIRM has determined that all cache entries of the cache associated with the logical processor have not been flushed, the TDIRM may maintain the status of the HKID in the KOT as reclaimed. In one embodiment, the TDIRM may flush all entries of a translation lookaside buffer (TLB) associated with the logical processor.

At block 1418, the TDIRM may mark the HKID as available for assignment to other one-time cryptographic keys associated with other TDIs. By changing the state of the HKID to available, the HKID may be assigned to other one-time cryptographic keys without risk that the contents protected by the previously assigned key could be accessed.

At block 1420, the TDIRM may remove a memory page from a TDIPM associated with the TDI, which is described in more detail with respect to FIG. 16.

FIG. 15 illustrates a flow diagram for a method 1500 of preventing a TDI from executing on a logical processor. Method 1500 may correspond with the operations performed at blocks 1410 (i.e., prevent a TDI from executing on a logical processor) and 1412 (i.e., flush a cache entry of a cache associated with the logical processor, where the cache entry contains contents of a memory page associated with the TDI) of method 1400 illustrated in FIG. 14.

At block 1510, the TDIRM may select a TDI operating on a host machine to destroy. A TDI may be destroyed because a tenant process operating within the TDI has terminated. A TDI may also be destroyed to reallocate unavailable HKIDs to other TDIs the TDIRM will later create.

At block 1512, the TDIRM may prevent instructions stored in a memory page of the TDIPM associated with the TDI from executing on the host machine.

At block 1514, the TDIRM may broadcast an inter-processor interrupt to a logical processor executing an instruction stored in a memory page of the TDIRM, causing an exit on the logical processor.

At block 1516, the TDIRM may flush a cache entry of a cache associated with the logical processor, where the cache entry contains contents of a memory page associated with the TDI.

FIG. 16 illustrates flow diagram for a method 1600 for removing a memory page from a TDIPM associated with a TDI. Method 1600 may correspond with the operation performed at block 1420 (i.e., remove a memory page from a TDIPM associated with the TDI) of method 1400 illustrated in FIG. 14.

At block 1610, the TDIRM may remove a memory page associated with a tenant workload operating on a TDI from a TDIPM. The TDIRM may execute a specific instruction (e.g., TDIREMOVEPAGE) and provide the address of the memory page associated with the tenant workload in order to remove the memory page.

At 1612, the TDIRM may remove a memory page allocated to a TDI EPT from a host memory associated with a logical processor executing the TDI. The TDIRM may execute a specific instruction (e.g., TDIREMOVEPAGE)

and provide the address of the memory page allocated to the TDI EPT in order to remove the memory page from host memory.

At block 1614, the TDIRM may remove a memory page allocated to a TDI state save area (SSA) frame from the TDIPM. The TDIRM may execute a specific instruction (e.g., TDIREMOVEPAGE) and provide the address of the memory page allocated to the TDI SSA frame in order to remove the memory page from the TDIPM.

At block 1616, the TDIRM may remove a memory page allocated to a TDI VPS from the TDIPM. The TDIRM may execute a specific instruction (e.g., TDIREMOVEPAGE) and provide the address of the memory page allocated to the TDI VPS in order to remove the memory page from the TDIPM.

At block 1618, the TDIRM may remove a memory page allocated to a TDICS from the TDIPM. The TDIRM may execute a specific instruction (e.g., TDIREMOVEPAGE) and provide the address of the memory page allocated to the TDICS in order to remove the memory page from the TDIPM.

At block 1620, the TDIRM may remove a page allocated to a TDI VMCS from the host memory. The TDIRM may execute a specific instruction (e.g., VMCLEAR) and provide the address of the memory page allocated to the TDI VMCS in order to remove the memory page from host memory.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 17A:
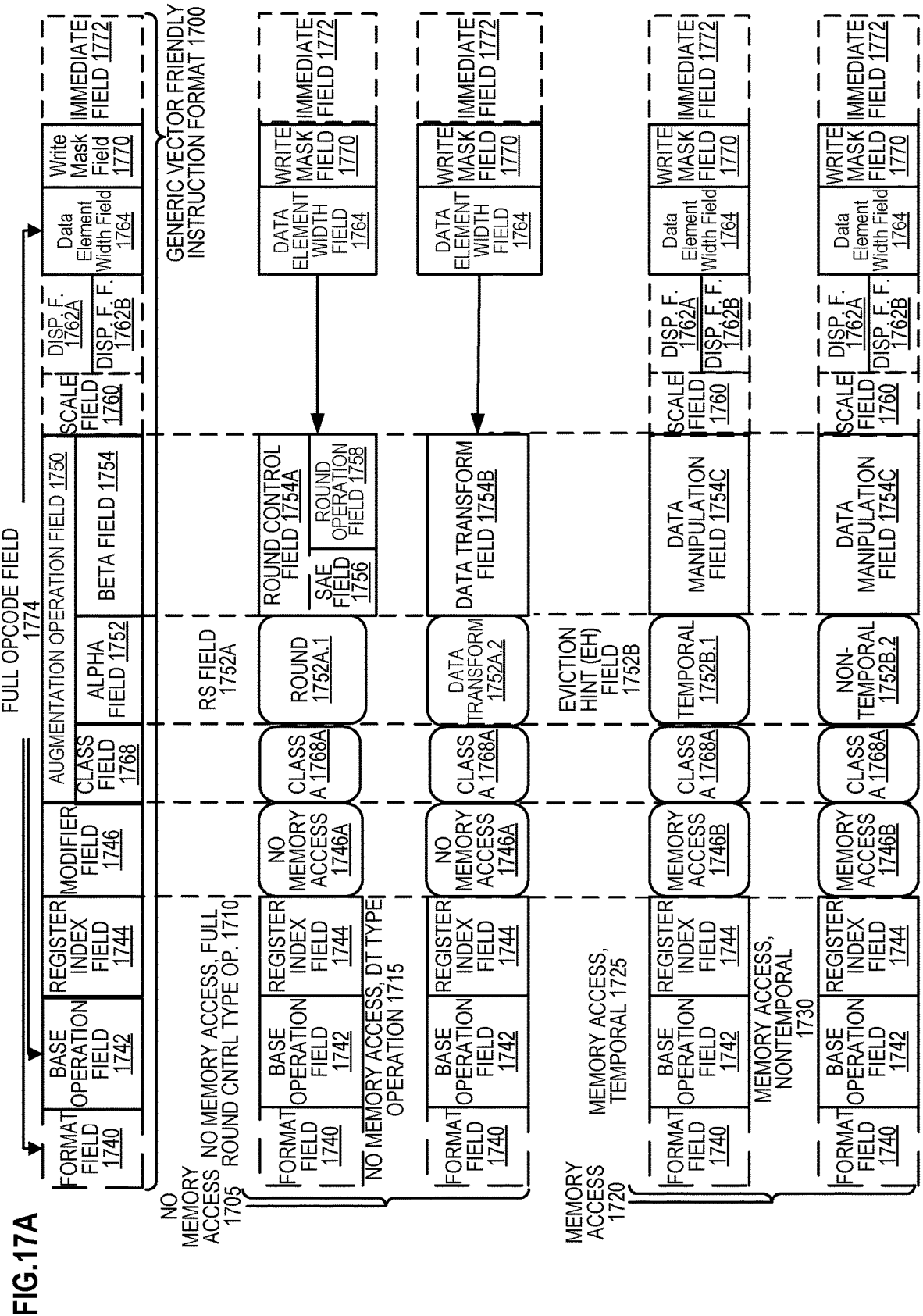
FIGS. 17A-17B are block diagrams illustrating a generic vector friendly instruction format and instruction templates thereof according to some embodiments of the invention.
Figure 17B:
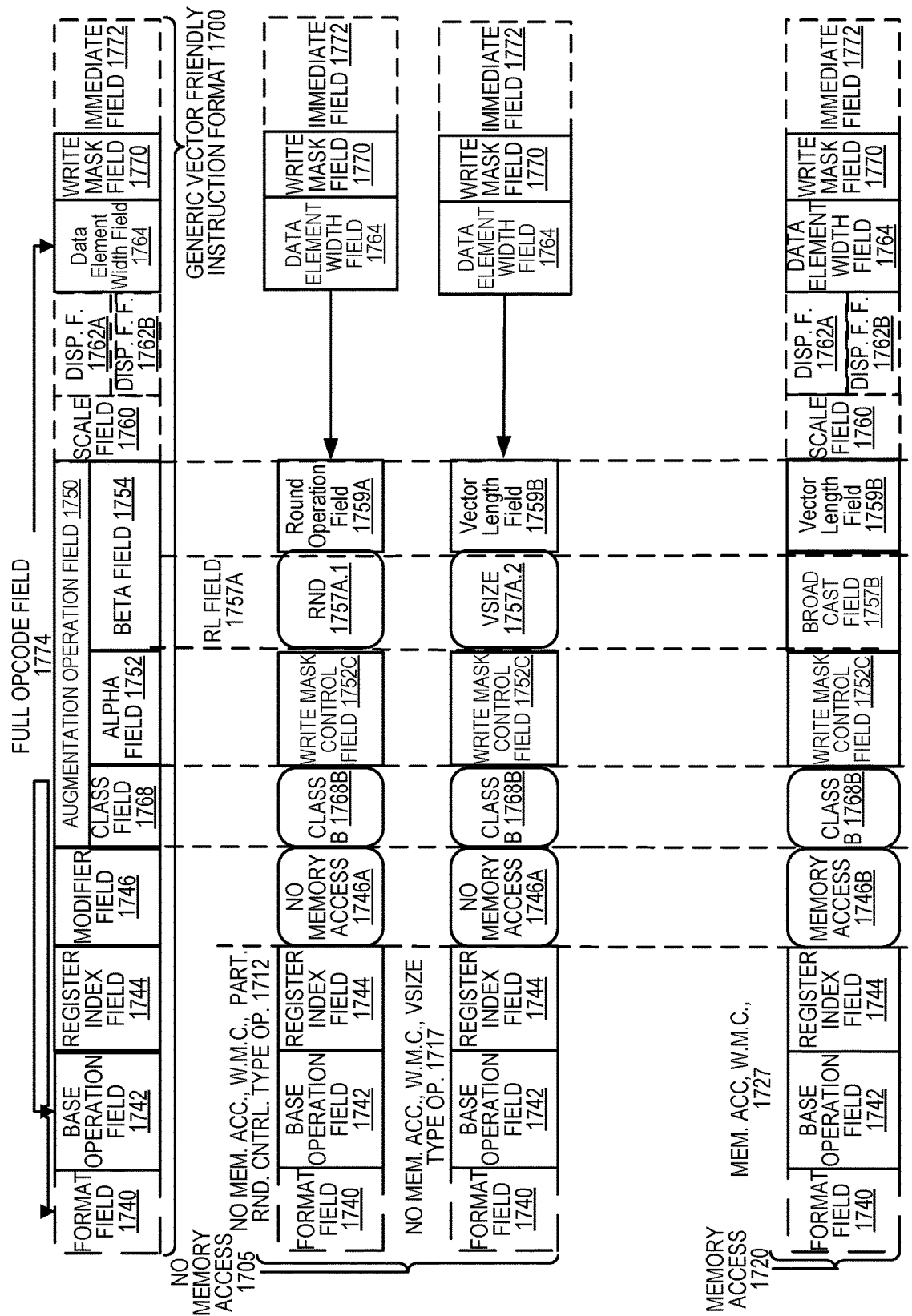

FIGS. 17A-17B are block diagrams illustrating a generic vector friendly instruction format and instruction templates thereof according to some embodiments of the invention. FIG. 17A is a block diagram illustrating a generic vector friendly instruction format and class A instruction templates thereof according to some embodiments of the invention; while FIG. 17B is a block diagram illustrating the generic vector friendly instruction format and class B instruction templates thereof according to some embodiments of the invention. Specifically, a generic vector friendly instruction format 1700 for which are defined class A and class B instruction templates, both of which include no memory access 1705 instruction templates and memory access 1720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 17A include: 1) within the no memory access 1705 instruction templates there is shown a no memory access, full round control type operation 1710 instruction template and a no memory access, data transform type operation 1715 instruction template; and 2) within the memory access 1720 instruction templates there is shown a memory access, temporal 1725 instruction template and a memory access, non-temporal 1730 instruction template. The class B instruction templates in FIG. 17B include: 1) within the no memory access 1705 instruction templates there is shown a no memory access, write mask control, partial round control type operation 1712 instruction template and a no memory access, write mask control, VSIZE type operation 1717 instruction template; and 2) within the memory access 1720 instruction templates there is shown a memory access, write mask control 1727 instruction template.

The generic vector friendly instruction format 1700 includes the following fields listed below in the order illustrated in FIGS. 17A-17B.

Format field 1740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1742—its content distinguishes different base operations.

Register index field 1744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1746—labeled as 1746A for no-memory-access format instructions, and 1746B for memory-access format instructions—distinguishes occurrences of instructions in the generic vector instruction format that specify memory access from those that do not; that is, between no memory access 1705 instruction templates and memory access 1720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1750—its content distinguishes which one of a variety of different operations to be performed in addition to the base operation. This field is context specific. In some embodiments, this field is divided into a class field 1768, an alpha field 1752, and a beta field 1754. The augmentation operation field 1750 allows common groups of operations to be performed in a single instruction rather than 2, 3, or 4 instructions.

Scale field 1760—its content allows for the scaling of the index field's content for memory address generation (e.g., for address generation that uses $2^{scale}$*index+base).

Displacement field 1762A—its content is used as part of memory address generation (e.g., for address generation that uses $2^{scale}$*index+base+displacement).

Displacement Factor Field 1762B (note that the juxtaposition of displacement field 1762A directly over displacement factor field 1762B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1774 (described later herein) and the data manipulation field 1754C. The displacement field 1762A and the displacement factor field 1762B are optional in the sense that they are not used for the no memory access 1705 instruction templates and/or different embodiments may implement only one or none of the two.

Data element width field 1764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1770 allows for partial vector operations, including loads, stores, arithmetic, logical, etc. While embodiments of the invention are described in which the write mask field's 1770 content selects one of a number of write mask registers that contains the write mask to be used (and thus the write mask field's 1770 content indirectly identifies that masking to be performed), alternative embodiments instead or additional allow the mask write field's 1770 content to directly specify the masking to be performed.

Immediate field 1772—its content allows for the specification of an immediate. This field is optional in the sense that is it not present in an implementation of the generic vector friendly format that does not support immediate and it is not present in instructions that do not use an immediate.

Class field 1768—its content distinguishes between different classes of instructions. With reference to FIGS. 17A-B, the contents of this field select between class A and class B instructions. In FIGS. 17A-B, rounded corner squares are used to indicate a specific value is present in a field (e.g., class A 1768A and class B 1768B for the class field 1768 respectively in FIGS. 17A-B).

Instruction Templates of Class A

In the case of the non-memory access 1705 instruction templates of class A, the alpha field 1752 is interpreted as an RS field 1752A, whose content distinguishes which one of the different augmentation operation types are to be performed (e.g., round 1752A.1 and data transform 1752A.2 are respectively specified for the no memory access, round type operation 1710 and the no memory access, data transform type operation 1715 instruction templates), while the beta field 1754 distinguishes which of the operations of the specified type is to be performed. In the no memory access 1705 instruction templates, the scale field 1760, the displacement field 1762A, and the displacement factor field 1762B are not present.

No-Memory Access Instruction Templates—Full Round Control Type Operation

In the no memory access full round control type operation 1710 instruction template, the beta field 1754 is interpreted as a round control field 1754A, whose content(s) provide static rounding. While in the described embodiments of the invention the round control field 1754A includes a suppress all floating-point exceptions (SAE) field 1756 and a round operation control field 1758, alternative embodiments may support may encode both these concepts into the same field or only have one or the other of these concepts/fields (e.g., may have only the round operation control field 1758).

SAE field 1756—its content distinguishes whether or not to disable the exception event reporting; when the SAE field's 1756 content indicates suppression is enabled, a given instruction does not report any kind of floating-point exception flag and does not raise any floating-point exception handler.

Round operation control field 1758—its content distinguishes which one of a group of rounding operations to perform (e.g., Round-up, Round-down, Round-towards-zero and Round-to-nearest). Thus, the round operation control field 1758 allows for the changing of the rounding mode on a per instruction basis. In some embodiments where a processor includes a control register for specifying rounding modes, the round operation control field's 1750 content overrides that register value.

No Memory Access Instruction Templates—Data Transform Type Operation

In the no memory access data transform type operation 1715 instruction template, the beta field 1754 is interpreted as a data transform field 1754B, whose content distinguishes which one of a number of data transforms is to be performed (e.g., no data transform, swizzle, broadcast).

In the case of a memory access 1720 instruction template of class A, the alpha field 1752 is interpreted as an eviction hint field 1752B, whose content distinguishes which one of the eviction hints is to be used (in FIG. 17A, temporal 1752B.1 and non-temporal 1752B.2 are respectively specified for the memory access, temporal 1725 instruction template and the memory access, non-temporal 1730 instruction template), while the beta field 1754 is interpreted as a data manipulation field 1754C, whose content distinguishes which one of a number of data manipulation operations (also known as primitives) is to be performed (e.g., no manipulation; broadcast; up conversion of a source; and down conversion of a destination). The memory access 1720 instruction templates include the scale field 1760, and optionally the displacement field 1762A or the displacement factor field 1762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1752 is interpreted as a write mask control (Z) field 1752C, whose content distinguishes whether the write masking controlled by the write mask field 1770 should be a merging or a zeroing.

In the case of the non-memory access 1705 instruction templates of class B, part of the beta field 1754 is interpreted as an RL field 1757A, whose content distinguishes which one of the different augmentation operation types are to be performed (e.g., round 1757A.1 and vector length (VSIZE) 1757A.2 are respectively specified for the no memory access, write mask control, partial round control type operation 1712 instruction template and the no memory access, write mask control, VSIZE type operation 1717 instruction template), while the rest of the beta field 1754 distinguishes which of the operations of the specified type is to be performed. In the no memory access 1705 instruction templates, the scale field 1760, the displacement field 1762A, and the displacement factor field 1762B are not present.

In the no memory access, write mask control, partial round control type operation 1710 instruction template, the rest of the beta field 1754 is interpreted as a round operation field 1759A and exception event reporting is disabled (a given instruction does not report any kind of floating-point exception flag and does not raise any floating-point exception handler).

Round operation control field 1759A—just as round operation control field 1758, its content distinguishes which one of a group of rounding operations to perform (e.g., Round-up, Round-down, Round-towards-zero and Round-to-nearest). Thus, the round operation control field 1759A allows for the changing of the rounding mode on a per instruction basis. In some embodiments where a processor includes a control register for specifying rounding modes, the round operation control field's 1750 content overrides that register value.

In the no memory access, write mask control, VSIZE type operation 1717 instruction template, the rest of the beta field 1754 is interpreted as a vector length field 1759B, whose content distinguishes which one of a number of data vector lengths is to be performed on (e.g., 128, 256, or 512 byte).

In the case of a memory access 1720 instruction template of class B, part of the beta field 1754 is interpreted as a broadcast field 1757B, whose content distinguishes whether or not the broadcast type data manipulation operation is to be performed, while the rest of the beta field 1754 is interpreted the vector length field 1759B. The memory access 1720 instruction templates include the scale field 1760, and optionally the displacement field 1762A or the displacement factor field 1762B.

With regard to the generic vector friendly instruction format 1700, a full opcode field 1774 is shown including the format field 1740, the base operation field 1742, and the data element width field 1764. While one embodiment is shown where the full opcode field 1774 includes all of these fields, the full opcode field 1774 includes less than all of these fields in embodiments that do not support all of them. The full opcode field 1774 provides the operation code (opcode).

The augmentation operation field 1750, the data element width field 1764, and the write mask field 1770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 18A is a block diagram illustrating an exemplary specific vector friendly instruction format according to some embodiments of the invention. FIG. 18A shows a specific vector friendly instruction format 1800 that is specific in the sense that it specifies the location, size, interpretation, and order of the fields, as well as values for some of those fields. The specific vector friendly instruction format 1800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 17A or 17B into which the fields from FIG. 18A map are illustrated.

It should be understood that, although embodiments of the invention are described with reference to the specific vector friendly instruction format 1800 in the context of the generic vector friendly instruction format 1700 for illustrative purposes, the invention is not limited to the specific vector friendly instruction format 1800 except where claimed. For example, the generic vector friendly instruction format 1700 contemplates a variety of possible sizes for the various fields, while the specific vector friendly instruction format 1800 is shown as having fields of specific sizes. By way of specific example, while the data element width field 1764 is illustrated as a one bit field in the specific vector friendly instruction format 1800, the invention is not so limited (that is, the generic vector friendly instruction format 1700 contemplates other sizes of the data element width field 1764).

The specific vector friendly instruction format 1800 includes the following fields listed below in the order illustrated in FIG. 18A.

EVEX Prefix (Bytes 0-3) 1802—is encoded in a four-byte form.

Format Field 1740 (EVEX Byte 0, bits [7:0])—the first byte (EVEX Byte 0) is the format field 1740 and it contains 0x62 (the unique value used for distinguishing the vector friendly instruction format in some embodiments).

The second-fourth bytes (EVEX Bytes 1-3) include a number of bit fields providing specific capability.

REX field 1805 (EVEX Byte 1, bits [7-5])—consists of a EVEX.R bit field (EVEX Byte 1, bit [7]-R), EVEX.X bit field (EVEX byte 1, bit [6]-X), and EVEX.B bit field (EVEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 1810A—this is the first part of the REX' field 1810 and is the EVEX.R' bit field (EVEX Byte 1, bit [4]-R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1815 (EVEX byte 1, bits [3:0]-mmmm)—its content encodes an implied leading opcode byte (0F, 0F 38, or 0F 3).

Data element width field 1764 (EVEX byte 2, bit [7]-W)—is represented by the notation EVEX.W. EVEX.W is used to define the granularity (size) of the datatype (either 32-bit data elements or 64-bit data elements).

EVEX.vvvv 1820 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1820 encodes the 4 low-order bits of the first source register specifier stored in inverted (1s complement) form. Depending on the instruction, an extra different EVEX bit field is used to extend the specifier size to 32 registers.

EVEX.U 1768 Class field (EVEX byte 2, bit [2]-U)—If EVEX.U=0, it indicates class A or EVEX.U0; if EVEX.U=1, it indicates class B or EVEX.U1.

Prefix encoding field 1825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1752 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 1754 (EVEX byte 3, bits [6:4]-SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' 1810B—this is the remainder of the REX' field 1810 and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1770 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1830 (Byte 4) is also known as the opcode byte. Part of the opcode is specified in this field.

MOD R/M Field 1840 (Byte 5) includes MOD field 1842, Reg field 1844, and R/M field 1846. As previously described, the MOD field's 1842 content distinguishes between memory access and non-memory access operations. The role of Reg field 1844 can be summarized to two situations: encoding either the destination register operand or a source register operand or be treated as an opcode extension and not used to encode any instruction operand. The role of R/M field 1846 may include the following: encoding the instruction operand that references a memory address or encoding either the destination register operand or a source register operand.

Scale, Index, Base (SIB) Byte (Byte 6) 1850—As previously described, the scale field SIB.ss 1852 is used for memory address generation. SIB.xxx 1854 and SIB.bbb 1856—the contents of these fields have been previously referred to with regard to the register indexes Xxxx and Bbbb.

Displacement field 1762A (Bytes 7-10)—when MOD field 1842 contains 10, bytes 7-10 are the displacement field 1762A, and it works the same as the legacy 32-bit displacement (disp32) and works at byte granularity.

Displacement factor field 1762B (Byte 7)—when MOD field 1842 contains 01, byte 7 is the displacement factor field 1762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1762B is a reinterpretation of disp8; when using displacement factor field 1762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1762B substitutes the legacy x86 instruction set 8-bit displacement. Thus, the displacement factor field 1762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1772 operates as previously described.

Full Opcode Field

FIG. 18B is a block diagram illustrating the fields of the specific vector friendly instruction format 1800 that make up the full opcode field 1774 according to some embodiments. Specifically, the full opcode field 1774 includes the format field 1740, the base operation field 1742, and the data element width (W) field 1764. The base operation field 1742 includes the prefix encoding field 1825, the opcode map field 1815, and the real opcode field 1830.

Register Index Field

FIG. 18C is a block diagram illustrating the fields of the specific vector friendly instruction format 1800 that make up the register index field 1744 according to some embodiments. Specifically, the register index field 1744 includes the REX field 1805, the REX' field 1810, the MODR/M.reg field 1844, the MODR/M.r/m field 1846, the VVVV field 1820, xxx field 1854, and the bbb field 1856.

Augmentation Operation Field

Figure 18D:
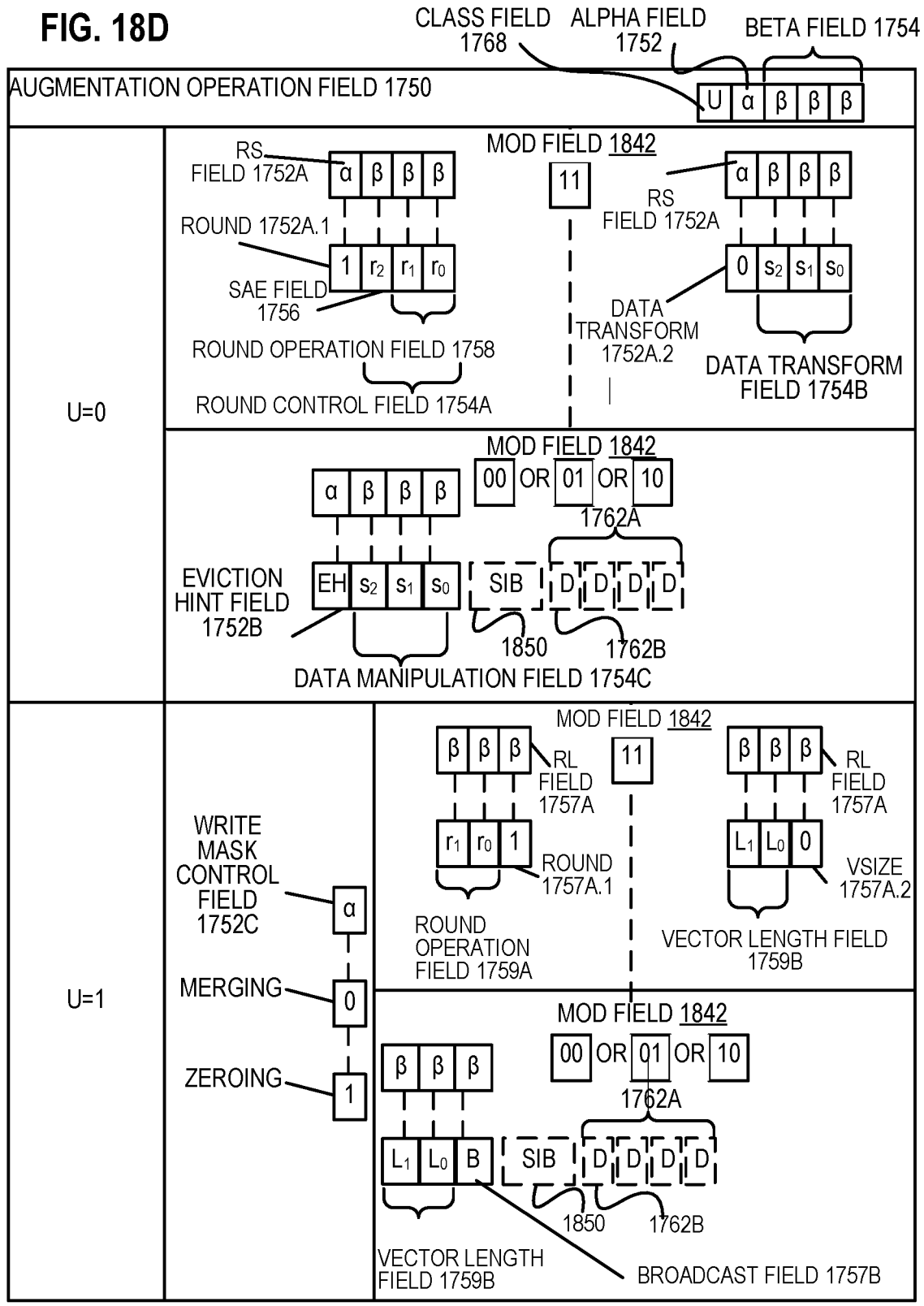
FIG. 18D is a block diagram illustrating the fields of the specific vector friendly instruction format that make up the augmentation operation field according to one embodiment.

FIG. 18D is a block diagram illustrating the fields of the specific vector friendly instruction format 1800 that make up the augmentation operation field 1750 according to some embodiments. When the class (U) field 1768 contains 0, it signifies EVEX.U0 (class A 1768A); when it contains 1, it signifies EVEX.U1 (class B 1768B). When U=0 and the MOD field 1842 contains 11 (signifying a no memory access operation), the alpha field 1752 (EVEX byte 3, bit [7]-EH) is interpreted as the rs field 1752A. When the rs field 1752A contains a 1 (round 1752A.1), the beta field 1754 (EVEX byte 3, bits [6:4]-SSS) is interpreted as the round control field 1754A. The round control field 1754A includes a one bit SAE field 1756 and a two bit round operation field 1758. When the rs field 1752A contains a 0 (data transform 1752A.2), the beta field 1754 (EVEX byte 3, bits [6:4]-SSS) is interpreted as a three bit data transform field 1754B. When U=0 and the MOD field 1842 contains 00, 01, or 10 (signifying a memory access operation), the alpha field 1752 (EVEX byte 3, bit [7]-EH) is interpreted as the eviction hint (EH) field 1752B and the beta field 1754 (EVEX byte 3, bits [6:4]-SSS) is interpreted as a data manipulation field 1754C having three bits.

When U=1, the alpha field 1752 (EVEX byte 3, bit [7]-EH) is interpreted as the write mask control (Z) field 1752C. When U=1 and the MOD field 1842 contains 11 (signifying a no memory access operation), part of the beta field 1754 (EVEX byte 3, bit [4]-S$_0$) is interpreted as the RL field 1757A; when it contains a 1 (round 1757A.1) the rest of the beta field 1754 (EVEX byte 3, bit [6-5]-$S_{2-1}$) is interpreted as the round operation field 1759A, while when the RL field 1757A contains a 0 (VSIZE 1757.A2) the rest of the beta field 1754 (EVEX byte 3, bit [6-5]-$S_{2-1}$) is interpreted as the vector length field 1759B (EVEX byte 3, bit [6-5]-$L_{1-0}$). When U=1 and the MOD field 1842 contains 00, 01, or 10 (signifying a memory access operation), the beta field 1754 (EVEX byte 3, bits [6:4]-SSS) is interpreted as the vector length field 1759B (EVEX byte 3, bit [6-5]-$L_{1-0}$) and the broadcast field 1757B (EVEX byte 3, bit [4]-B).

Exemplary Register Architecture

Figure 19:
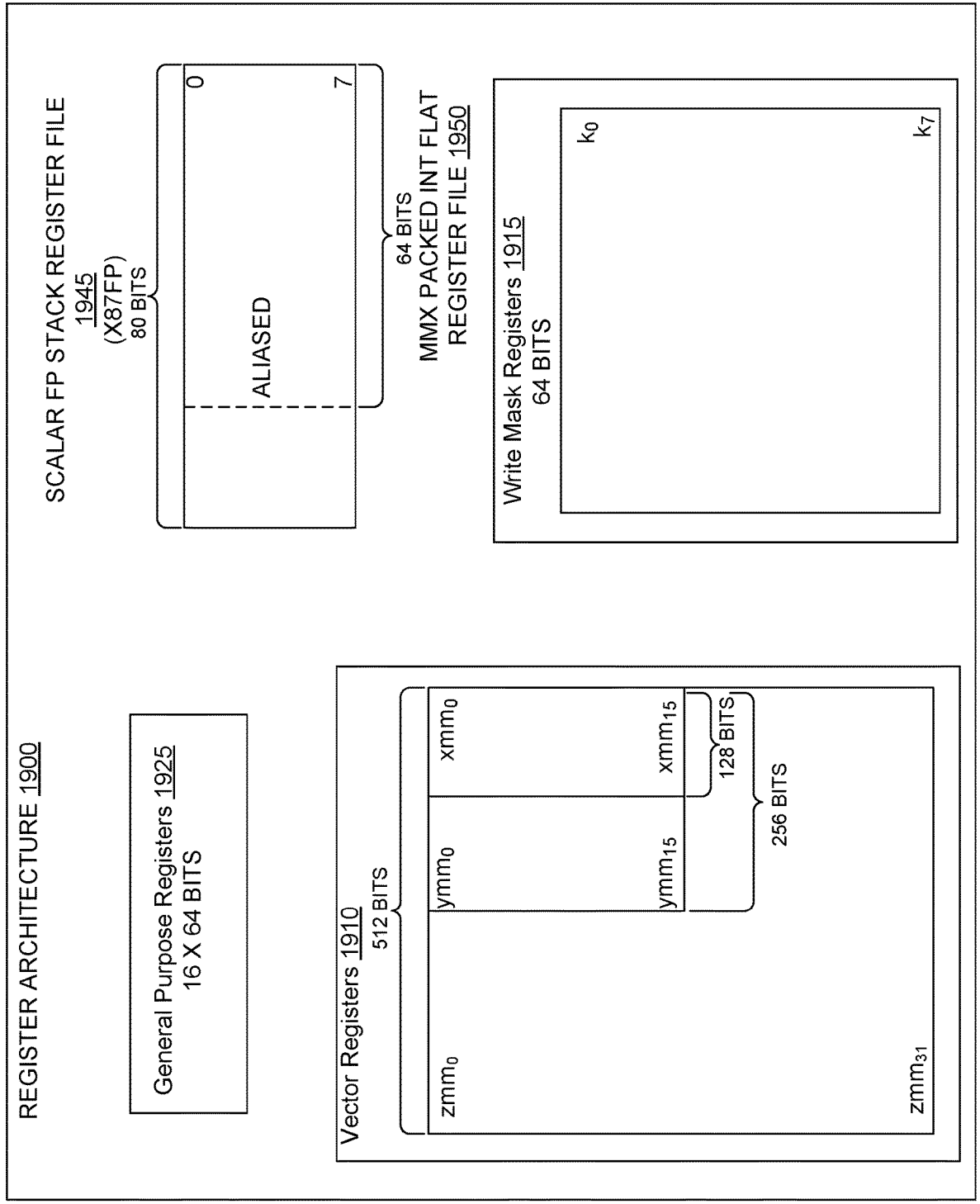
FIG. 19 is a block diagram of a register architecture according to one embodiment.

FIG. 19 is a block diagram of a register architecture 1900 according to some embodiments. In the embodiment illustrated, there are 32 vector registers 1910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1800 operates on these overlaid register file as illustrated in the below tables.

| Adjustable Vector Length | Class | Operations | Registers |
|---|---|---|---|
| Instruction Templates that do not include the vector length field 1759B | A (FIG. 17A; U = 0) | 1710, 1715, 1725, 1730 | zmm registers (the vector length is 64 byte) |
|  | B (FIG. 17B; U = 1) | 1712 | zmm registers (the vector length is 64 byte) |
| Instruction templates that do include the vector length field 1759B | B (FIG. 17B; U = 1) | 1717, 1727 | zmm, ymm, or xmm registers (the vector length is 64 byte, 32 byte, or 16 byte) depending on the vector length field 1759B |

In other words, the vector length field 1759B selects between a maximum length and one or more other shorter lengths, where each such shorter length is half the length of the preceding length; and instructions templates without the vector length field 1759B operate on the maximum vector length. Further, in one embodiment, the class B instruction templates of the specific vector friendly instruction format 1800 operate on packed or scalar single/double-precision floating-point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1915—in the embodiment illustrated, there are 8 write mask registers (k0 through k7), each 64 bits in size. In an alternate embodiment, the write mask registers 1915 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 1945, on which is aliased the MMX packed integer flat register file 1950—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 20A is a block diagram illustrating both an exemplary in-order pipeline and an exemplary register renaming, out-of-order issue/execution pipeline according to some embodiments of the invention. FIG. 20B is a block diagram illustrating both an exemplary embodiment of an in-order architecture core and an exemplary register renaming, out-of-order issue/execution architecture core to be included in a processor according to some embodiments of the invention. The solid lined boxes in FIGS. 20A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 20A, a processor pipeline 2000 includes a fetch stage 2002, a length decode stage 2004, a decode stage 2006, an allocation stage 2008, a renaming stage 2010, a scheduling (also known as a dispatch or issue) stage 2012, a register read/memory read stage 2014, an execute stage 2016, a write back/memory write stage 2018, an exception handling stage 2022, and a commit stage 2024.

FIG. 20B shows processor core 2090 including a front end unit 2030 coupled to an execution engine unit 2050, and both are coupled to a memory unit 2070. The core 2090 may be a reduced instruction set computing (RISC) core, a complex instruction set computing (CISC) core, a very long instruction word (VLIW) core, or a hybrid or alternative core type. As yet another option, the core 2090 may be a special-purpose core, such as, for example, a network or communication core, compression engine, coprocessor core, general purpose computing graphics processing unit (GPGPU) core, graphics core, or the like.

The front end unit 2030 includes a branch prediction unit 2032 coupled to an instruction cache unit 2034, which is coupled to an instruction translation lookaside buffer (TLB) 2036, which is coupled to an instruction fetch unit 2038, which is coupled to a decode unit 2040. The decode unit 2040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2090 includes a microcode ROM or other medium that stores microcode for certain macroinstructions (e.g., in decode unit 2040 or otherwise within the front end unit 2030). The decode unit 2040 is coupled to a rename/allocator unit 2052 in the execution engine unit 2050.

The execution engine unit 2050 includes the rename/allocator unit 2052 coupled to a retirement unit 2054 and a set of one or more scheduler unit(s) 2056. The scheduler unit(s) 2056 represents any number of different schedulers, including reservations stations, central instruction window, etc. The scheduler unit(s) 2056 is coupled to the physical register file(s) unit(s) 2058. Each of the physical register file(s) units 2058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 2058 comprises a vector registers unit, a write mask registers unit, and a scalar registers unit. These register units may provide architectural vector registers, vector mask registers, and general purpose registers. The physical register file(s) unit(s) 2058 is overlapped by the retirement unit 2054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2054 and the physical register file(s) unit(s) 2058 are coupled to the execution cluster(s) 2060. The execution cluster(s) 2060 includes a set of one or more execution units 2062 and a set of one or more memory access units 2064. The execution units 2062 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 2056, physical register file(s) unit(s) 2058, and execution cluster(s) 2060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2064). It should also be understood that where separate pipelines are used, one or more of these pipelines may be out-of-order issue/execution and the rest in-order.

The set of memory access units 2064 is coupled to the memory unit 2070, which includes a data TLB unit 2072 coupled to a data cache unit 2074 coupled to a level 2 (L2) cache unit 2076. In one exemplary embodiment, the memory access units 2064 may include a load unit, a store address unit, and a store data unit, each of which is coupled to the data TLB unit 2072 in the memory unit 2070. The instruction cache unit 2034 is further coupled to a level 2 (L2) cache unit 2076 in the memory unit 2070. The L2 cache unit 2076 is coupled to one or more other levels of cache and eventually to a main memory.

By way of example, the exemplary register renaming, out-of-order issue/execution core architecture may implement the pipeline 2000 as follows: 1) the instruction fetch 2038 performs the fetch and length decoding stages 2002 and 2004; 2) the decode unit 2040 performs the decode stage 2006; 3) the rename/allocator unit 2052 performs the allocation stage 2008 and renaming stage 2010; 4) the scheduler unit(s) 2056 performs the schedule stage 2012; 5) the physical register file(s) unit(s) 2058 and the memory unit 2070 perform the register read/memory read stage 2014; the execution cluster 2060 perform the execute stage 2016; 6) the memory unit 2070 and the physical register file(s) unit(s) 2058 perform the write back/memory write stage 2018; 7) various units may be involved in the exception handling stage 2022; and 8) the retirement unit 2054 and the physical register file(s) unit(s) 2058 perform the commit stage 2024.

The core 2090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2090 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2034/2074 and a shared L2 cache unit 2076, alternative embodiments may have a single internal cache for both instructions and data, such as, for example, a Level 1(L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 21B:
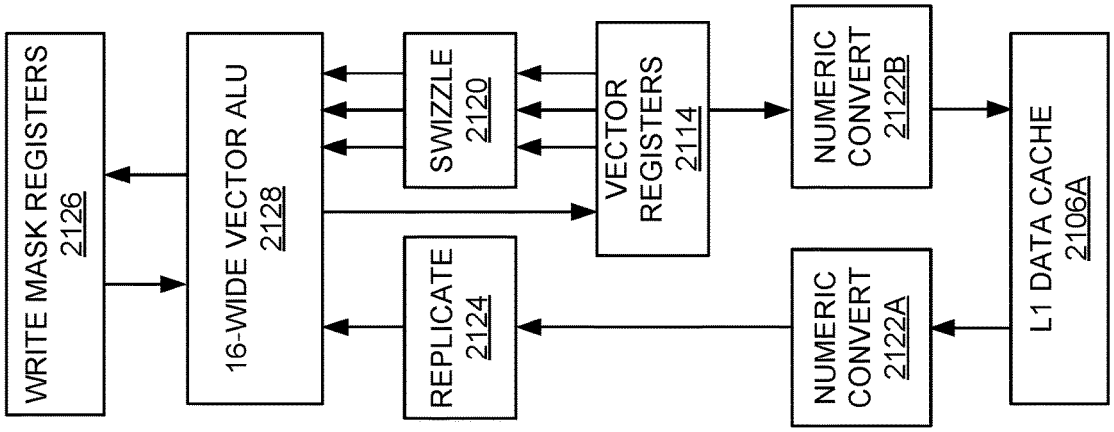
FIGS. 21A-B illustrate a block diagram of a more specific exemplary in-order core architecture, which core would be one of several logic blocks (including other cores of the same type and/or different types) in a chip.
Figure 21A:
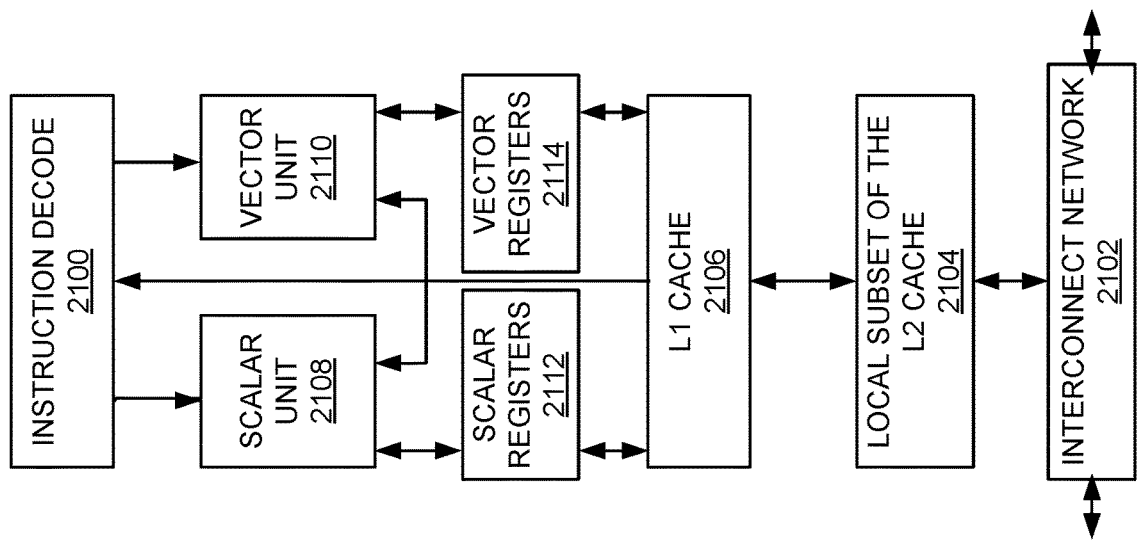

FIGS. 21A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 21A is a block diagram of a single processor core, along with its connection to the on-die interconnect network 2102 and with its local subset of the Level 2 (L2) cache 2104, according to some embodiments of the invention. In one embodiment, an instruction decoder 2100 supports the x86 instruction set with a packed data instruction set extension. An L1 cache 2106 allows low-latency accesses to cache memory into the scalar and vector units. While in one embodiment (to simplify the design), a scalar unit 2108 and a vector unit 2110 use separate register sets (respectively, scalar registers 2112 and vector registers 2114) and data transferred between them is written to memory and then read back in from a level 1(L1) cache 2106, alternative embodiments of the invention may use a different approach (e.g., use a single register set or include a communication path that allow data to be transferred between the two register files without being written and read back).

The local subset of the L2 cache 2104 is part of a global L2 cache that is divided into separate local subsets, one per processor core. Each processor core has a direct access path to its own local subset of the L2 cache 2104. Data read by a processor core is stored in its L2 cache subset 2104 and can be accessed quickly, in parallel with other processor cores accessing their own local L2 cache subsets. Data written by a processor core is stored in its own L2 cache subset 2104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 21B is an expanded view of part of the processor core in FIG. 21A according to some embodiments of the invention. FIG. 21B includes an L1 data cache 2106A part of the L1 cache 2104, as well as more detail regarding the vector unit 2110 and the vector registers 2114. Specifically, the vector unit 2110 is a 16-wide vector processing unit (VPU) (see the 16-wide ALU 2128), which executes one or more of integer, single-precision float, and double-precision float instructions. The VPU supports swizzling the register inputs with swizzle unit 2120, numeric conversion with numeric convert units 2122A and 2122B, and replication with replication unit 2124 on the memory input. Write mask registers 2126 allow predicating resulting vector writes.

Figure 22:
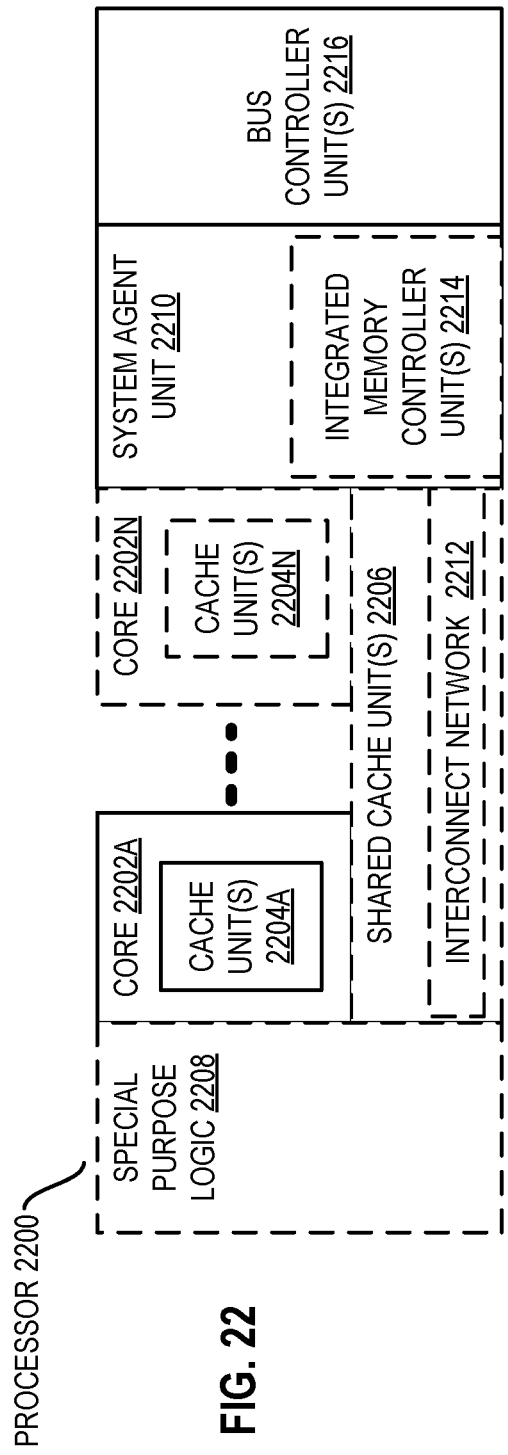
FIG. 22 is a block diagram of a processor that may have more than one core, may have an integrated memory controller, and may have integrated graphics according to some embodiments.

FIG. 22 is a block diagram of a processor 2200 that may have more than one core, may have an integrated memory controller, and may have integrated graphics according to some embodiments of the invention. The solid lined boxes in FIG. 22 illustrate a processor 2200 with a single core 2202A, a system agent 2210, a set of one or more bus controller units 2216, while the optional addition of the dashed lined boxes illustrates an alternative processor 2200 with multiple cores 2202A through 2202N, a set of one or more integrated memory controller unit(s) 2214 in the system agent unit 2210, and special purpose logic 2208.

Thus, different implementations of the processor 2200 may include: 1) a CPU with the special purpose logic 2208 being integrated graphics and/or scientific (throughput) logic (which may include one or more cores), and the cores 2202A-N being one or more general purpose cores (e.g., general purpose in-order cores, general purpose out-of-order cores, a combination of the two); 2) a coprocessor with the cores 2202A-N being a large number of special purpose cores intended primarily for graphics and/or scientific (throughput); and 3) a coprocessor with the cores 2202A-N being a large number of general purpose in-order cores. Thus, the processor 2200 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2206, and external memory (not shown) coupled to the set of integrated memory controller units 2214. The set of shared cache units 2206 may include one or more mid-level caches, such as level 2 (L2), level 3 (L3), level 4 (L4), or other levels of cache, a last level cache (LLC), and/or combinations thereof. While in one embodiment a ring based interconnect unit 2212 interconnects the integrated graphics logic 2208 (integrated graphics logic 2208 is an example of and is also referred to herein as special purpose logic), the set of shared cache units 2206, and the system agent unit 2210/integrated memory controller unit(s) 2214, alternative embodiments may use any number of well-known techniques for interconnecting such units. In one embodiment, coherency is maintained between one or more cache units 2206 and cores 2202-A-N.

In some embodiments, one or more of the cores 2202A-N are capable of multithreading. The system agent 2210 includes those components coordinating and operating cores 2202A-N. The system agent unit 2210 may include for example a power control unit (PCU) and a display unit. The PCU may be or include logic and components needed for regulating the power state of the cores 2202A-N and the integrated graphics logic 2208. The display unit is for driving one or more externally connected displays.

The cores 2202A-N may be homogenous or heterogeneous in terms of architecture instruction set; that is, two or more of the cores 2202A-N may be capable of execution the same instruction set, while others may be capable of executing only a subset of that instruction set or a different instruction set.

Exemplary Computer Architectures

FIGS. 23-26 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 23:
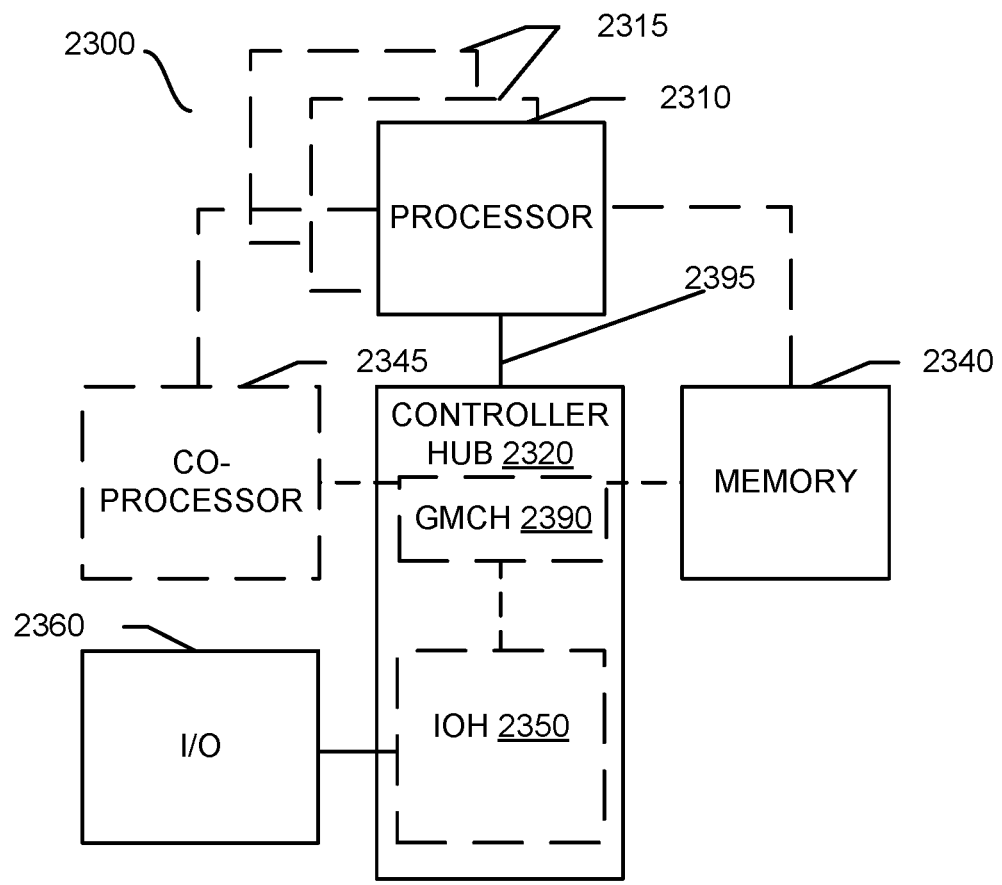
FIGS. 23-26 are block diagrams of exemplary computer architectures.

Referring now to FIG. 23, shown is a block diagram of a system 2300 in accordance with one embodiment of the present invention. The system 2300 may include one or more processors 2310, 2315, which are coupled to a controller hub 2320. In one embodiment the controller hub 2320 includes a graphics memory controller hub (GMCH) 2390 and an Input/Output Hub (IOH) 2350 (which may be on separate chips); the GMCH 2390 includes memory and graphics controllers to which are coupled memory 2340 and a coprocessor 2345; the IOH 2350 couples input/output (I/O) devices 2360 to the GMCH 2390. Alternatively, one or both of the memory and graphics controllers are integrated within the processor (as described herein), the memory 2340 and the coprocessor 2345 are coupled directly to the processor 2310, and the controller hub 2320 in a single chip with the IOH 2350.

The optional nature of additional processors 2315 is denoted in FIG. 23 with broken lines. Each processor 2310, 2315 may include one or more of the processing cores described herein and may be some version of the processor 2200.

The memory 2340 may be, for example, dynamic random access memory (DRAM), phase change memory (PCM), or a combination of the two. For at least one embodiment, the controller hub 2320 communicates with the processor(s) 2310, 2315 via a multi-drop bus, such as a frontside bus (FSB), point-to-point interface such as QuickPath Interconnect (QPI), or similar connection 2395.

In one embodiment, the coprocessor 2345 is a special-purpose processor, such as, for example, a high-throughput MIC processor, a network or communication processor, compression engine, graphics processor, GPGPU, embedded processor, or the like. In one embodiment, controller hub 2320 may include an integrated graphics accelerator.

There can be a variety of differences between the physical resources 2310, 2315 in terms of a spectrum of metrics of merit including architectural, microarchitectural, thermal, power consumption characteristics, and the like.

In one embodiment, the processor 2310 executes instructions that control data processing operations of a general type. Embedded within the instructions may be coprocessor instructions. The processor 2310 recognizes these coprocessor instructions as being of a type that should be executed by the attached coprocessor 2345. Accordingly, the processor 2310 issues these coprocessor instructions (or control signals representing coprocessor instructions) on a coprocessor bus or other interconnect, to coprocessor 2345. Coprocessor (s) 2345 accept and execute the received coprocessor instructions.

Figure 24:
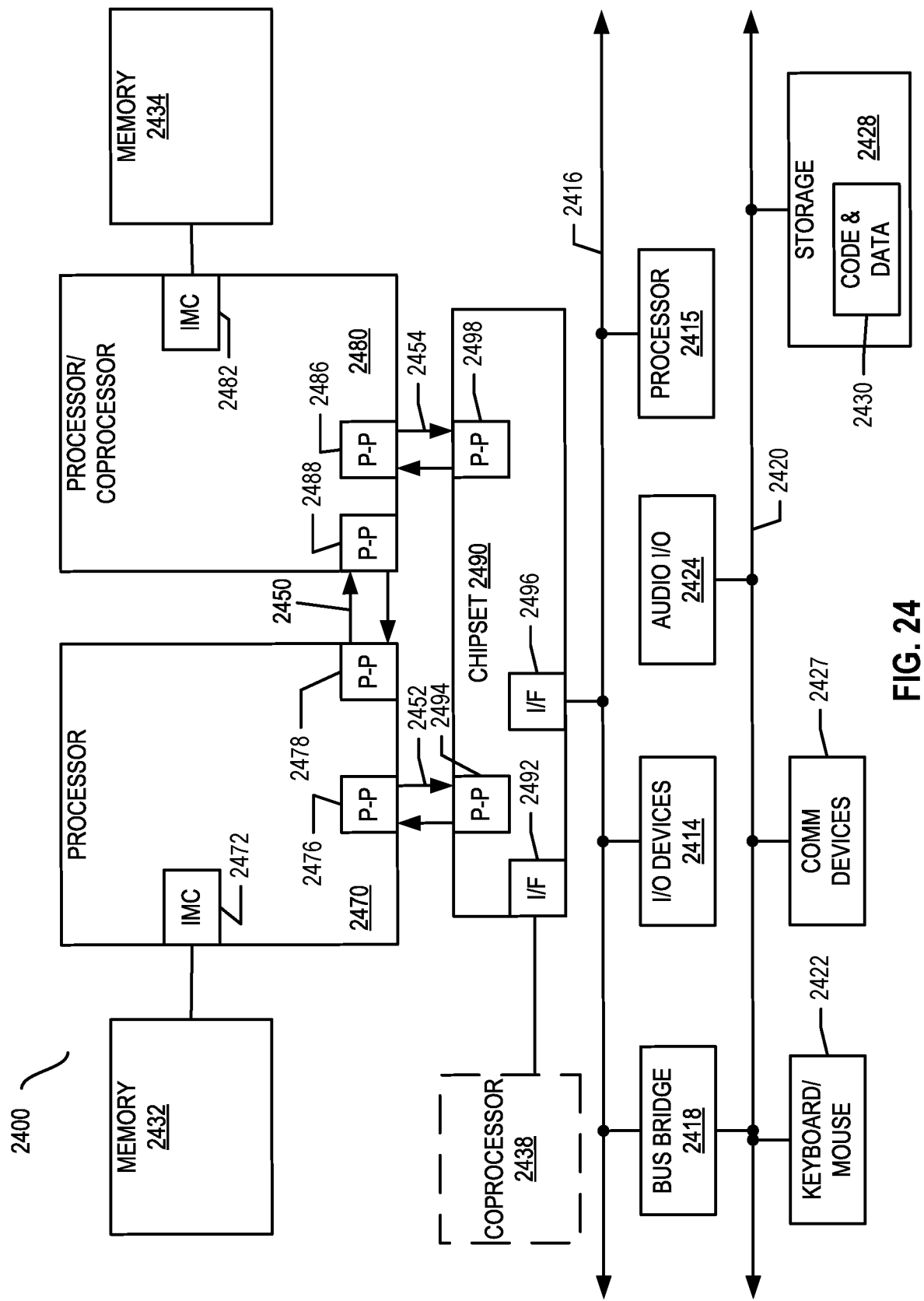

Referring now to FIG. 24, shown is a block diagram of a first more specific exemplary system 2400 in accordance with an embodiment of the present invention. As shown in FIG. 24, multiprocessor system 2400 is a point-to-point interconnect system, and includes a first processor 2470 and a second processor 2480 coupled via a point-to-point interconnect 2450. Each of processors 2470 and 2480 may be some version of the processor 2200. In some embodiments, processors 2470 and 2480 are respectively processors 2310 and 2315, while coprocessor 2438 is coprocessor 2345. In another embodiment, processors 2470 and 2480 are respectively processor 2310 coprocessor 2345.

Processors 2470 and 2480 are shown including integrated memory controller (IMC) units 2472 and 2482, respectively. Processor 2470 also includes as part of its bus controller units point-to-point (P-P) interfaces 2476 and 2478; similarly, second processor 2480 includes P-P interface circuits 2486 and 2488. Processors 2470, 2480 may exchange information via a point-to-point (P-P) interface 2450 using P-P interface circuits 2478, 2488. As shown in FIG. 24, IMCs 2472, and 2482 couple the processors to respective memories, namely a memory 2432 and a memory 2434, which may be portions of main memory locally attached to the respective processors.

Processors 2470, 2480 may each exchange information with a chipset 2490 via individual P-P interfaces 2452, 2454 using point to point interface circuits 2476, 2494, 2486, 2498. Chipset 2490 may optionally exchange information with the coprocessor 2438 via a high-performance interface 2492. In one embodiment, the coprocessor 2438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 2490 may be coupled to a first bus 2416 via an interface 2496. In one embodiment, first bus 2416 may be a Peripheral Component Interconnect (PCI) bus, or a bus such as a PCI Express bus or another third generation I/O interconnect bus, although the scope of the present invention is not so limited.

As shown in FIG. 24, various I/O devices 2414 may be coupled to first bus 2416, along with a bus bridge 2418 which couples first bus 2416 to a second bus 2420. In one embodiment, one or more additional processor(s) 2415, such as coprocessors, high-throughput MIC processors, GPGPU's, accelerators (such as, e.g., graphics accelerators or digital signal processing (DSP) units), field programmable gate arrays, or any other processor, are coupled to first bus 2416. In one embodiment, second bus 2420 may be a low pin count (LPC) bus. Various devices may be coupled to a second bus 2420 including, for example, a keyboard and/or mouse 2422, communication devices 2427 and a storage unit 2428 such as a disk drive or other mass storage device which may include instructions/code and data 2430, in one embodiment. Further, an audio I/O 2424 may be coupled to the second bus 2420. Note that other architectures are possible. For example, instead of the point-to-point architecture of FIG. 24, a system may implement a multi-drop bus or other such architecture.

Figure 25:
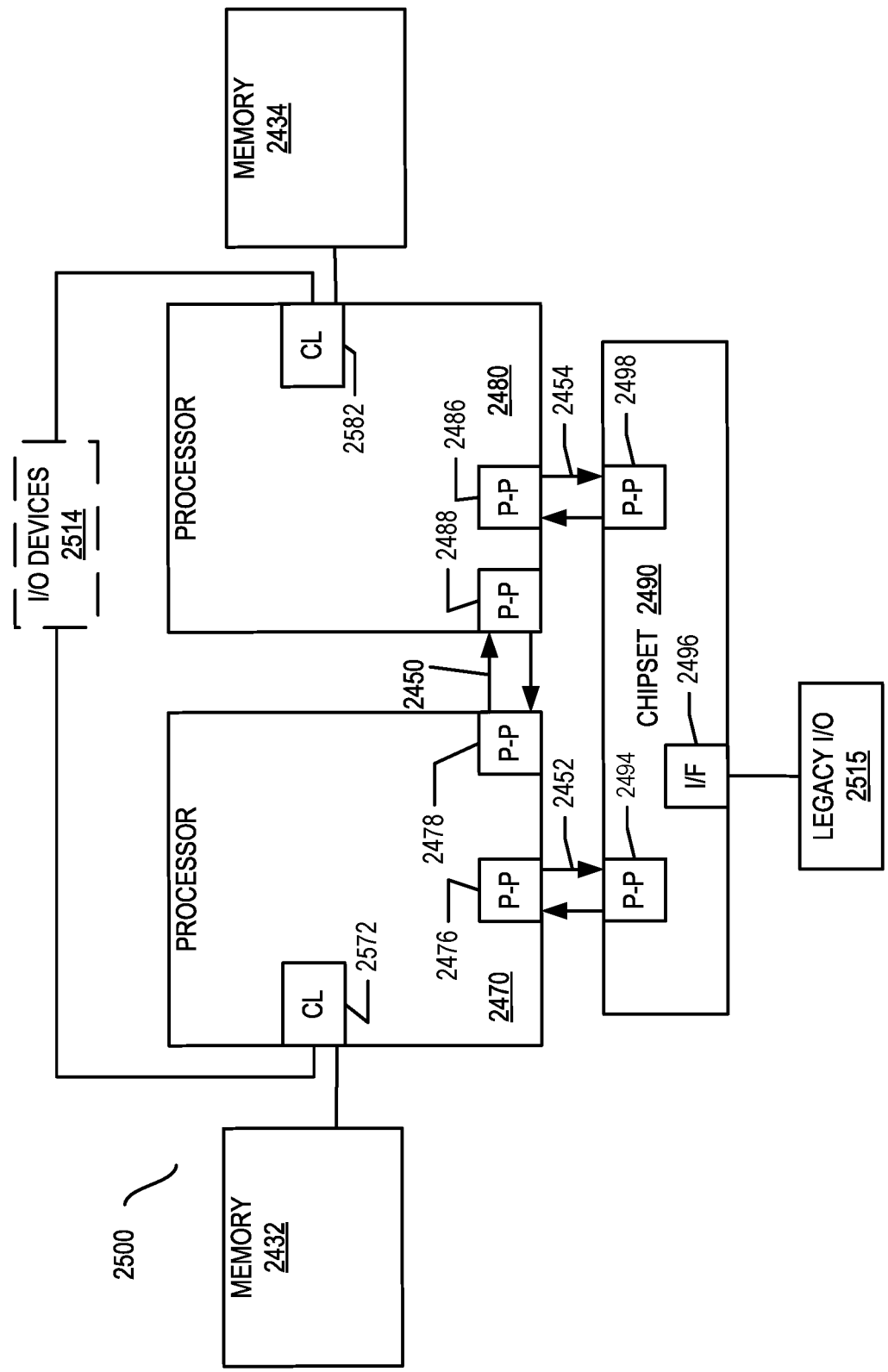

Referring now to FIG. 25, shown is a block diagram of a second more specific exemplary system 2500 in accordance with an embodiment of the present invention. Like elements in FIGS. 24 and 25 bear like reference numerals, and certain aspects of FIG. 24 have been omitted from FIG. 25 in order to avoid obscuring other aspects of FIG. 25.

FIG. 25 illustrates that the processors 2470, 2480 may include integrated memory and I/O control logic ("CL")

2572 and 2582, respectively. Thus, the CL 2572, 2582 include integrated memory controller units and include I/O control logic. FIG. 25 illustrates that not only are the memories 2432, 2434 coupled to the CL 2572, 2582, but also that I/O devices 2514 are also coupled to the control logic 2572, 2582. Legacy I/O devices 2515 are coupled to the chipset 2490.

Figure 26:
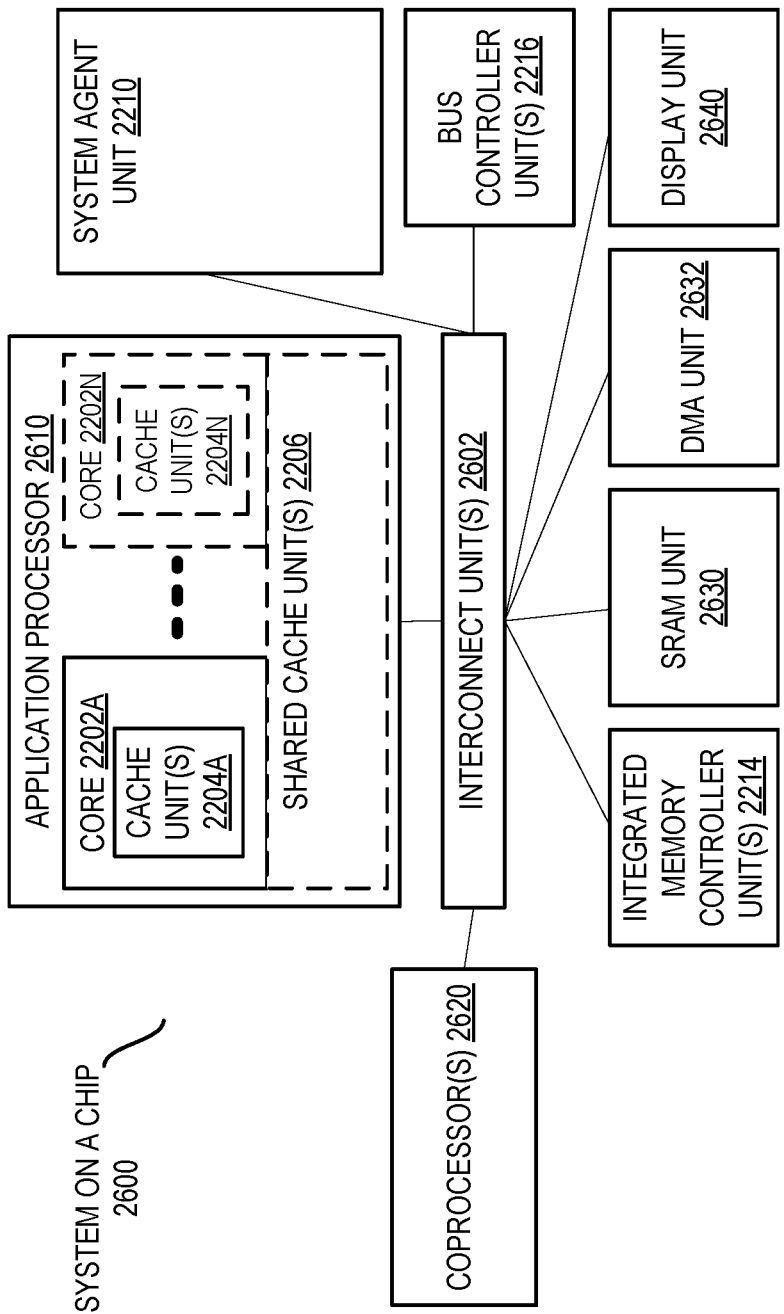

Referring now to FIG. 26, shown is a block diagram of a SoC 2600 in accordance with an embodiment of the present invention. Similar elements in FIG. 22 bear like reference numerals. Also, dashed lined boxes are optional features on more advanced SoCs. In FIG. 26, an interconnect unit(s) 2602 is coupled to: an application processor 2610 which includes a set of one or more cores 2202A-N, which include cache units 2204A through 2204N, and shared cache unit(s) 2206; a system agent unit 2210; a bus controller unit(s) 2216; an integrated memory controller unit(s) 2214; a set or one or more coprocessors 2620 which may include integrated graphics logic, an image processor, an audio processor, and a video processor; an static random access memory (SRAM) unit 2630; a direct memory access (DMA) unit 2632; and a display unit 2640 for coupling to one or more external displays. In one embodiment, the coprocessor(s) 2620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2430 illustrated in FIG. 24, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 27 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 27 shows a program in a high level language 2702 may be compiled using an x86 compiler 2704 to generate x86 binary code 2706 that may be natively executed by a processor with at least one x86 instruction set core 2716. The processor with at least one x86 instruction set core 2716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2704 represents a compiler that is operable to generate x86 binary code 2706 (e.g., object code) that can, with or without additional linkage processing, be executed on the processor with at least one x86 instruction set core 2716. Similarly, FIG. 27 shows the program in the high level language 2702 may be compiled using an alternative instruction set compiler 2708 to generate alternative instruction set binary code 2710 that may be natively executed by a processor without at least one x86 instruction set core 2714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2712 is used to convert the x86 binary code 2706 into code that may be natively executed by the processor without an x86 instruction set core 2714. This converted code is not likely to be the same as the alternative instruction set binary code 2710 because an instruction converter capable of this is difficult to make; however, the converted code will accomplish the general operation and be made up of instructions from the alternative instruction set. Thus, the instruction converter 2712 represents software, firmware, hardware, or a combination thereof that, through emulation, simulation, or any other process, allows a processor or other electronic device that does not have an x86 instruction set processor or core to execute the x86 binary code 2706.

Further Examples

Example 1 provides an exemplary system comprising: a plurality of cores; at least one multi-key total-memory-encryption circuits (MK-TME) circuit; at least one p memory controller; and a trust domain island resource manager (TDIRM) to: initialize a trust domain island control structure (TDICS) associated with a TD island, initialize a TD island protected memory (TDIPM) associated with the TD island, identify a host key identifier (HKID) in a key ownership table (KOT), assign the HKID to a cryptographic key in a MK-TME circuit and store the HKID in the TDICS, associate a first core of the plurality of cores with the TD island, add a memory page from an address space of the first core to the TDIPM, and transfer execution control to the first core to execute the TD island, and wherein a scope of the TDIPM is limited to bounds of the TD island.

Example 2 includes the substance of the exemplary system of Example 1, wherein each TD island is to be mapped to one of the plurality of sockets, and wherein a number of HKIDs in the system is equal to a number of sockets in the system multiplied by a number of KOT entries.

Example 3 includes the substance of the exemplary system of Example 1, wherein each TD island is to be mapped to one of the plurality of memory controllers in each of the plurality of sockets, and wherein a number of HKIDs in the system is equal to a number of sockets multiplied by a number of memory controllers in each socket, multiplied by a number of entries in the KOT.

Example 4 includes the substance of the exemplary system of Example 1, wherein each TD island is to be mapped to one of the plurality of cores in each of the plurality of sockets, and wherein a number of HKIDs in the system is equal to a number of sockets multiplied by a number of cores in each socket, multiplied by a number of entries in the KOT.

Example 5 includes the substance of the exemplary system of Example 1, wherein each of the plurality of sockets further comprises a hypervisor, and wherein each of the plurality of cores is a virtual machine.

Example 6 includes the substance of the exemplary system of Example 1, further comprising storage for a hardware configuration data structure to identify the sockets, the plurality of MK-TME circuits, and the memory controllers in the system, the TDIRM to access the hardware configuration when initializing the TD island.

Example 7 includes the substance of the exemplary system of Example 1, wherein the plurality of MK-TME circuits, when performing encryption and decryption, are to use a Ciphertext Stealing Advanced Encryption Standard (XTS-AES) in compliance with Institute of Electronics and Electrical Engineers (IEEE) 1619.

Example 8 provides an exemplary method performed by a Trust Domain Island (TDI) Resource Manager (TDIRM) in a system comprising a plurality of sockets, each comprising a plurality of cores and a plurality of multi-key total memory encryption (MK-TME) circuits, the method comprising: initializing a TDI Control Structure (TDICS) associated with a first TDI; initializing a TDI Protected Memory (TDIPM) associated with the first TDI; identifying a host key identifier (HKID) in a key ownership table (KOT); assigning the HKID to a cryptographic key and storing the HKID in the TDICS; and associating a first core with the first TDI, adding a memory page from an address space of the first core to the TDIPM, and transferring execution control to the first core to execute the first TDI, wherein a scope of the TDIPM is limited to bounds of the first TDI.

Example 9 includes the substance of the exemplary method of Example 8, wherein each TD island is mapped to one of the plurality of sockets, and wherein a number of HKIDs in the system is equal to a number of sockets in the system multiplied by a number of KOT entries.

Example 10 includes the substance of the exemplary method of Example 8, wherein each TD island is mapped to one of the plurality of memory controllers in each of the plurality of sockets, and wherein a number of HKIDs in the system is equal to a number of sockets multiplied by a number of memory controllers in each socket, multiplied by a number of entries in the KOT.

Example 11 includes the substance of the exemplary method of Example 8, wherein each TD island is mapped to one of the plurality of cores in each of the plurality of sockets, and wherein a number of HKIDs in the system is equal to a number of sockets multiplied by a number of cores in each socket, multiplied by a number of entries in the KOT.

Example 12 includes the substance of the exemplary method of Example 8, wherein each of the plurality of sockets further comprises a hypervisor, and wherein each of the plurality of cores is a virtual machine.

Example 13 includes the substance of the exemplary method of Example 8, further comprising the TDIRM referencing a hardware configuration structure identifying the sockets, the plurality of MK-TME circuits, and the memory controllers in the system, when initializing the TD island.

Example 14 includes the substance of the exemplary method of Example 8, wherein the plurality of MK-TME circuits use a Ciphertext Stealing Advanced Encryption Standard (XTS-AES) in compliance with IEEE 1619, an Institute of Electronics and Electrical Engineers standard.

Example 15 provides an exemplary apparatus comprising: at least one multi-key total-memory-encryption circuits (MK-TME) circuit; and a trust domain island resource manager (TDIRM) to: initialize a trust domain island control structure (TDICS) associated with a TD island, initialize a TD island protected memory (TDIPM) associated with the TD island, identify a host key identifier (HKID) in a key ownership table (KOT), assign the HKID to a cryptographic key in a MK-TME circuit and store the HKID in the TDICS, associate a first core of the plurality of cores with the TD island, add a memory page from an address space of the first core to the TDIPM, and transfer execution control to the first core to execute the TD island, and wherein a scope of the TDIPM is limited to bounds of the TD island.

Example 16 includes the substance of the exemplary apparatus of Example 15, wherein each TD island is to be mapped to one of plurality of sockets, and wherein a number of HKIDs in the system is equal to a number of sockets in the in the apparatus multiplied by a number of KOT entries.

Example 17 includes the substance of the exemplary apparatus of Example 15, wherein each TD island is to be mapped to at least one memory controllers, and wherein a number of HKIDs in the system is equal to a number of sockets multiplied by a number of memory controllers in each socket, multiplied by a number of entries in the KOT.

Example 18 includes the substance of the exemplary apparatus of Example 15, wherein each TD island is to be mapped to at least one core in each of a plurality of sockets, and wherein a number of HKIDs in the system is equal to a number of sockets multiplied by a number of cores in each socket, multiplied by a number of entries in the KOT.

Example 19 includes the substance of the exemplary apparatus of Example 15, further comprising storage for a hardware configuration data structure to identify sockets, the at least one MK-TME circuit, and memory controller, the TDIRM to access the hardware configuration when initializing the TD island.

Example 20 includes the substance of the exemplary apparatus of Example 15, wherein the at least one MK-TME circuits, when performing encryption and decryption, is to use a Ciphertext Stealing Advanced Encryption Standard (XTS-AES) in compliance with Institute of Electronics and Electrical Engineers (IEEE) 1619.

What is claimed is:

1. A system comprising:
    a plurality of cores;
    at least one multi-key total-memory-encryption circuits (MK-TME) circuit;
    at least one p memory controller; and
    a trust domain island resource manager (TDIRM) to:
        initialize a trust domain island control structure (TDICS) associated with a TD island,
        initialize a TD island protected memory (TDIPM) associated with the TD island,
        identify a host key identifier (HKID) in a key ownership table (KOT),
        assign the HKID to a cryptographic key in a MK-TME circuit and store the HKID in the TDICS,
        associate a first core of the plurality of cores with the TD island,
        add a memory page from an address space of the first core to the TDIPM, and
        transfer execution control to the first core to execute the TD island, and wherein
    a scope of the TDIPM is limited to bounds of the TD island.

2. The system of claim 1, wherein each TD island is to be mapped to one of the plurality of sockets, and wherein a number of HKIDs in the system is equal to a number of sockets in the system multiplied by a number of KOT entries.

3. The system of claim 1, wherein each TD island is to be mapped to one of the plurality of memory controllers in each of the plurality of sockets, and wherein a number of HKIDs in the system is equal to a number of sockets multiplied by a number of memory controllers in each socket, multiplied by a number of entries in the KOT.

4. The system of claim 1, wherein each TD island is to be mapped to one of the plurality of cores in each of the plurality of sockets, and wherein a number of HKIDs in the system is equal to a number of sockets multiplied by a number of cores in each socket, multiplied by a number of entries in the KOT.

5. The system of claim 1, wherein each of the plurality of sockets further comprises a hypervisor, and wherein each of the plurality of cores is a virtual machine.

6. The system of claim 1, further comprising storage for a hardware configuration data structure to identify the sockets, the plurality of MK-TME circuits, and the memory controllers in the system, the TDIRM to access the hardware configuration when initializing the TD island.

7. The system of claim 1, wherein the plurality of MK-TME circuits, when performing encryption and decryption, are to use a Ciphertext Stealing Advanced Encryption Standard (XTS-AES) in compliance with Institute of Electronics and Electrical Engineers (IEEE) 1619.

8. A method performed by a Trust Domain Island (TDI) Resource Manager (TDIRM) in a system comprising a plurality of sockets, each comprising a plurality of cores and a plurality of multi-key total memory encryption (MK-TME) circuits, the method comprising:
    initializing a TDI Control Structure (TDICS) associated with a first TDI;
    initializing a TDI Protected Memory (TDIPM) associated with the first TDI;
    identifying a host key identifier (HKID) in a key ownership table (KOT);
    assigning the HKID to a cryptographic key and storing the HKID in the TDICS; and
    associating a first core with the first TDI, adding a memory page from an address space of the first core to the TDIPM, and transferring execution control to the first core to execute the first TDI, wherein a scope of the TDIPM is limited to bounds of the first TDI.

9. The method of claim 8, wherein each TD island is mapped to one of the plurality of sockets, and wherein a number of HKIDs in the system is equal to a number of sockets in the system multiplied by a number of KOT entries.

10. The method of claim 8, wherein each TD island is mapped to one of the plurality of memory controllers in each of the plurality of sockets, and wherein a number of HKIDs in the system is equal to a number of sockets multiplied by a number of memory controllers in each socket, multiplied by a number of entries in the KOT.

11. The method of claim 8, wherein each TD island is mapped to one of the plurality of cores in each of the plurality of sockets, and wherein a number of HKIDs in the system is equal to a number of sockets multiplied by a number of cores in each socket, multiplied by a number of entries in the KOT.

12. The method of claim 8, wherein each of the plurality of sockets further comprises a hypervisor, and wherein each of the plurality of cores is a virtual machine.

13. The method of claim 8, further comprising the TDIRM referencing a hardware configuration structure identifying the sockets, the plurality of MK-TME circuits, and the memory controllers in the system, when initializing the TD island.

14. The method of claim 8, wherein the plurality of MK-TME circuits use a Ciphertext Stealing Advanced Encryption Standard (XTS-AES) in compliance with IEEE 1619, an Institute of Electronics and Electrical Engineers standard.

15. An apparatus comprising:
    at least one multi-key total-memory-encryption circuits (MK-TME) circuit; and
    a trust domain island resource manager (TDIRM) to:
        initialize a trust domain island control structure (TDICS) associated with a TD island,
        initialize a TD island protected memory (TDIPM) associated with the TD island,
        identify a host key identifier (HKID) in a key ownership table (KOT),
        assign the HKID to a cryptographic key in a MK-TME circuit and store the HKID in the TDICS, associate a first core of the plurality of cores with the TD island, add a memory page from an address space of the first core to the TDIPM, and transfer execution control to the first core to execute the TD island, and wherein a scope of the TDIPM is limited to bounds of the TD island.

16. The apparatus of claim 15, wherein each TD island is to be mapped to one of plurality of sockets, and wherein a number of HKIDs in the system is equal to a number of sockets in the in the apparatus multiplied by a number of KOT entries.

17. The apparatus of claim 15, wherein each TD island is to be mapped to at least one memory controllers, and wherein a number of HKIDs in the system is equal to a number of sockets multiplied by a number of memory controllers in each socket, multiplied by a number of entries in the KOT.

18. The apparatus of claim 15, wherein each TD island is to be mapped to at least one core in each of a plurality of sockets, and wherein a number of HKIDs in the system is equal to a number of sockets multiplied by a number of cores in each socket, multiplied by a number of entries in the KOT.

19. The apparatus of claim 15, further comprising storage for a hardware configuration data structure to identify sockets, the at least one MK-TME circuit, and memory controller, the TDIRM to access the hardware configuration when initializing the TD island.

20. The apparatus of claim 15, wherein the at least one MK-TME circuits, when performing encryption and decryption, is to use a Ciphertext Stealing Advanced Encryption Standard (XTS-AES) in compliance with Institute of Electronics and Electrical Engineers (IEEE) 1619.

* * * * *